(12) United States Patent
Kim et al.

(10) Patent No.: US 12,495,111 B2
(45) Date of Patent: Dec. 9, 2025

(54) ELECTRONIC DEVICE INCLUDING PLURALITY OF DISPLAYS AND METHOD OF OPERATING SAME

(71) Applicant: Samsung Electronics Co., Ltd., Suwon-si (KR)

(72) Inventors: Taeyeong Kim, Suwon-si (KR); Kibeom Kim, Suwon-si (KR); Joungmin Cho, Suwon-si (KR); Myunghoon Kwak, Suwon-si (KR); Minsoo Kim, Suwon-si (KR); Sanghyuk Park, Suwon-si (KR); Yangwook Kim, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 18/074,965

(22) Filed: Dec. 5, 2022

(65) Prior Publication Data
US 2023/0097982 A1 Mar. 30, 2023

Related U.S. Application Data

(63) Continuation of application No. PCT/KR2021/006934, filed on Jun. 3, 2021.

(30) Foreign Application Priority Data

Jun. 5, 2020 (KR) .................. 10-2020-0068591
Dec. 29, 2020 (KR) .................. 10-2020-0186836

(51) Int. Cl.
*H04M 1/72469* (2021.01)
*G06F 3/04817* (2022.01)
(Continued)

(52) U.S. Cl.
CPC .... *H04M 1/72469* (2021.01); *G06F 3/04817* (2013.01); *G06F 3/0488* (2013.01);
(Continued)

(58) Field of Classification Search
None
See application file for complete search history.

(56) References Cited

U.S. PATENT DOCUMENTS

2005/0176470 A1  8/2005  Yamakawa
2008/0144265 A1  6/2008  Aoki
(Continued)

FOREIGN PATENT DOCUMENTS

CN  111090300 A  5/2020
EP  1670223 A2  6/2006
(Continued)

OTHER PUBLICATIONS

Chinese Office Action dated Nov. 28, 2024, issued in Chinese Application No. 202180040570.1.
(Continued)

*Primary Examiner* — Nicholas J Lee
(74) *Attorney, Agent, or Firm* — Jefferson IP Law, LLP

(57) ABSTRACT

An electronic device is provided. The electronic device includes a housing, a first display slidable through the housing and having at least a portion exposed to the outside through the housing, wherein the area exposed to the outside, of the first display is changeable on the basis of the sliding through the housing, a second display spaced apart from the at least an exposed portion of the first display by a predetermined distance, and disposed on a plane together with the at least an exposed portion, and at least one processor disposed within the housing, wherein the at least
(Continued)

one processor is configured to display first content on the first display and display second content on the second display.

18 Claims, 60 Drawing Sheets

(51) Int. Cl.
| | |
|---|---|
| *G06F 3/0488* | (2022.01) |
| *G06F 21/32* | (2013.01) |
| *G06F 21/44* | (2013.01) |
| *G06V 40/12* | (2022.01) |
| *G06V 40/13* | (2022.01) |
| *H04M 1/02* | (2006.01) |

(52) U.S. Cl.
CPC .............. *G06F 21/32* (2013.01); *G06F 21/44* (2013.01); *G06V 40/1306* (2022.01); *G06V 40/1365* (2022.01); *H04M 1/0235* (2013.01); *H04M 2201/38* (2013.01); *H04M 2201/42* (2013.01)

(56) References Cited

U.S. PATENT DOCUMENTS

| | | |
|---|---|---|
| 2009/0051830 A1 | 2/2009 | Matsushita et al. |
| 2009/0189877 A1 | 7/2009 | Washino et al. |
| 2010/0079696 A1 | 4/2010 | Hwu et al. |
| 2010/0167791 A1 | 7/2010 | Lim |
| 2010/0182738 A1 | 7/2010 | Visser et al. |
| 2015/0378557 A1 | 12/2015 | Jeong et al. |
| 2016/0054914 A1 | 2/2016 | Di Censo et al. |
| 2016/0103488 A1 | 4/2016 | Levesque et al. |
| 2016/0112667 A1 | 4/2016 | Park et al. |
| 2016/0187994 A1 | 6/2016 | La et al. |
| 2016/0239050 A1 | 8/2016 | Kim et al. |
| 2017/0003794 A1 | 1/2017 | Gao et al. |
| 2018/0181164 A1 | 6/2018 | Chen |
| 2018/0364827 A1 | 12/2018 | Chung |
| 2019/0261519 A1 | 8/2019 | Park et al. |
| 2019/0310686 A1 | 10/2019 | Lee et al. |
| 2020/0177718 A1 | 6/2020 | Cao |
| 2020/0363841 A1* | 11/2020 | Kim ..................... G09F 9/301 |
| 2021/0019748 A1 | 1/2021 | Hyun et al. |
| 2021/0034210 A1 | 2/2021 | Chung et al. |
| 2021/0116959 A1 | 4/2021 | Heo et al. |
| 2021/0219437 A1 | 7/2021 | Kim et al. |

FOREIGN PATENT DOCUMENTS

| | | |
|---|---|---|
| EP | 1970886 A1 | 9/2008 |
| EP | 2228708 A2 | 9/2010 |
| KR | 10-2009-0006606 A | 1/2009 |
| KR | 10-2010-0057531 A | 5/2010 |
| KR | 10-2010-0079100 A | 7/2010 |
| KR | 10-2014-0144029 A | 12/2014 |
| KR | 10-2016-0099998 A | 8/2016 |
| KR | 10-2016-0139643 A | 12/2016 |
| KR | 10-2016-0141255 A | 12/2016 |
| KR | 10-2017-0043534 A | 4/2017 |
| KR | 10-1774552 B1 | 9/2017 |
| KR | 10-2019-0098340 A | 8/2019 |
| KR | 10-2019-0101184 A | 8/2019 |
| KR | 10-2019-0117985 A | 10/2019 |
| KR | 10-2019-0143029 A | 12/2019 |
| KR | 10-2020-0007510 A | 1/2020 |
| KR | 10-2020-0052679 A | 5/2020 |
| WO | 2004/084171 A1 | 9/2004 |
| WO | 2018/038545 A1 | 3/2018 |
| WO | 2019/107909 A1 | 6/2019 |

OTHER PUBLICATIONS

Partial Supplementary European Search Report dated Oct. 2, 2023, issued in European Patent Application No. 21817129.6-1224.
Extended European Search Report dated Feb. 5, 2024, issued in European Patent Application No. 21817129.6.
European Office Action dated Feb. 10, 2025, issued in European Application No. 21 817 129.6.
Korean Office Action dated Mar. 18, 2025, issued in Korean Application No. 10-2020-0186836.
Korean Office Action dated Mar. 19, 2025, issued in Korean Application No. 10-2020-0186849.
Korean Office Action dated Apr. 2, 2025, issued in Korean Application No. 10-2020-0186858.

* cited by examiner

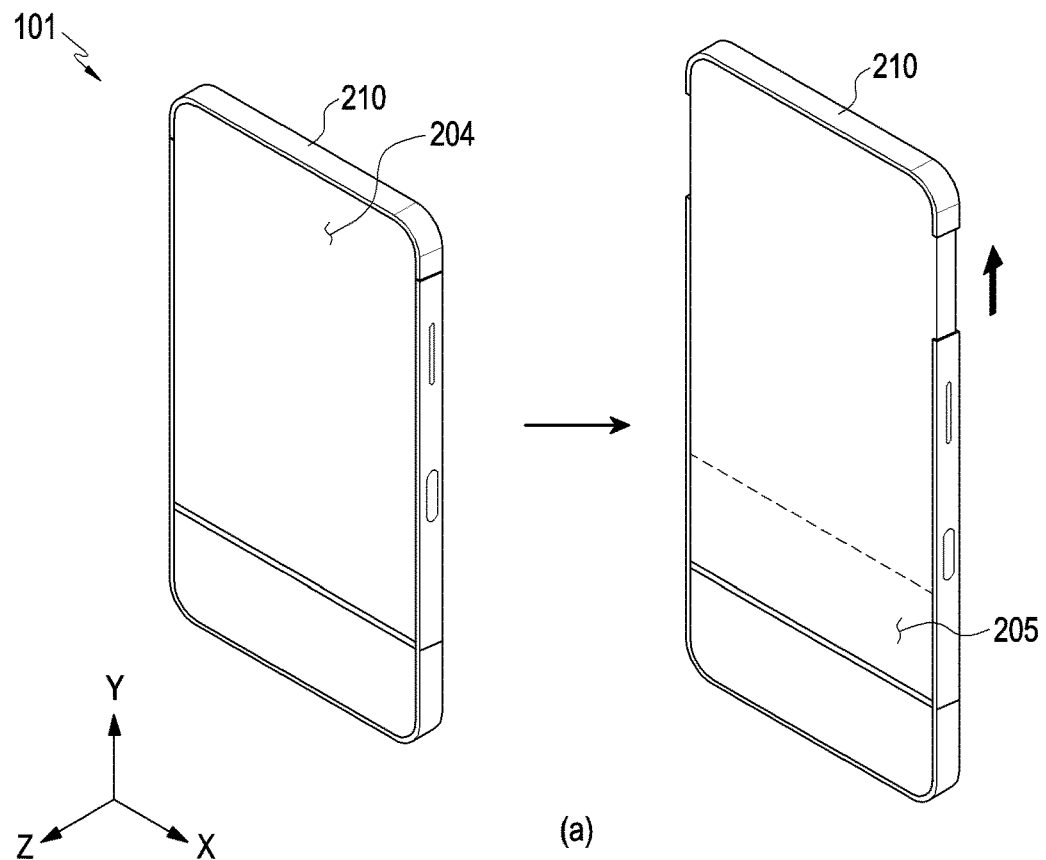
(a)
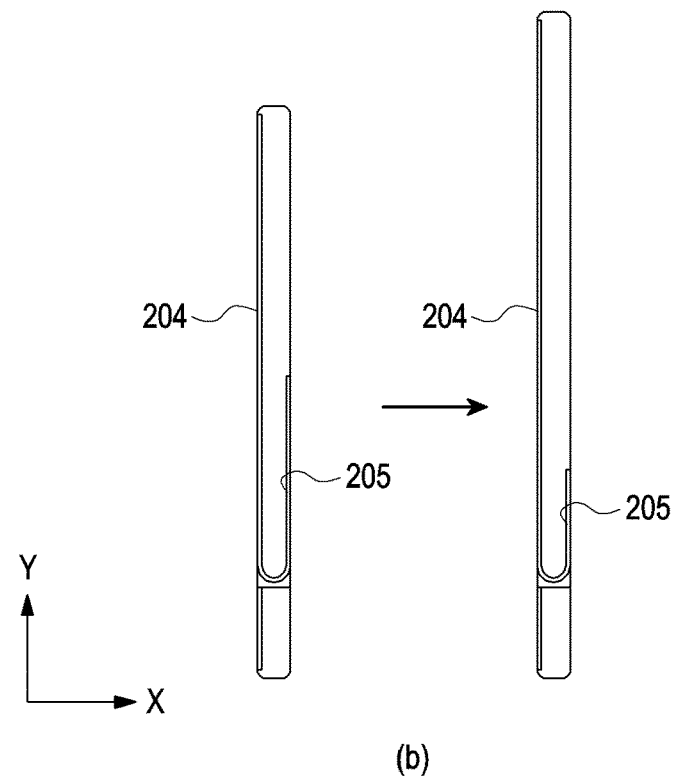
(b)
FIG. 2B

ELECTRONIC DEVICE INCLUDING PLURALITY OF DISPLAYS AND METHOD OF OPERATING SAME

CROSS-REFERENCE TO RELATED APPLICATION(S)

This application is a continuation application, claiming priority under § 365(c), of an International application No. PCT/KR2021/006934, filed on Jun. 3, 2021, which is based on and claims the benefit of a Korean patent application number 10-2020-0068591, filed on Jun. 5, 2020, in the Korean Intellectual Property Office, and of a Korean patent application number 10-2020-0186836, filed on Dec. 29, 2020, in the Korean Intellectual Property Office, the disclosure of each of which is incorporated by reference herein in its entirety.

BACKGROUND

1. Field

The disclosure relates to an electronic device including a plurality of displays for providing text associated with content and a method for operating the same.

2. Description of Related Art

Portable digital communication devices have become a must-have item for everyone in modern era. Customers desire to receive various high-quality services anytime, anywhere using their portable digital communication devices.

Portable digital communication devices are implemented to include a plurality of displays to provide various services and allow for use of various services according to the user's control (e.g., the user's input) received on the plurality of displays. However, as customers' portable digital communication devices are equipped with a plurality of displays, the portable digital communication devices come in a larger area.

Therefore, there is a need for a technique for implementing portable digital communication devices including a plurality of displays but having a compact structure.

The above information is presented as background information only to assist with an understanding of the disclosure. No determination has been made, and no assertion is made, as to whether any of the above might be applicable as prior art with regard to the disclosure.

SUMMARY

An electronic device may include a plurality of displays (e.g., a first display and a second display). The plurality of displays may be provided in different positions of the electronic device. Contents displayed on the respective displays are not continuously visually recognized due to placement of the plurality of displays in different positions, so that the user's continuity in use of the plurality of displays may be reduced. Further, the electronic device may not perform a comprehensive operation corresponding to the user's inputs received through the plurality of displays but merely perform a separate operation corresponding to each of the user's inputs received through the plurality of displays, respectively, and this way deteriorates use efficiency of the plurality of displays. Further, a space formed between the plurality of displays provided in the electronic device may degrade a visual look and cause entrance of a foreign body into the electronic device, damaging the electronic device.

Aspects of the disclosure are to address the above-mentioned problems and/or disadvantages and to provide at least the advantages described below. Accordingly, an aspect of the disclosure is to provide an electronic device including two displays (e.g., a first display and a second display) disposed to form one plane for visual continuity and adjust the area exposed to the outside of one display (e.g., first display) according to control to thereby enhance use convenience. Further, according to various embodiments, the electronic device and operation method thereof may enhance the user's use efficiency of the plurality of displays by aggregating the user's inputs respectively received through the plurality of displays and performing operations. Further, according to various embodiments, a member (e.g., an optical member) may be disposed in the space formed between the plurality of displays, providing an aesthetic feel, preventing entrance of a foreign body into the electronic device, and providing at least one piece of information through the disposed member to thereby enhance use convenience for the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a first display having at least a portion exposed to an outside through the housing and slidable through the housing, an externally exposed area of the first display being changeable based on a slide through the housing, a second display spaced apart from the exposed at least the portion of the first display by a predetermined interval and, along with the exposed at least the portion, disposed on one plane, and at least one processor disposed in the housing, wherein the at least one processor is configured to receive at least one of a first input on the first display or a second input on the second display and perform at least one operation based on at least one of the first input or the second input.

In accordance with another aspect of the disclosure, a method for operating an electronic device is provided. The method includes receiving at least one of a first input on a first display of the electronic device or a second input on a second display of the electronic device, the first display having at least a portion exposed to an outside, and the second display spaced apart from the exposed at least the portion of the first display by a predetermined interval and, together with the exposed at least the portion, disposed on one plane, and performing at least one operation based on at least one of the first input or the second input.

In accordance with another aspect of the disclosure, an electronic device is provided. The electronic device includes a housing, a first display having at least a portion exposed to an outside through the housing and slidable through the housing, an externally exposed area of the first display being changeable based on a slide through the housing, a second display spaced apart from the exposed at least the portion of the first display by a predetermined interval and, along with the exposed at least the portion, disposed on one plane, and at least one processor disposed in the housing, wherein the at least one processor is configured to receive a first input on the first display, receive a second input on the second display, identify a first time when the first input is received and a second time when the second input is received, identify a first position where the first input is received and a second position where the second input is received, and perform at least one operation based on the first time corresponding to the second time and the first position corresponding to the second position.

Embodiments of the disclosure are not limited to the foregoing objectives, and other objectives would readily be appreciated by a skilled artisan from the following detailed description taken in conjunction with the accompanying drawings.

Various embodiments address at least the foregoing problems and/or disadvantages and provide at least advantages described below.

According to various embodiments, there may be provided an electronic device which includes two displays (e.g., a first display and a second display) disposed to form one plane for visual continuity and adjusts the area exposed to the outside of one display (e.g., first display) according to control to thereby enhance use convenience.

Further, according to various embodiments, there may be provided an electronic device and operation method thereof which enhances the user's use efficiency of the plurality of displays by aggregating the user's inputs respectively received through the plurality of displays and performing operations.

Further, according to various embodiments, there may be provided an electronic device and operation method thereof, in which a member (e.g., an optical member) may be disposed in the space formed between the plurality of displays, providing an aesthetic feel, preventing entrance of a foreign body into the electronic device, and providing at least one piece of information through the disposed member to thereby enhance use convenience for the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2B illustrates an example of an operation in which an exposed area of a first display included in an electronic device is changed according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of the various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventors to provide a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly indicates otherwise. Thus, for example, reference to "a component surface" includes reference to one or more of such surfaces.

Figure 1:
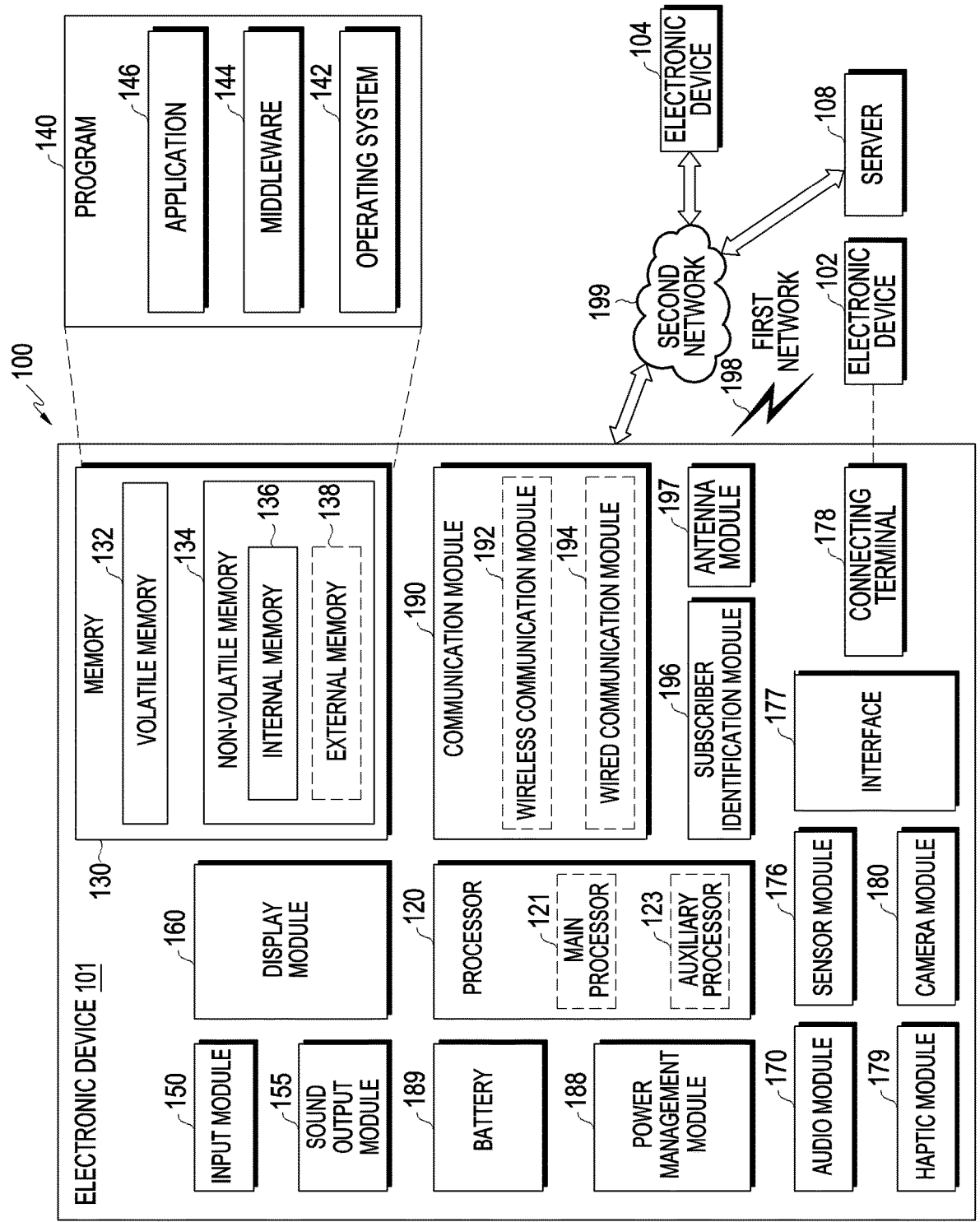
FIG. 1 is a block diagram illustrating an electronic device in a network environment according to an embodiment of the disclosure.

FIG. 1 is a view illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The non-volatile memory 134 may include an internal memory 136 and/or an external memory 138. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the displays, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 101). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™ wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, an example of the electronic device 101 is described further with reference to FIGS. 2A to 2C.

Figure 2A:
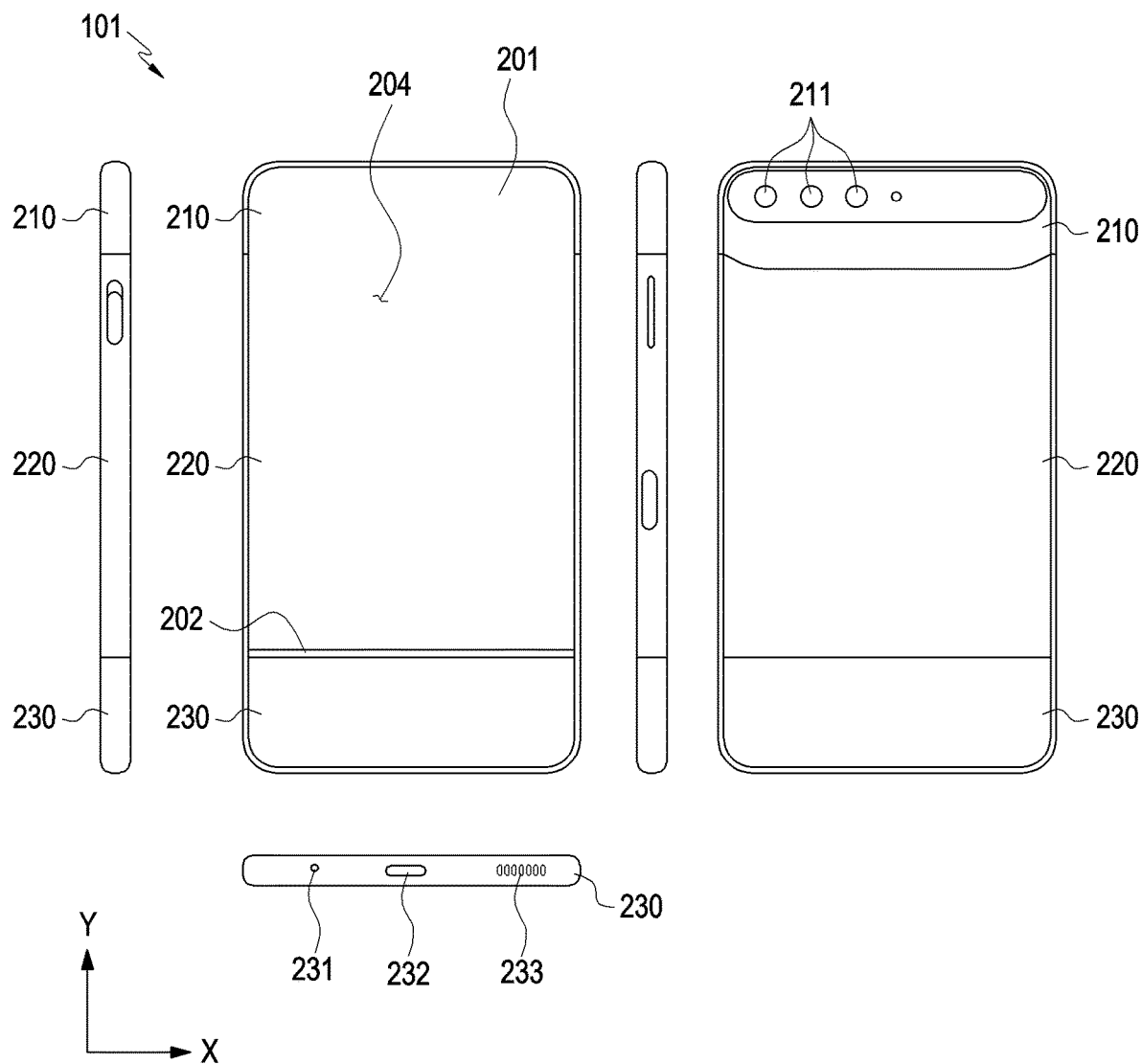
FIG. 2A is a view illustrating an example of an electronic device according to an embodiment of the disclosure.

FIG. 2A is a view illustrating an example of an electronic device according to an embodiment of the disclosure. FIG. 2B illustrates an example of an operation in which an exposed area of a first display included in an electronic device is changed according to an embodiment of the disclosure. FIG. 2C is a view illustrating various implementations of an electronic device according to an embodiment of the disclosure.

Figure 2C:
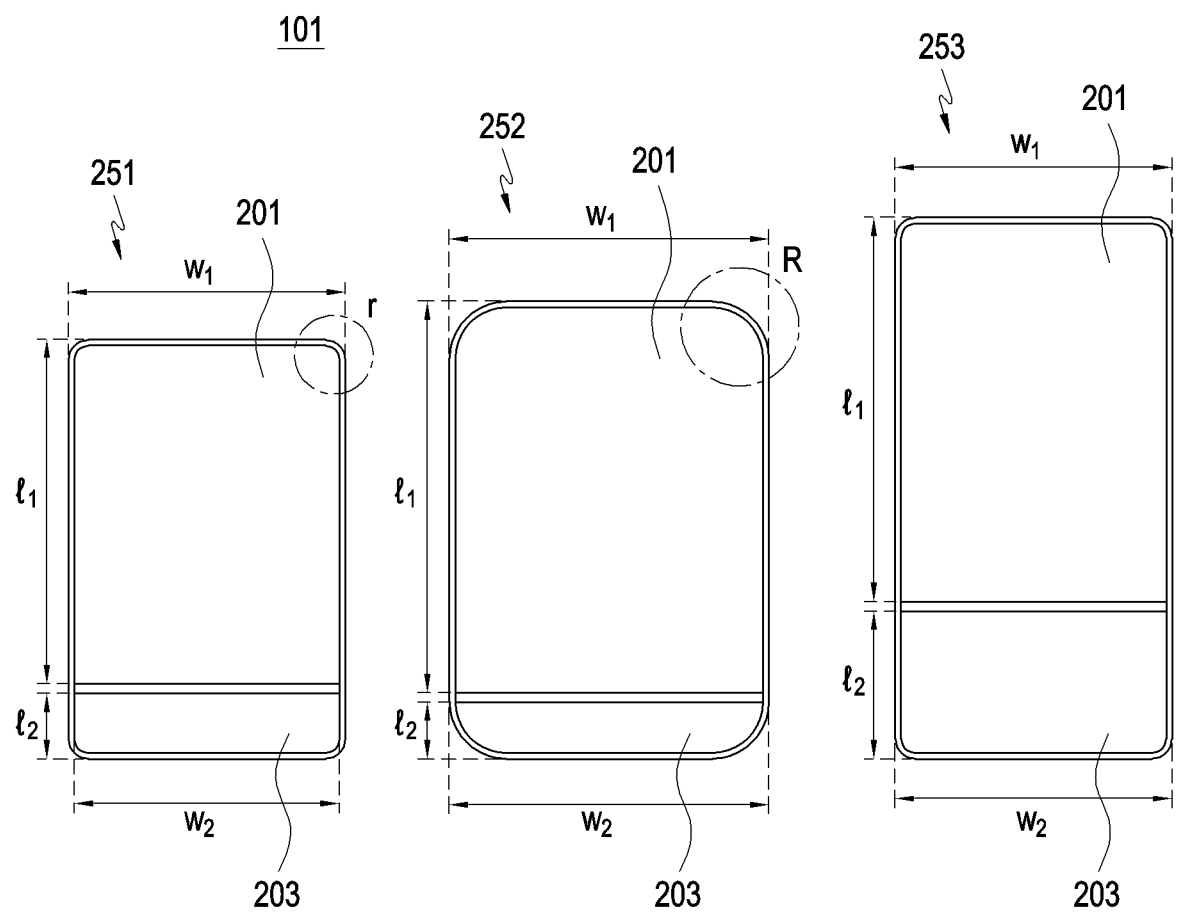
FIG. 2C is a view illustrating various implementations of an electronic device according to an embodiment of the disclosure.

Referring to FIGS. 2A to 2C, according to various embodiments, the electronic device 101 may include a plurality of displays (e.g., the first display 201 and the second display 203). For example, the electronic device 101 may include a first display 201 and a second display 203 as shown in FIG. 2A. The first display 201 may be a display in which at least a partial area thereof may be bent (or deformed) by the user's input (e.g., a force applied by a part of the user's body). For example, the first display 201 may be a flexible display. The second display 203 may be a display having a relatively low degree of bending (or deformation) due to an external force as compared to the first display 201. For example, the second display 203 may be a rigid display. As another example, the second display 203 may include a flexible display and a glass (e.g., a cover window) disposed on an outer surface of the flexible display (e.g., an upper surface of the flexible display). The glass may be a rigid glass. A predetermined space 202 may be formed between the first display 201 and the second display 203 of the electronic device 101. Predetermined members may be further provided in the space 202, which is described below with reference to FIGS. 6A and 6B. The first display 201 and the second display 203 may be supported or disposed by a plurality of housings (e.g., the first to third structures 210, 220, and 230). The ratio of the externally exposed area of the first display 201 and the externally exposed area of the second display may be changed depending on a relative position change (e.g., a slide), which is described below. Meanwhile, since the housing forms the physical structure of the electronic device 101, the housing may also be defined by the term 'structure.'

According to various embodiments, the plurality of displays (e.g., at least a portion of the first display 201 and the second display 203) may form one plane (or be disposed on one plane) for visual continuity, and the entire area of the display (e.g., the sum of the area of the exposed portion of the first display and the area of the second display) may be changed. For example, in a specific state (e.g., a closed state, an opened state, or an intermediate state to be described below), at least a portion 204 of the first display 201 of the electronic device 101 may be exposed to the outside (e.g., disposed to be viewed by the user) while a remaining portion is received inside the electronic device 101, and the entire area of the second display may be exposed to the outside, as shown in FIG. 2A. In this case, the exposed area of the first display 201 may be changed, and the exposed area of the second display 203 may be maintained (or fixed). For example, as shown in FIG. 2B, the first display may be moved so that at least a received portion 205 is exposed to the outside (e.g., slide-out) or may be moved to be received inside the electronic device 101 (e.g., slide-in) so that the exposed area of the first display may be changed. At least an exposed portion of the first display may be spaced apart from the second display by a predetermined gap so that the first display may slide out to the outside and/or slide in the electronic device 101, securing a space 202 where the first display 201 is movable (or forming an inlet through which the first display 201 may be drawn in or out). Hereinafter, housings disposed to support a plurality of displays and slides (e.g., slide-in or slide-out) of the first display 201 based on a relative position change of the housings are described.

According to various embodiments, the first display 201 may be disposed on one flat surface of the first housing 210, and the second display 203 may be disposed on one flat surface of the third housing 230. The first housing 210 may be disposed to slide on the second housing 411, and the third housing may be coupled to the second housing 220.

The first housing 210 (or first structure) where the first display 201 is disposed may slide on the second housing 220 in one direction (e.g., the upper direction of the y axis or a direction toward the upper surface of the first housing 210 from the lower surface of the third housing 230) with respect to the fixed third housing 230, and the first display 201 may slide out from the space 202 (e.g., the portions received inside the electronic device 101 of the first display 201 are exposed to the outside). Further, when the first housing 210 moves in the other direction (e.g., the lower direction of the y axis or a direction from the upper surface of the first housing 210 to the lower surface of the third housing 230), the first display 201 may slide in the space 202 (e.g., the exposed portion of the first display 201 is received inside). In other words, in a state in which the position of the third housing 230 where the second display 203 is disposed is fixed, the first housing 210 may be moved so that the relative positions of the first housing 210 and the third housing 230 may be changed. Depending on a change in the relative positions of the housings as described above, the exposed area of the first display 201 may be changed while the exposed area of the second display 203 is maintained (or fixed). A slide-out or slide-in of the first display 201 according to a movement (e.g., a slide) of the housing (e.g., the first housing 210) as described above is described below with reference to FIGS. 2A to 2C.

According to various embodiments, the plurality of displays included in the electronic device 101 may have structural features associated with each other. For example, the first display 201 and the second display 203 may be disposed to form one virtual plane. At least a portion of the first display 201 and the second display 203 may be disposed on one virtual plane so that no step (i.e., no difference in height) is formed between the surface of the at least the exposed portion of the first display 201 and the second display 203. As another example, the length (e.g., width) in one direction (e.g., X-axis direction) of the first display 201 may correspond to (e.g., equal) the length (e.g., width) in one direction of the second display 203. Referring to 251 of FIG. 2C, the first display 201 and the second display 203 may be implemented so that the width w1 of the area adjacent to the second display 203 of the at least the exposed portion of the first display 201 (or area adjacent to the space 202) corresponds to the width w2 of the area of the second display 203. Accordingly, when the electronic device 101 displays content on each of the first display 201 and the second display 203, the respective contents displayed on the displays (e.g., the first display 201 and the second display 203) may be viewed as a single content by the user. As another example, the edge (or edge portion) of the first display 201 and the second display 203 may be formed to have a predetermined curvature. For example, two upper edges (e.g., the upper left edge and upper right edge) of the first housing 210 where the first display 201 is disposed and two lower edges (e.g., the lower left edge and lower right edge) of the third housing 230 where the second display 203 is disposed may be implemented to have a predetermined curvature and, corresponding thereto, two upper edges of the first display 201 and two lower edges of the second display 203 may be implemented to have a predetermined curvature. Accordingly, as the edges are formed to have the curvature, the user may grip the electronic device 101 more conveniently. Meanwhile, without limited to those shown, the curvatures of the edge portions may be varied depending on the purpose of implementation. For example, the edge curvatures of the first display 201 and the second display 203 may correspond to (equal to) or differ from each other. As another example, as shown in FIG. 2C, the edge curvatures of the first display 201 and the second display 203 may be implemented as different curvatures (e.g., a first curvature r of 251 of FIG. 2C and a second curvature R of 252 of FIG. 2C) depending on the purpose of implementation or design.

According to various embodiments, the plurality of displays included in the electronic device 101 may have different structural features. For example, referring to 251 of FIG. 2C, the length l1 in one direction (e.g., the direction from the lower surface of the third housing 230 to the upper surface of the first housing 210) of the first display 201 may be implemented to be larger than the length l2 in one direction of the second display 203. In this case, as shown in 252 and 253 of FIG. 2C, the length l1 and width w1 of the first display 201 and the length l2 and width w2 of the second display 203 may be implemented as various lengths and widths depending on the purpose of implementation or design.

According to various embodiments, various types of components (e.g., devices, modules, or holes) may be provided in the housings included in the electronic device 101. Various components are described below.

For example, various devices may be provided in the first housing 210. For example, at least one camera 211 may be provided on an opposite surface (or a rear surface) to one surface of the first housing 210 where the first display 201 is disposed. The at least one camera 211 may capture a subject in a direction opposite to the exposed area of the first display 201. The at least one camera 211 may include a wide-angle camera, a telephoto camera, or a close-up camera, and according to an embodiment, by including an infrared projector and/or an infrared receiver, the electronic device 101 may measure the distance to the subject. The at least one camera 211 may include one or more lenses, an image sensor, and/or an image signal processor. Meanwhile, although not shown, the electronic device 101 may further include at least one camera (e.g., a front camera) that captures the subject on the exposed area of the first display 201. For example, the front camera may be disposed around or in an area overlapping the exposed area of the first display 201 of the first housing 210. When disposed in an area overlapping the first display 201, the subject may be captured through the first display 201.

As another example, a plurality of holes (e.g., holes 231, 232, and 233) may be implemented in the lower surface of the third housing 230 where the second display 203 is disposed. For example, a plurality of connector holes including a connector hole 232 for receiving a connector (e.g., a USB connector) for transmitting/receiving power and/or data to/from an external electronic device and a connector hole 231 for transmitting/receiving data (e.g., audio signals) to/from the external electronic device may be implemented in the lower surface of the third housing 230. As another example, holes 233 (e.g., speaker holes and a microphone hole) for outputting and receiving sound may be implemented in the lower surface of the third housing 230. Some of the speaker holes 247a may be provided as a receiver hole for voice calls, and others may be provided as an external speaker hole. The microphone hole may have a microphone inside to obtain external sounds. According to an embodiment, there may be a plurality of microphones to be able to detect the direction of a sound. In an embodiment, the speaker holes and the microphone hole may be implemented as a single hole, or a speaker may be provided without speaker holes (e.g., a piezo speaker). Meanwhile, without limited to those shown, the above-described holes may be implemented in a side surface of the first housing 210, a side surface of the second housing 220, and a side surface of the third housing 230, as well as the lower surface of the third housing 230.

As another example, although not shown, an indicator (not shown) for providing various pieces of information may be disposed on the first structure 401 or the second structure 402, and the indicator may include a light emitting diode to provide state information about the electronic device 101 as a visual signal.

As another example, the sensor module (not shown) may be provided in the electronic device 101 to produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). According to another embodiment, the sensor module may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor. As described below with reference to FIGS. 35 and 36, the fingerprint sensor may be implemented to overlap the area where the second display 203 is disposed.

Another example of structural features of the electronic device 101 described above in connection with FIGS. 2A to 2C is described below with reference to FIG. 2D.

Figure 2D:
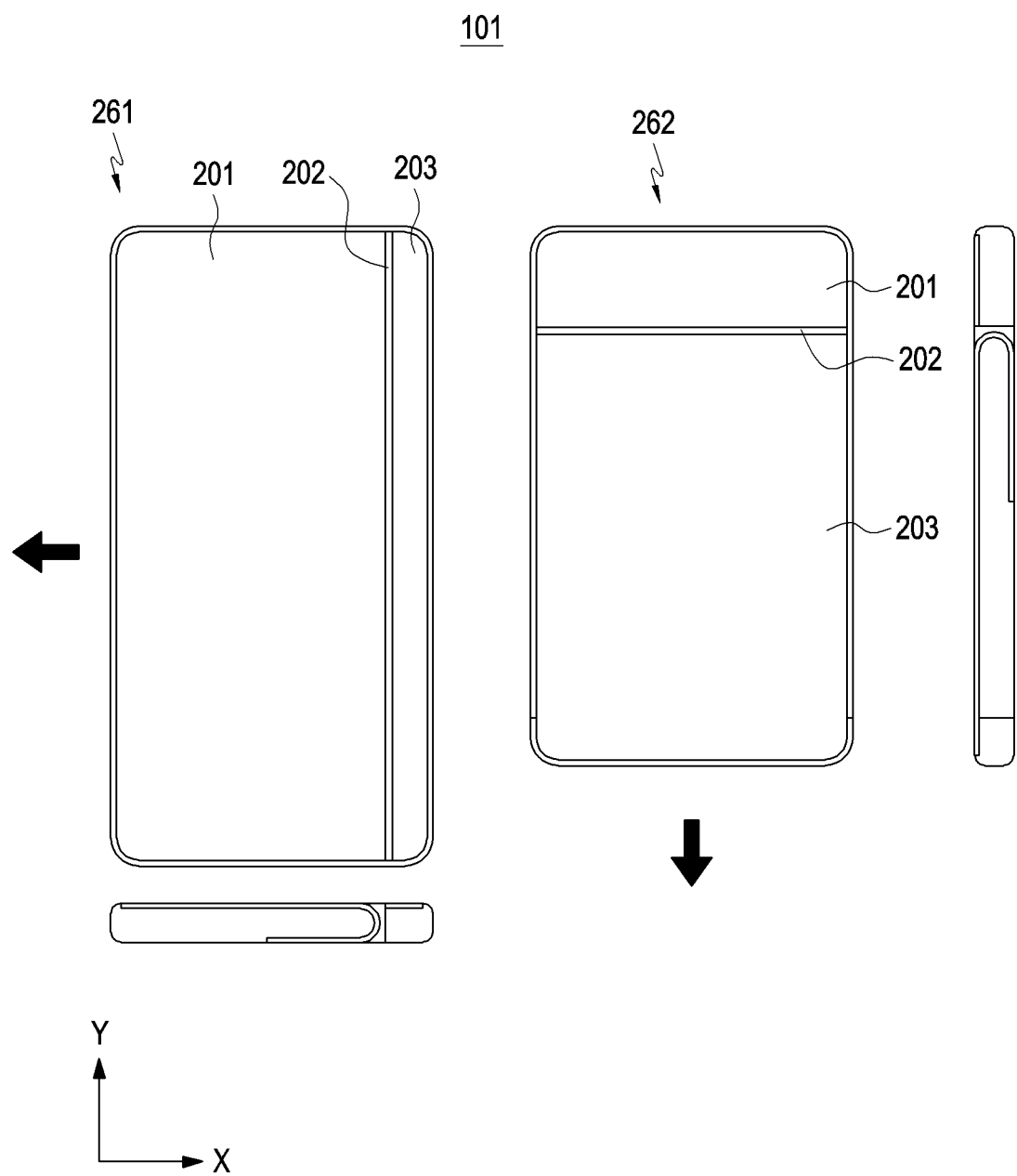
FIG. 2D is a view illustrating various implementations of an electronic device according to an embodiment of the disclosure.

FIG. 2D is a view illustrating various implementations of an electronic device according to an embodiment of the disclosure.

Referring to FIG. 2D, according to various embodiments, the first display 201 and the second display 203 provided in the electronic device 101 may be disposed in various examples. For example, as illustrated in 261 of FIG. 2D, the electronic device 101 may be implemented such that the first display 201 is disposed on the left side and the second display 203 is disposed on the right side. Further, without being limited thereto, the electronic device 101 may be implemented such that the first display 201 is disposed on the right side and the second display 203 is disposed on the left side. As another example, as shown in 262 of FIG. 2D, the second display 203 may be disposed on an upper side, and the first display 201 may be disposed on a lower side.

Although implemented in various manners as above, the electronic device 101 may be implemented to have the structural features described above in connection with FIGS. 2A to 2C. For example, as shown in 261 and 262 of FIG. 2D, the first display 201 and the second display 203 may be disposed so that the area of the second display 203 is maintained while the exposed area of the first display 201 is changeable.

Hereinafter, the electronic device described above with reference to FIGS. 2A, 2B, 2C, and 2D will be further described with reference to FIGS. 3A and 3B.

Figure 3A:
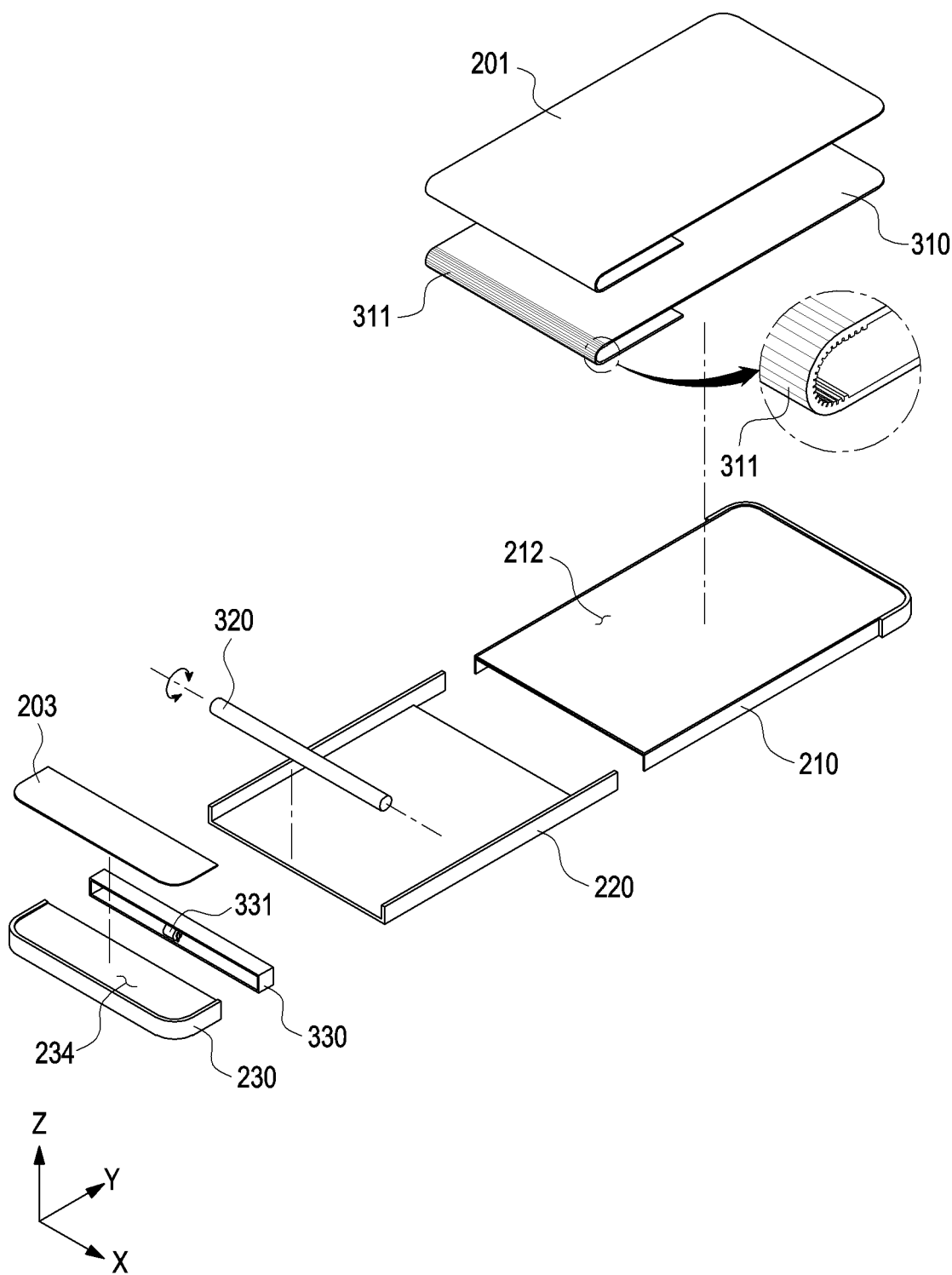
FIG. 3A is an exploded perspective view illustrating an electronic device (e.g., the electronic device shown in FIGS. 2A, 2B, and 2C) according to an embodiment of the disclosure.

FIG. 3A is an exploded perspective view illustrating an electronic device (e.g., the electronic device shown in FIGS. 2A to 2C) according to an embodiment of the disclosure. According to various embodiments, without being limited to the components illustrated in FIG. 3A, the electronic device may be implemented to include more or fewer components. For example, although not shown, a circuit board where the processor 120 described above with reference to FIG. 1 is implemented may be further included in the electronic device 101.

Figure 3B:
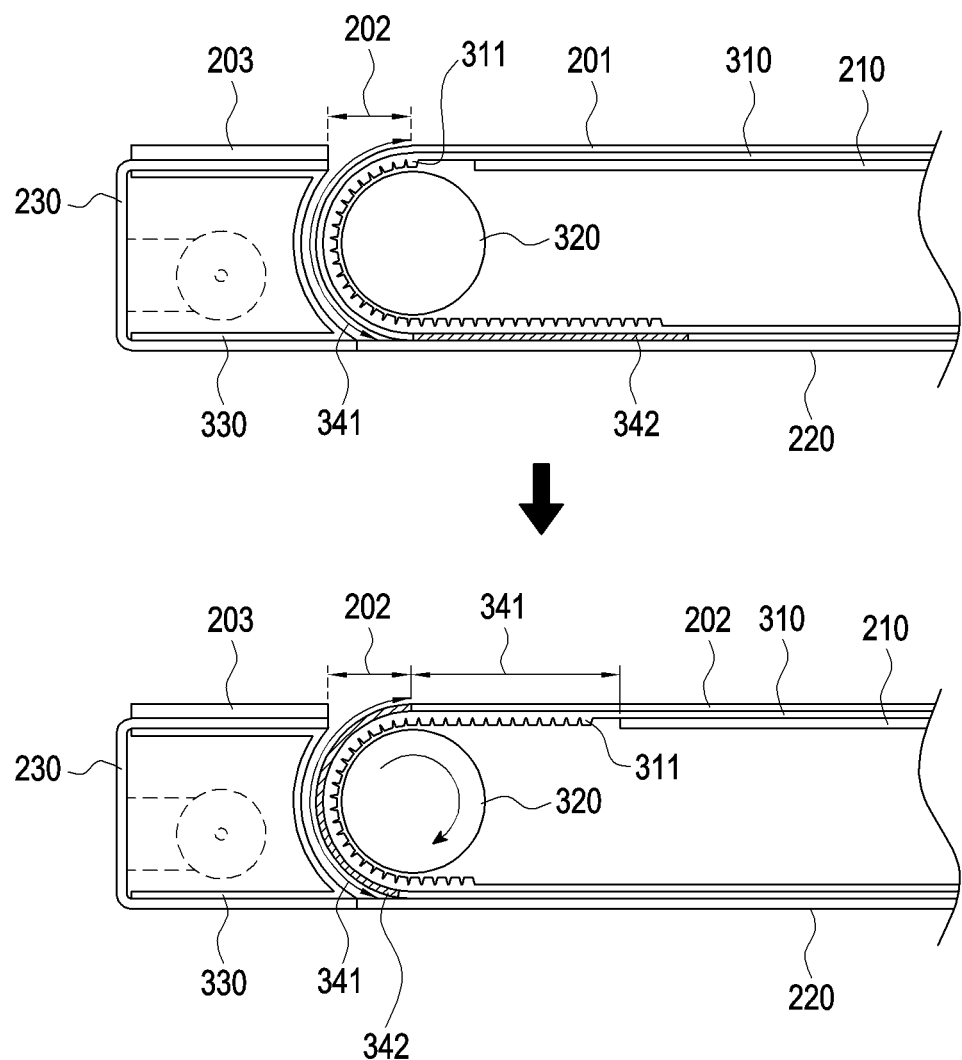
FIG. 3B is a view illustrating an example of a slide of a first display included in an electronic device according to an embodiment of the disclosure.
Figure 3C:
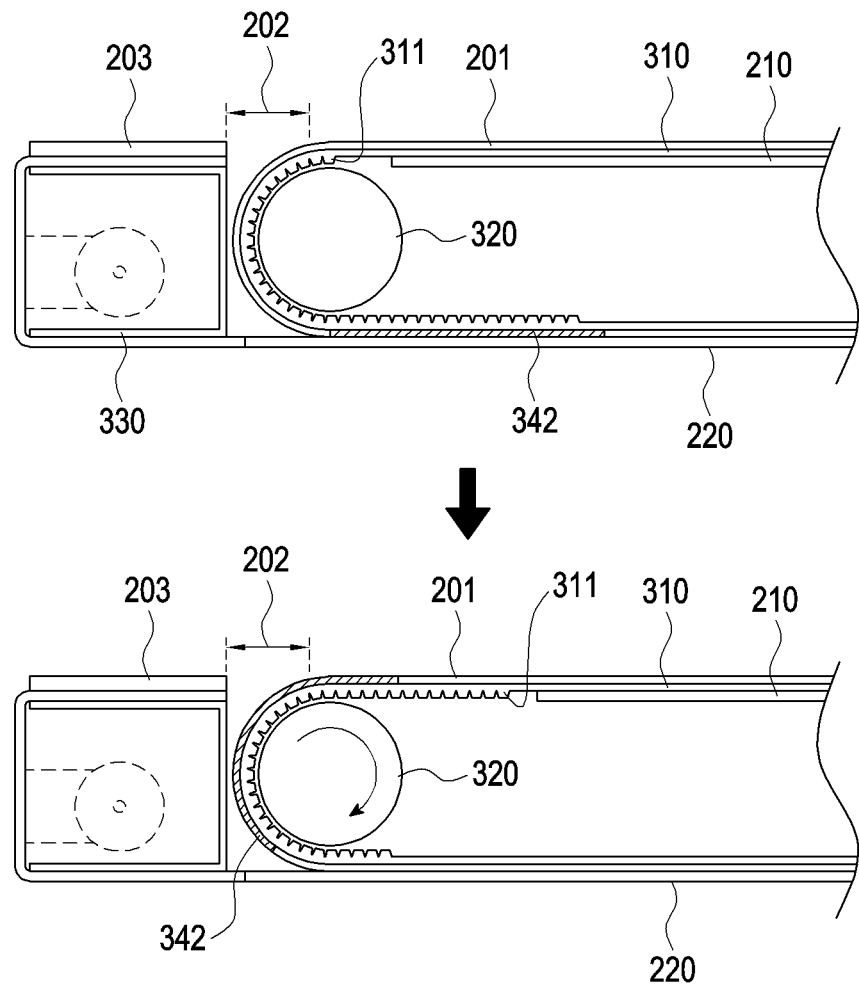
FIG. 3C is a view illustrating another example of a slide of a first display included in an electronic device according to an embodiment of the disclosure.

FIG. 3B is a view illustrating an example of a slide of a first display included in an electronic device according to an embodiment of the disclosure. FIG. 3C is a view illustrating another example of a slide of a first display included in an electronic device according to an embodiment of the disclosure.

Referring to FIG. 3A, an electronic device may include a first structure 210 (or first housing 210), a second structure 220 (or second housing 220), a third structure 230 (or third housing 230), a fourth structure 330 disposed in the third structure 230, a moving member (e.g., the servo motor 331) for moving the fourth structure 330, a first display 201, a second display 203, a guide member (e.g., the roller 320), and a plate 310 having a bendable area (e.g., the articulated hinge structure area 311 including a plurality of bars). A partial area (e.g., a bent area) of the first display 201 may be exposed to the outside of the third structure 230 or received in the third structure 230 according to the rotation of the roller 320. In this case, the state in which the first display 201 is maximally received in (or drawn in) the electronic device 101 (e.g., the third structure 230) (or the state in which the exposed area is minimal) may be defined as a "closed state," the state in which the first display 201 is maximally exposed to the outside of the electronic device 101 (or drawn out) (or the state in which the exposed area is maximal) may be defined as an "opened state," and the state in which the first display 201 has an area which is larger than the area corresponding to the closed state and is smaller than the area corresponding to the opened state may be defined as an "intermediate state." Hereinafter, each component included in the electronic device 101 is further described. Meanwhile, in the following description, the structures (e.g., the first structure 210, the second structure 220, and the third structure 230) may be coupled together or separated from each other, but at least some may be integrally implemented not to be separable from each other. For example, the second structure 220 and the third structure 230 may be integrally implemented.

According to various embodiments, the first structure 210 may include an area 212 where the first display 201 is disposed. The area 212 may be formed as a flat surface as shown in FIG. 3A or in the form of a protrusion on an inner wall of the first structure 210 to support the first display 201. Further, the first structure 210 may include a portion (e.g., a bracket (not shown)) where the plate 310 is mounted. The bracket may be formed of, e.g., a metal and/or non-metal material (e.g., polymer). At least a portion of the plate 310 (e.g., the remaining area except for the bendable area (e.g., the articulated hinge structure area 311)) may be mounted on the bracket of the first structure 210, forming one surface along with the first structure 210. As a portion of the plate 310 is mounted on the first structure 210, at least a portion (e.g., the externally exposed area) of the first display 201 may be disposed on the formed surface. At least a portion (e.g., the remaining area except for the bendable area) of the plate 310 disposed on the first structure 210, along with the first structure 210, may be moved in one direction according to the rotation of the roller 320, so that at least a portion (e.g., the exposed area) of the display may be drawn in the electronic device 101 (e.g., inside the third structure 230), or the remaining portion (e.g., received area) of the first display 201 may be exposed to the outside. A component (e.g., a support sheet) capable of being wound by the roller 320 may be implemented in the remaining portion (e.g., bendable area) of the plate 310 so that the first structure 210 and the plate 310 are moved as the roller 320 rotates, and this is described below with reference to FIG. 3B. Meanwhile, without limited to those shown, the plate 310 may be implemented integrally with the first structure 210. As another example, at least a portion of the first structure 210 may be implemented with a smaller width than the remaining portion (e.g., upper portion). For example, at least a portion of the first structure 210, disposed on the second structure 220, may be implemented with a width corresponding to the distance between the inner surface of the left sidewall and inner surface of the right sidewall of the second structure 220 described below. Accordingly, at least a portion of the first structure 210 is disposed on the second structure 220 so that the first structure 210 may be slid on the second structure 220.

According to various embodiments, the second structure 220 may support the first structure 210, the roller 320, the remaining portion (e.g., bendable area) of the plate 310, and the remaining portion (e.g., the area received in the electronic device 101) of the first display 201. For example, the second structure 220 may include a lower wall and sidewalls provided on the left and right sides of the lower wall, and the lower wall forms an inner surface, and the upper side and lower side, and the upper portion may be open. Accordingly, the first structure 210 may be disposed (or supported) on the inner surface of the lower portion of the second structure 220 to be slidable through the second structure 220. When the first structure 210 is disposed on the second structure 220, the outer walls of at least some of at least a portion of the first structure 210 may be disposed to respectively face (or contact) the inner surfaces of the left and right sidewalls of the second structure 220. For example, as the width of the first structure 210 is implemented to be smaller than the width of the second structure 220, the first structure 210 may be inserted into the second structure 220. In a state in which the first display 201 of the electronic device is maximally received in the electronic device 101 (e.g., closed state), the remaining portion (e.g., upper portion) of the first structure 210 may contact the upper surface of the sidewall of the second structure 220. When the first display 201 slides out to the outside of the electronic device 101, the distance between the upper surface of the sidewall of the second structure 220 and the remaining portion of the first structure 210 increases, so that the first structure 210 may slide on the second structure 220 in one direction through the space formed on the second structure 220. Further, at least a portion of the plate 310 coupled to the first structure 210 along with the first structure 210 and at least a portion of the first display 201 disposed on the plate 310 may be disposed on the second structure 220. For example, the sidewalls of the second structure 220 may include a coupling portion (not shown) rotatably coupled with the roller 320 and, in a state in which the roller 320 is coupled to the second structure 220, and the first structure 210 is disposed on the second structure 220, the remaining portion (e.g., bendable area) of the plate 310 and the remaining portion (e.g., the area received in the electronic device 101) of the first display 201 may be positioned between the roller 320 and the second structure 220. For example, a partial area of the first display 201 and the remaining portion of the plate 310 where the partial area of the first display 201 is disposed may be positioned so that the partial area of the first display 201 is positioned between the roller 320 and the second structure 220 to face the surface of the lower wall of the second structure 220. Meanwhile, according to an implementation, the lower wall of the second structure 220 may be implemented of a transparent material, and content may be displayed in the partial area of the first display 201 to be viewed by the user. In this case, the area corresponding to (e.g., adjacent to) the roller 320 of the first display 201 and the plate 310 may be bent. For example, the plurality of bars included in the articulated hinge structure area of the plate 310 may be disposed to form a curvature corresponding to the curvature of the roller 320, and the area of the first display 201 disposed on the articulated hinge structure area may also be bent with the curvature corresponding to the roller 320. The second structure 220 may further include a driving unit (e.g., a motor) for rotating the roller 320. Or, without limited to those described, without a driving unit, the roller 320 may be rotated by an external force (e.g., the force by which the user pulls the first structure 210). Hereinafter, a slide-out and a slide-in of the first structure 210 and the first display 201 coupled to the second structure 220 based on the rotation of the roller 320 of the second structure 220 are described.

According to various embodiments, as shown in FIGS. 3B and 3C, the first display 201 may be a first display 201 based on organic light emitting diodes and normally remains flat while being able to be at least partially curved. For example, a component (e.g., support sheet) capable being wound by the roller 320 may be provided in a partial area (e.g., the articulated hinge structure area 311) of the plate 310 where the first structure 210 is disposed. According to various embodiments, the support sheet 153 may be implemented of a material having flexibility and a certain degree of elasticity (e.g., a material including an elastic body such as silicone or rubber) and be mounted or attached to the roller 320 to be selectively wound around the roller 320 as the roller 320 or 451 rotates. Further, the support sheet may have a structure and shape (e.g., protrusion, recess) to be mounted or attached to the roller 320 as shown in FIGS. 3B and 3C. Accordingly, when the roller 320 rotates, the support sheet may be rolled around the outer circumferential surface of the roller 320, and the portion of the first display 201, disposed in the portion of the plate 310 corresponding to the support sheet (e.g., where the support sheet is implemented) may also be rolled (or bent). Further, when the support sheet escapes from the outer circumferential surface, the portion of the first display 201 disposed on the portion of the plate 310 corresponding to the support sheet escaping from the outer circumferential surface of the roller 320 may together be flattened and moved in one direction. For example, as shown in FIGS. 3B and 3C, when the roller 320 rotates in one direction (e.g., clockwise direction), the support sheet of the plate 310 may be wound in the direction corresponding to the rotating direction of the roller 320 so that the plate 310 and the first display 201 disposed on the plate 310 may be moved in one direction through the space 202 between the fourth structure 330 and the first display 201. Accordingly, the area 342 of the flexible display, received in the electronic device 101, may be exposed to the outside. The shape (FIGS. 3B and 3C) of the fourth structure 330 is described below when describing the third structure 230. The first structure 210 coupled with the plate 310 may be moved in one direction together with the movement of the plate 310 in one direction, and the first display 201 may be slid in one direction. In contrast, when the roller 320 rotates in the other direction (e.g., counterclockwise direction), the support sheet may be wound in the direction corresponding to the rotating direction of the roller 320 so that the plate 310 and the first display 201 may be moved in different directions. Together with the movement of the plate 310 in one direction, the first structure 210 coupled with the plate 310 may be moved in the other direction, and the first display 201 may be slid in in the other direction. The motor may be driven to rotate the roller 320 according to the control of the processor of the electronic device 101 as an event for sliding out or sliding in the first display 201 occurs.

As described above, the roller 320 and the plate 310 may suppress excessive deformation of the first display 201 by maintaining the radius of curvature of the first display 201 when drawing in and out (or taking out) the first display 201 and reducing friction against another structure (e.g., the first structure 210). The term "excessive deformation" may mean that the first display 201 is deformed to have a radius of curvature that is too small to damage pixels or signal lines included in the first display 201.

According to various embodiments, the third structure 230 may include a surface 234 (e.g., an upper surface) on which the second display 203 is disposed. An internal space in which the fourth structure 330 and components (e.g., a servo motor 331 and a sensor) for moving the fourth structure 330 are provided may be formed in the third structure 230. As another example, the third structure 230 may include an upper wall where the surface on which the second display 203 is disposed is formed, a lower wall facing the upper wall, and walls formed on the left side, right side, and lower side between the upper wall and the lower wall. The height (e.g., the height in the z-axis direction) of the upper wall of the third structure 230 may be implemented to be relatively lower (e.g., lower by the thickness of the second display 203) than the height (e.g., the height in the z-axis direction) of the disposed first display 201 so that the height (e.g., the height in the z-axis direction of the upper surface of the disposed display) of the second display 203 disposed on the upper wall of the third structure 230 corresponds to (e.g., equal) the height (e.g., the height in the z-axis direction of the upper surface of the disposed display) of the first display 201. Structures (e.g., brackets) for coupling with the second structure 220 may be formed on the left wall and right wall of the third structure 230 and, in a state in which the third structure 230 and the second structure 220 are coupled together, the position of the third structure 230 may be fixed although the first structure 210 is slid. Accordingly, the exposed area of the second display 203 is maintained while the exposed area of the first display 201 alone may be adjusted. The above-described fourth structure 330 may be disposed in the internal space of the third structure 230, formed by the walls (e.g., the upper wall, lower wall, left wall, and right wall) of the third structure 230. One surface of the fourth structure 330 may be implemented to have a curvature corresponding to the curvature of the area corresponding to the roller 320 of the first display 201 and, when the third structure 230 is coupled with the second structure 220, one surface of the fourth structure 330 may face the area 341 corresponding to the roller 320 of the first display 201 as shown in FIGS. 3B and 3C. One surface of the fourth structure 330 may be implemented to have a curvature corresponding to the curvature of the bent area 341 of the first display 201 as shown in FIG. 3B or be implemented to have a flat shape as shown in FIG. 3C. When the shape of one surface of the fourth structure 330 has a curvature as shown in FIG. 3B, the area 341 corresponding to the roller 320 of the first display 201 may be positioned under the lower surface of the upper wall of the third structure 230. Further, as shown in FIG. 3C, when the shape of one surface of the fourth structure 330 is implemented in a flat panel shape, the first display 201 may be positioned outside the third structure 230 and, when observed in a direction perpendicular to the electronic device 101, no area where the first display 201 and the second display 203 overlap each other may occur. When a slide-out and a slide-in of the first display 201 are performed, the fourth structure 330 may be moved according to the operation of the servo motor 331 and the sensor, which is described below with reference to FIG. 5.

Meanwhile, without limited to those shown in FIG. 3A, without implementing the upper wall of the third structure 230, the second display 203 may be disposed in the opening of the third structure 230, and the heights (e.g., the heights in the z-axis direction) of the second display 203 and the first display 201 may correspond to each other (e.g., equal). In this case, a predetermined member may be provided between it and the lower wall of the second display 203, and the second display 203 may be disposed on the predetermined member. Further, without limited to those described, although the member is not provided, the height of the second display 203 disposed in the opening of the third structure 230 may correspond to (e.g., equal) the height of the first display 201.

Hereinafter, an example of the electronic device 101 described above in connection with FIGS. 2A to 2D and 3A to 3C is further described.

Figure 4:
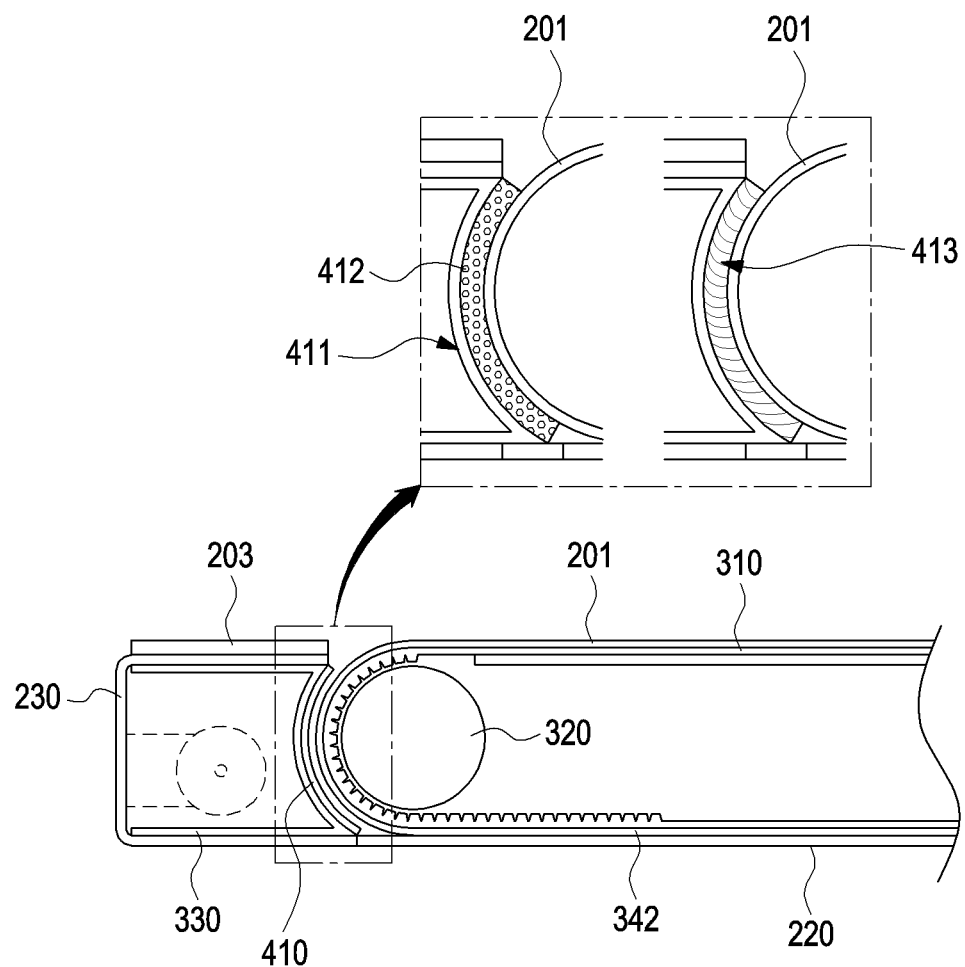
FIG. 4 is a view illustrating an example of a member provided between a fourth structure and a first display according to an embodiment of the disclosure.

FIG. 4 is a view illustrating an example of a member provided between a fourth structure and a first display according to various embodiments.

Referring to FIG. 4, the electronic device 101 may further include a member 410 provided between the fourth structure 330 and the first display 201 in a state in which the plurality of housings (e.g., the first housing 210, the second housing 220, and the third housing structure 230) are coupled together. For example, the member 410 may be provided on the surface facing the bent area received in the electronic device 101 of the first display 201 of the fourth structure 330. The member 410 may be positioned in the space where the first display 201 and the fourth structure 330 are spaced apart from each other and contact the first display 201, preventing a foreign body from entering the electronic device 101. The member 410 may include a member having an air gap 412 as shown in 411 of FIG. 4 or a brush-shaped brush member as shown in 413 of FIG. 4. The first display 201 may slide while in contact with the member 410. Accordingly, the foreign body present on the first display 201 may be removed by the member 410.

Hereinafter, an example of the electronic device 101 described above in connection with FIGS. 2A to 2D and 3A to 3C is further described.

Figure 5:
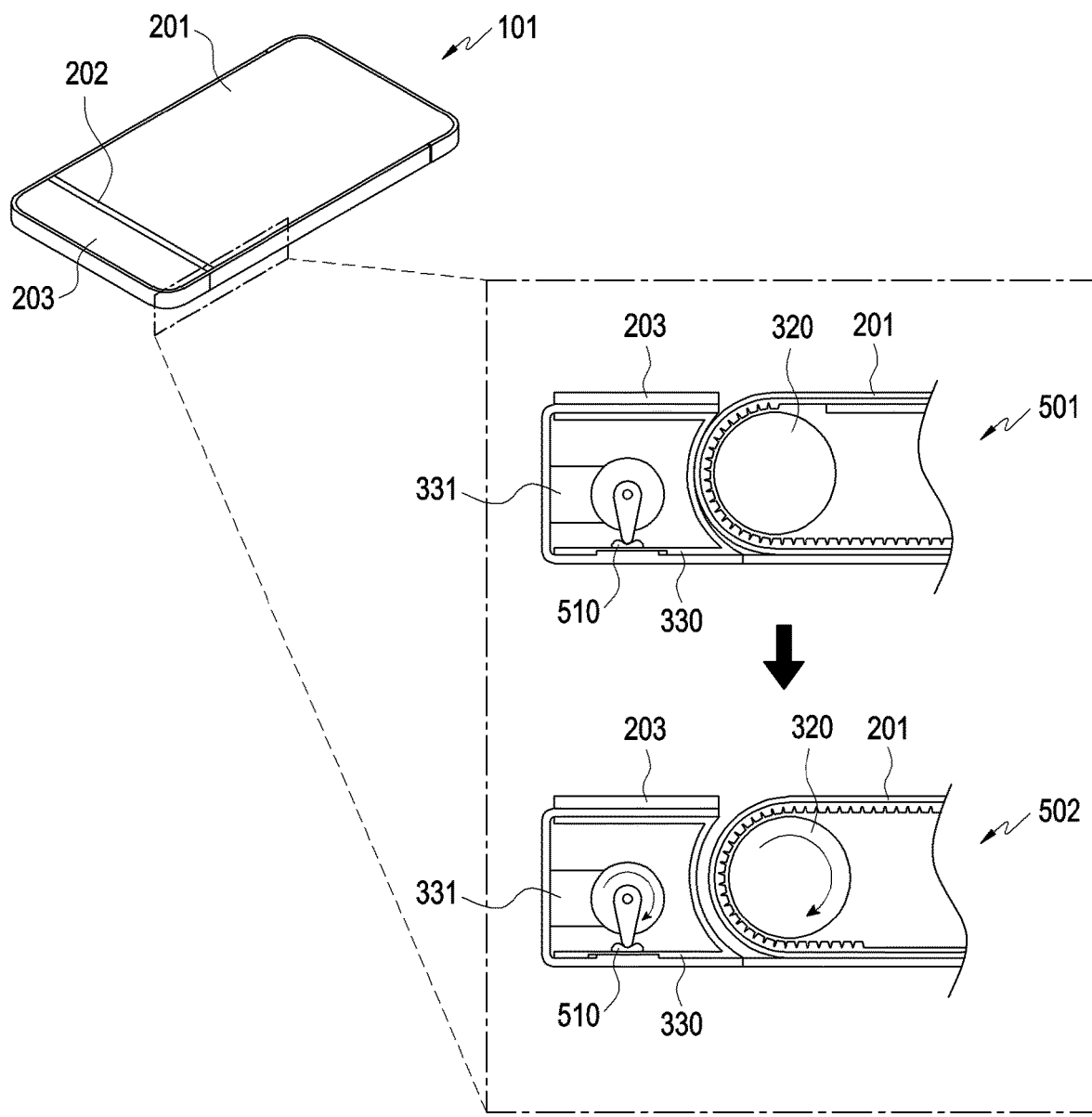
FIG. 5 is a view illustrating an example of components (e.g., servo motor and sensor) for moving a fourth structure according to an embodiment of the disclosure.

FIG. 5 is a view illustrating an example of components (e.g., servo motor and sensor) for moving a fourth structure according to an embodiment of the disclosure.

Referring to FIG. 5, according to various embodiments, the electronic device 101 may further include a moving member (e.g., the servo motor 331) for moving the fourth structure 330, provided in the third structure 230 where the second display 203 is disposed. The servo motor 331 may include a handle that is rotated by a predetermined rotation angle in a specific direction (e.g., the clockwise direction or counterclockwise direction) when driven, and a portion (e.g., groove 510) contacting the handle of the servo motor may be implemented in the upper surface of the lower wall of the fourth structure 330. Further, a groove (or recess) may be formed in the lower surface of the lower wall of the fourth structure 330 to be moved in the third structure 230, and a protrusion may be formed on the surface of the third structure 230 to correspond to the groove. In contrast, a protrusion may be formed in the fourth structure 330, and a groove may be formed in the third structure 230. Referring to 501 and 502 of FIG. 5, as the servo motor 331 is driven, the handle provided in the servo motor 331 may be rotated in one direction (e.g., clockwise direction), and an external force may be applied to the groove 510 of the fourth structure 330 in the direction (e.g., left direction) corresponding to the one direction to move the fourth structure 330 in one direction. In contrast, when the handle is rotated in a different direction, the fourth structure 330 may be moved in the direction corresponding to the different direction. The electronic device 101 may control the moving member (e.g., the servo motor 331) based on an occurrence of an event for moving the fourth structure 330, which is described below in connection with FIGS. 8, 9A, and 9B.

Hereinafter, an example of the electronic device 101 described above in connection with FIGS. 2A to 2D, 3A to 3C, 4, and 5 is further described with reference to FIG. 6A.

Figure 6A:
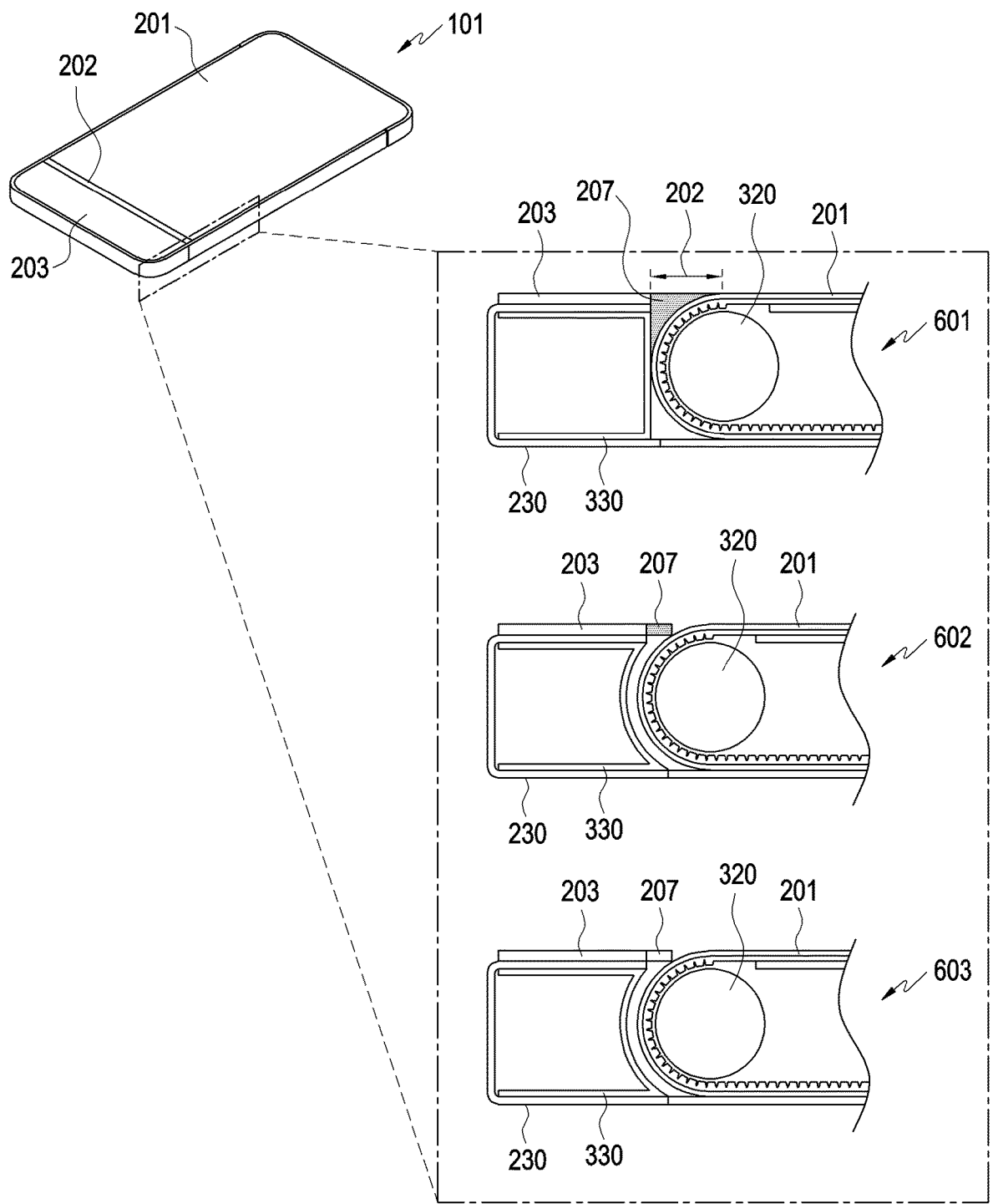
FIG. 6A is a view illustrating an example of a member provided in an electronic device according to an embodiment of the disclosure.

FIG. 6A is a view illustrating an example of a member provided in an electronic device according to an embodiment of the disclosure.

Figure 6B:
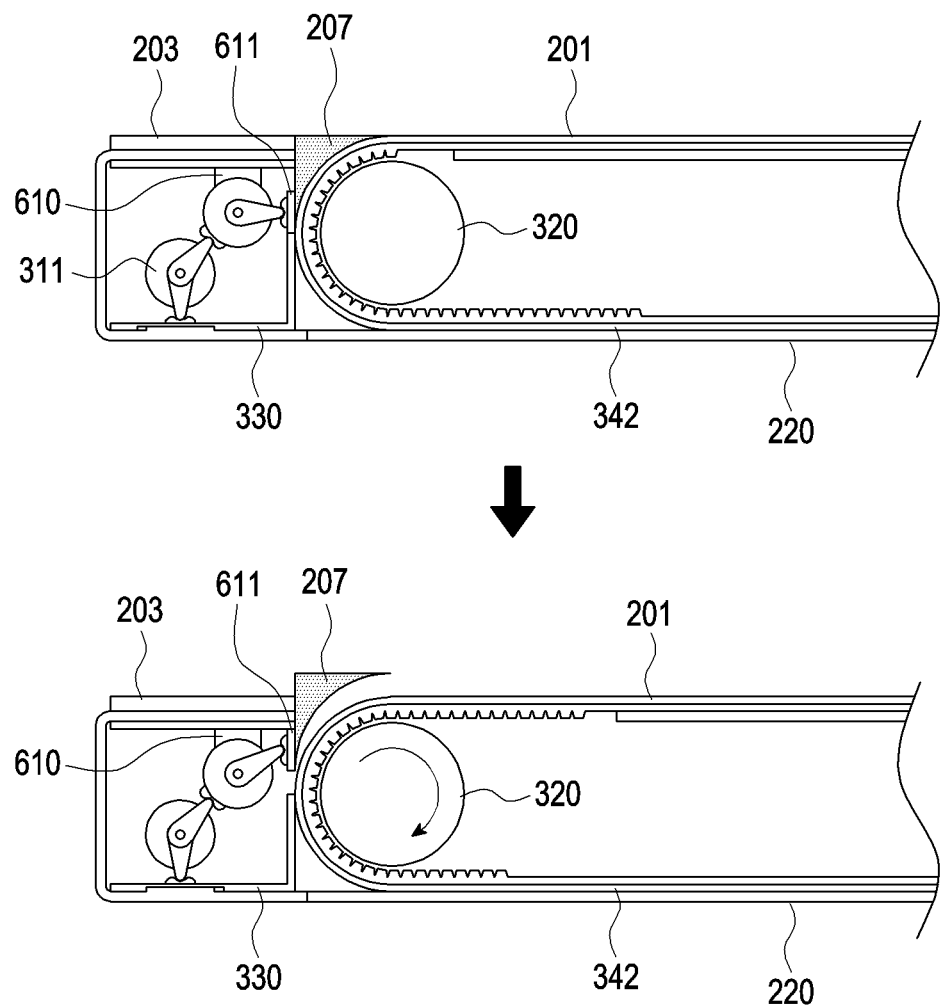
FIG. 6B is a view illustrating an example of members for moving a member provided in an electronic device according to an embodiment of the disclosure.

Referring to FIG. 6A, according to various embodiments, the electronic device 101 may further include a member 207 disposed in the space 202 between the first display 201 and the second display 203. The member 207 may have a length and width corresponding to the space 202, have a length shorter than the first display 201 and the second display 203, and have a width corresponding to the first display 201 and the second display 203. For example, the member 207 may be a member having a material (e.g., a metal or metal structure or plastic) and color corresponding to at least one of the first structure 210, the second structure 220, or the third structure 230. As another example, the member 207 may be an optical member that diffuses the light incident on the member 207 and is implemented with a transparent material. Referring to FIGS. 6A and 6B, the upper surface of the member 207, along with the exposed area of the first display 201 and the area of the second display 203, may form one plane. For example, no step may be formed between one surface of the member 207, the surface of the second display 203, and the surface of the first display 201. Accordingly, the electronic device 101 may be viewed by the user as if it includes a single display. Hereinafter, embodiments of the member 207 are described.

For example, as shown in 601 of FIG. 6A, the member 207 may be provided in the third structure 230. The member 207 may be provided to be attached to one surface adjacent to the first display 201 of the first structure 210 provided in the third structure 230, the surface of the upper wall of the third structure 230, and the side surface of the second display 203. At least a portion of the lower surface of the member 207 may be implemented to have a curvature corresponding to the curvature of the bent area of the first display 201.

As another example, as shown in 602 of FIG. 6A, the member 207 may be implemented in the form of extending from the second display 203. For example, the second display 203 may include an area including components for the display and an area including the member 207. The area including the member 207 of the second display 203 may be positioned to extend without being supported on the upper surface of the third structure 230.

As another example, as shown in 603 of FIG. 6A, the member 207 may be a flat panel-shaped member and be implemented to be coupled and supported by the first structure 210 or third structure 230 on the space 202 between the first display 201 and the second display 203.

Hereinafter, various features of the member 207 are described.

According to various embodiments, the member 207 may have a surface (e.g., lower surface) facing the received area of the first display 201. For example, as shown in FIG. 6A, the member 207 may have a lower surface having a curvature corresponding to the curvature of the area connected to the exposed area of the first display 201, of the area corresponding to the roller 320 of the first display 201. As described below, as the electronic device 101 outputs light to the area of the first display 201 corresponding to the lower surface of the member 207, the light may be diffused by the optical member 207 and viewed by the user. Members contacting the upper surface of the first display 201 may further be provided on the lower surface of the member 207. The members may include a member having an air gap as shown in 411 of FIG. 4 or a brush-shaped brush member as shown in air gap 412 of FIG. 4, as described above.

According to various embodiments, the member 207 may include a light blocking area. The light blocking area may be an area including a material having an optical property to block light. The material may include a paint applied to the surface of the optical member, or a liquid or powder material added to the optical member. Accordingly, the light incident on the member 207 may be blocked by the light blocking area of the member 207. An area that does not contain a paint and thus does not block light, unlike the light blocking area, may be defined as a non-light blocking area (or light receiving area). According to an embodiment, at least a partial area of the member 207 may be formed as a light blocking area. For example, only a portion of the area of the member 207 facing the first display 201 may be implemented as a light blocking area, and only the remaining area may be implemented as a non-light blocking area. Accordingly, light is blocked by the paint in a partial area of the area facing the first display 201 of the member 207 and be incident on the member 207 only through the remaining area. Accordingly, only the light received through the remaining area of the member 207 may be diffused by the member 207. As described above, the light received through the partial area may be blocked, so that the quantity of light incident on the member 207 may be limited, preventing light leakage. The electronic device 101 may identify a specific area of the first display 201 corresponding to the non-light blocking area of the member 207 and output light to the identified specific area, which is described below with reference to FIGS. 45 to 54. As another example, the portion contacting the third structure of the member 207 may be implemented as the light blocking area. Accordingly, the light output from the second display 203 may not be incident on the second display 203. Further, without limited to those described, the member 207 may have the portion contacting the second structure implemented as the non-light blocking area and the portion facing the first display 201 implemented as the light blocking area, so that the light output through the second display 203 may be incident on the member 207 and be diffused, and be viewed by the user.

Hereinafter, an example configuration of the electronic device 101 for moving the member 207 is described with reference to FIG. 6B.

FIG. 6B is a view illustrating an example of members for moving a member provided in an electronic device according to an embodiment of the disclosure.

According to various embodiments, upon detecting a slide of the first display 201, the electronic device 101 may perform the operation of moving the member 207 upward to secure a more space for moving the first display 201 between the first display 201 and the member 207.

Referring to FIG. 6B, the electronic device 101 may further include moving members (e.g., a groove 611 formed in the member 207 or the servo motor 610) for moving the member 207 disposed between the first display 201 and the second display 203. The servo motor 610 may include a handle that is rotated in one direction to move the member 207. The member 207 may have a portion where the groove 611 for connecting to the handle is formed, and a partial area of the fourth structure 330 may be open so that the area having the groove 611 is moved. Accordingly, when the servo motor 610 rotates the handle in one direction (e.g., counterclockwise direction), the portion having the groove 611 may be moved upwards so that the member 207 may be moved upwards.

According to various embodiments, referring to FIG. 6B, the moving members (the groove 611 formed in the member 207, servo motor 610) for moving the member 207 may interwork with the moving member (e.g., the servo motor 331) for moving the above-described fourth structure 330. For example, the servo motor 331 (hereinafter, a first servo motor) for moving the fourth structure 330 may further include a handle for rotating the servo motor 610 (hereinafter, a second servo motor) for moving the member 207. When the first servo motor 331 rotates the further included handle in one direction (e.g., clockwise direction), the handle provided in the second servo motor 610 may be rotated in the opposite direction (e.g., counterclockwise direction) so that the member 207 may be moved upwards. Accordingly, referring to FIG. 6B, when the first display 201 is moved, not only the space between the fourth structure 330 and the first display 201 but also the space between the member 207 and the first display 201 may further be extended, further smoothing the slide of the first display 201.

Hereinafter, an example of the components included in the electronic device 101 described above in connection with FIGS. 1, 2A to 2D, 3A to 3C, 4, 5, 6A, and 6B is described with reference to FIGS. 7A to 7C.

Figure 7A:
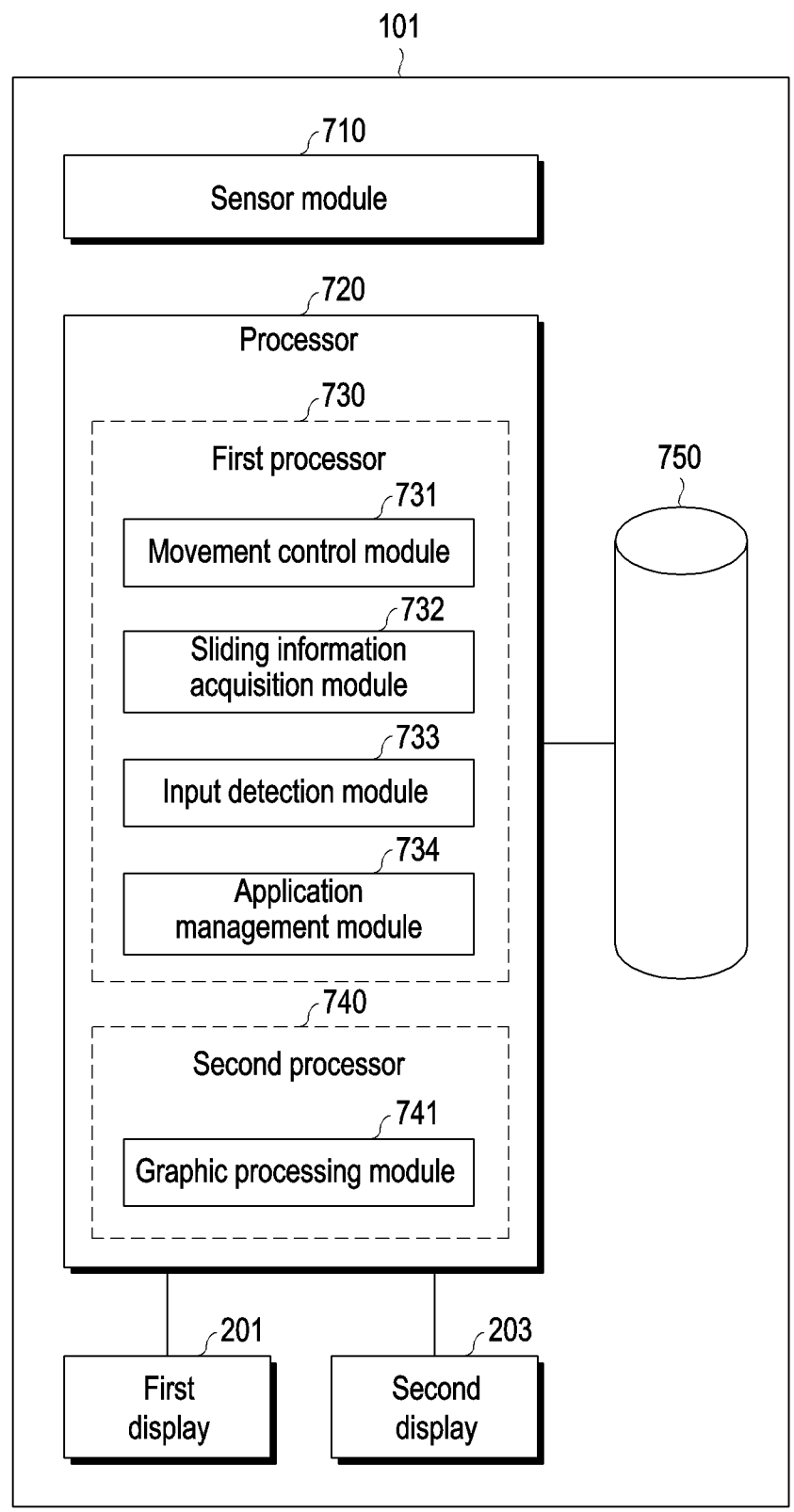
FIG. 7A is a view illustrating an example of a configuration of an electronic device according to an embodiment of the disclosure.

FIG. 7A is a view illustrating an example of a configuration of an electronic device according to an embodiment of the disclosure. FIG. 7B is a view illustrating an example of an operation for detecting a touch on a plurality of displays (e.g., first display and second display) of an input detection module of an electronic device according to an embodiment of the disclosure. FIG. 7C is a view illustrating an example of an operation of an application management module of an electronic device according to an embodiment of the disclosure.

Figure 7B:
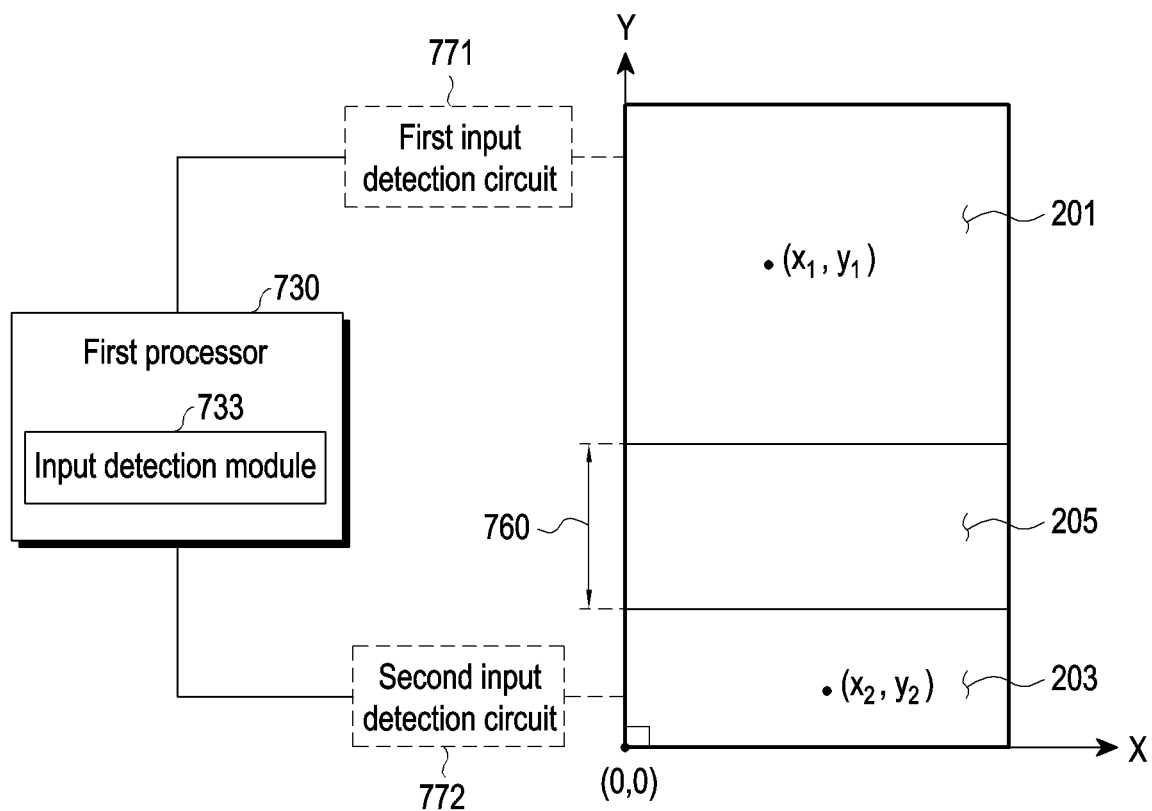
FIG. 7B is a view illustrating an example of an operation for detecting a touch on a plurality of displays (e.g., first display and second display) of an input detection module of an electronic device according to an embodiment of the disclosure.
Figure 7C:
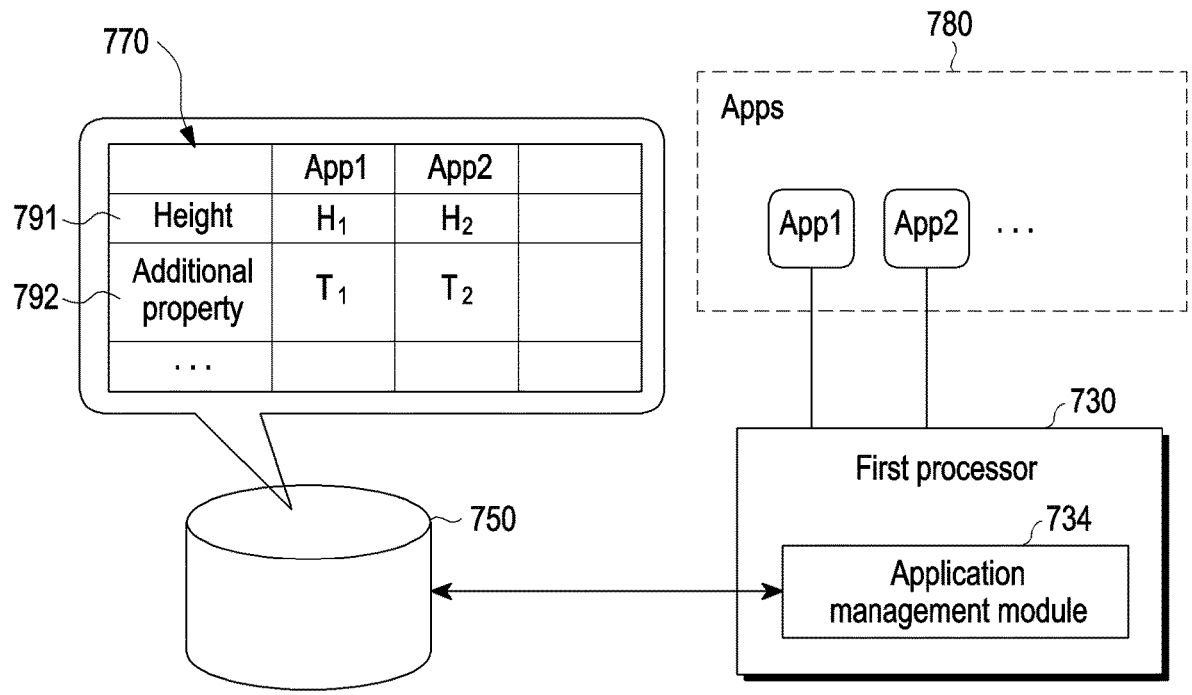
FIG. 7C is a view illustrating an example of an operation of an application management module of an electronic device according to an embodiment of the disclosure.

Referring to FIGS. 7A to 7C, according to various embodiments, an electronic device 101 may include a sensor module 710, a first processor 730 including a movement control module 731, a movement information acquisition module 732, an input detection module 733, and an application management module 734, a second processor 740 including a graphic processing module 741, a memory 750, a first display 201, and a second display 203. According to various embodiments, at least some of the modules (e.g., the movement control module 731, the movement information acquisition module 732, the input detection module 733, and the application management module 734) included in the processor 720 (e.g., the first processor 730 and the second processor 740) of the electronic device 101 (e.g., the electronic device 101 described in connection with FIGS. 1, 2A to 2D, 3A to 3C, 4, 5, 6A, and 6B) may be implemented (e.g., executed) in software, firmware, hardware, or a combination of at least two or more thereof. For example, the modules may be stored in the electronic device 101 (e.g., the memory 750) in the form of an application, program, computer code or instructions, routines, or process executable by the processor 720 of the electronic device 101 (e.g., the electronic device 101 described in connection with FIGS. 1, 2A to 2D, 3A to 3C, and 4). When the modules are executed by the processor 720, the modules may cause the processor 720 to perform an operation associated with the module. Hereinafter, each component included in the electronic device 101 is described.

First, the sensor module 710 is described.

According to various embodiments, the sensor module 710 may include at least one sensor. When the first display 201 slides (e.g., slide-in and slide-out), the at least one sensor may sense the slide of the first display 201 and return an electrical value (e.g., current and/or voltage value) indicating the state of the slide. The processor 720 (e.g., the first processor 730), which is described below, may obtain the electrical value to identify the state associated with the slide. For example, the state associated with the slide may include at least one of the start or end of the slide of the first display 201, a state of the electronic device 101 according to the slide (e.g., an open state, a closed state, or an intermediate state), or the sliding distance. For example, the at least one sensor may be implemented as a sensor (e.g., the image sensor or an optical sensor) for detecting specific content (e.g., a red green blue (RGB) color) displayed in a partial area of the received portion of the first display 201, identify a change in the detection state of the specific content (e.g., a movement of the content or non-display of the content) when the first display 201 is moved, and return an electrical value indicating the start of the slide. In this case, if the slide is finished, the electronic device 101 may redisplay specific content in the partial area of the received portion of the first display 201, and the at least one sensor may detect the redisplayed content and return an electrical value indicating the end of the slide. As another example, the at least one sensor may include a sensor that detects an electromagnet which is attached when the slide of the first display 201 is started or ended and, when the slide starts or ends, return an electrical value indicating the start or end. As another example, the at least one sensor may be implemented as a sensor (e.g., a pressure sensor, a resistance sensor, etc.) for detecting a dielectric that is moved when the first display 201 slides and may return an electrical value indicating the sliding distance based on the moving distance of the dielectric.

Meanwhile, without being limited to the above description, instead of receiving a value from the at least one sensor, the electronic device 101 may identify the state associated with the slide of the first display 201 based on a signal for controlling the motor for rotating the roller (e.g., the roller 320) of a movement control module 731 described below.

The processor 720 is described below. The processor 720 may control the overall operation of the electronic device 101. For example, the processor 720 may be an application processor (AP). The processor 720 may include processors (e.g., the first processor 730 and the second processor 740) implemented to perform different functions. For example, the first processor 730 included in the processor 720 may be a central processing unit (CPU), and the second processor 740 may be a graphic processing unit (GPU). Without being limited thereto, the processor 720 may not include the plurality of processors (e.g., the first processor 730 and the second processor 740). For example, the processor 720 may not include separate processors but may be implemented to include all of the modules (e.g., the movement control module 731, the movement information acquisition module 732, the input detection module 733, the application management module 734, and the graphic processing module 741) included in the first processor 730 and the second processor 740 and to perform comprehensive operation based on each of the modules.

Hereinafter, the modules included in the first processor 730 are described. The first processor 730 may identify/obtain/analyze predetermined information (e.g., an electrical value indicating the state associated with a slide received from at least one sensor and content obtained as the application or program is executed) according to the driving of the electronic device 101 and overall control the operation of the components (e.g., motor and displays) of the electronic device 101.

According to various embodiments, the movement control module 731 may control the slide (e.g., slide-out and slide-in) of the first display 201. For example, the movement control module 731 may identify an occurrence of an event to trigger a slide of the first display 201 and perform a slide (e.g., controlling the motor to rotate the roller 320) of the first display 201 based on identifying the occurring event. The event to trigger the slide may include the turn-on/off of the electronic device 101, reception of a user input (e.g., a user input to a key to trigger a slide, as implemented physically or electronically), or other preset events (e.g., execution of an application described below). The movement control module 731 may identify at least one of the type of the slide (e.g., slide-out or slide-in) or information about the sliding length (or distance) corresponding to the event based on the occurrence of the event to trigger the slide and control the motor to rotate the roller 320 based on the identified information. For example, the movement control module 731 may transfer a signal for driving the motor as many as rotations corresponding to the sliding length to the motor in the direction corresponding to the identified type of the slide. Accordingly, as the motor is rotated as many as rotations, the first display 201 may be slid in the sliding length. As another example, the movement control module 731 may rotate the motor in the direction corresponding to the identified type of slide, real-time detect the distance in which the flexible display is moved according to the rotation of the motor (e.g., calculate the distance based on the value identified from at least one sensor), and when the real-time detected distance reaches the distance to move, stop driving the motor.

According to various embodiments, the movement information acquisition module 732 may identify information associated with the slide of the first display 201 when the first display 201 slides. The information associated with the slide may include information about the time (e.g., movement start time and moved time) associated with the slide of the first display 201, information about the distance (or length) associated with the slide of the first display 201, and information about the type (e.g., slide-out (drawn out) or slide-in (drawn in)) of the slide of the first display 201. The movement information acquisition module 732 may obtain the state associated with the slide based on the electrical value received from the above-described at least one sensor and identify the above-described information about the slide. Meanwhile, without limited to those described, as described above, the processor (e.g., the first processor 730) may identify the information about the slide of the first display 201 from a signal for the above-described movement control module 731 to control the motor.

According to various embodiments, the input detection module 733 may detect an input (e.g., user input) received through the plurality of displays (e.g., the first display 201 and the second display 203) of the electronic device 101. The input detection module 733 may aggregate the information (e.g., attribute information to be described below) about each of the inputs respectively received through the displays to thereby identify a single piece of information (e.g., type of user input or operation to be performed by the electronic device 101). Hereinafter, an example of an operation of the input detection module 733 is described.

For example, the input detection module 733 may obtain information about the attributes for the inputs received through the plurality of displays and identify the type of the received user input based on the obtained information about the attributes. The attributes for the input may include the position of the input, the reception time of the input, and the sensitivity of the input (e.g., the sensitivity of pressure). Types of the user input may include a user input which is at least one of a touch input, a tap input, a double tap input, a long tap input, a panning input, a scroll input, a rotate input, a drag input, a touch-up input, a pinch input, a swipe input, or a hovering input. For example, as shown in FIG. 7B, the input detection module 733 may receive a value (or information) indicating the attribute of the user's touch input received through the first display 201 and the second display 203, from each of a first input detection circuit 771 implemented in the first display 201 and a second input detection circuit 772 implemented in the second display 203. The input detection circuits (e.g., the first input detection circuit 771 and the second input detection circuit 772) may include touch sensor circuits for detecting touch in a capacitive scheme or resistive scheme disposed on the front surfaces of the respective displays (e.g., the first display 201 and the second display 203) or pressure sensor circuits for detecting the pressure of the touch and return electrical values indicating the attribute of the user input received through each display. In this case, only a portion implemented in the portion corresponding to the externally exposed area of the first display 201 of the input detection circuit of the first display 201 may be turned on (or activated) to return a value based on the user input received on the exposed area of the first display 201. The input detection module 733 may identify a single event based on the attribute associated with the input detected from each of the first display 201 and the second display 203. For example, the input detection module 733 may integrate the attributes associated with the inputs respectively detected from the displays and identify an integrated attribute. As an example, the input detection module 733 may integrate information associated with the positions of the inputs respectively detected from the displays and identify information about the integrated input. For example, the input detection module 733 may identify the coordinate values of the inputs respectively received through the displays (e.g., the first display 201 and the second display 203) as values of coordinate systems associated with each other. For example, as shown in FIG. 7B, the input detection module 733 may integrate the coordinate system indicating the position on the first display 201 and the coordinate system indicating the position on the second display 203 into a coordinate system indicating the position on a single display and identify it. For example, the integrated coordinate system may be a coordinate system including coordinates in the x-axis direction (e.g., width direction or horizontal direction) and coordinates in the y-axis direction (e.g., length direction or vertical direction). The electronic device 101 may set the bottom rightmost coordinates of the second display 203 as reference coordinates (e.g., origin (0,0)). Accordingly, the electronic device 101 may identify the type of the user input currently received through the first display 201 and the second display 203 based on information about the identified position in the integrated coordinate system. Meanwhile, when comparing the position of the input received on the first display 201 and the position of the input received on the second display 203, the electronic device 101 may further apply (e.g., subtract) by referring to the coordinates 706 of the portion 205 where the first display 201 is drawn in (i.e., not exposed), which is described below with reference to FIGS. 27 and 28.

According to various embodiments, the application management module 734 may manage and control a plurality of applications. For example, the application management module 734 may manage and/or store information associated with the plurality of applications 780 (e.g., information about the length of the application) and control to execute the plurality of applications 780 based on the information associated with the plurality of applications. The plurality of applications 780 managed and/or controlled by the application management module 734 may include applications installed on the electronic device 101, applications not installed, applications running in a specific mode (e.g., foreground mode or background mode), applications not running, or other various applications. The application management module 734 may manage information 770 associated with the plurality of applications 780 as shown in FIG. 7C. The information 770 associated with the plurality of applications 780 may include information 791 (e.g., H1 or H2) about the length of a specific application, information about the length of the execution screen of the application corresponding to information 792 about the attribute of the application (e.g., information (e.g., T1 or T2) about the type of the application) and may be previously stored in the memory 750. The information 791 about the length of the application may indicate the length in the length direction in which the execution screen is displayed when the execution screen (or view) of the application is displayed. The information 792 about the attribute of the application may include, e.g., information indicating the type of the application, as information about various types associated with the application. In this case, the electronic device may set and previously store the length for each piece of information 792 for the application attribute and, instead of the information 791 about the length of the application, identify information 792 about the application of the application and identify the pre-stored length corresponding thereto. The application management module 734 may provide an interface for executing a plurality of applications. For example, the application management module 734 may display a screen including a plurality of icons for executing the plurality of applications 780. When a specific application is executed using the application management module 734, the application management module 734 may identify information about the length of the executed application and control to slide the first display 201 in the length (or distance) corresponding to the information about the length.

According to various embodiments, the information managed by the application management module 734 may be adjusted by the user. For example, the applications executable by the application management module 734 may be selected by the user. As another example, information about the length of the application managed by the application management module 734 may be adjusted.

The above-described application management module 734 may be implemented in the form of an application or program and, when the application management module 734 is executed, the above-described functions may be provided. Or, the application management module 734 may be implemented as a function (e.g., specific menu) provided by a specific application (e.g., settings application).

Hereinafter, the modules included in the second processor 740 are described.

According to various embodiments, the graphic processing module 741 may allow the first display 201 and the second display 203 to display contents, respectively. The content may include various types of information displayable on the display based on the execution and/or driving of the application or program. For example, the content may include various types of visual contents such as images or videos. As another example, the content may include the execution screens and/or screens (e.g., views) of various types of applications (e.g., camera application, screen recording application, document application (e.g., note and/or memo application), screen capture application, gallery application, file manager application, or web application). The execution screen and/or screen may include at least one graphic element (e.g., graphic user element (GUI)) and include an area for providing information (e.g., video, image, document, note, or webpage) obtained according to the driving of the application and/or program. The graphic processing module 741 may obtain the above-described content (e.g., media or screen) to be displayed as the application or program is executed and identify first content to be displayed on the first display 201 and second content to be displayed on the second display 203 based on the obtained content. The graphic processing module 741 may transfer information (e.g., per-pixel color values and coordinate information of the content) about each content (e.g., first content and second content) to each display (e.g., the first display 201 and the second display 203). The display driver integrated circuit (DDIC) (not shown) included in each of the displays (e.g., the first display 201 and the second display 203) may display content on each display (e.g., display the color based on the color value in the position (pixel) corresponding to the coordinate information) based on information about the content (e.g., per-pixel color values and coordinate information of the content). Without limited to those described, a single DDIC for controlling both the first display 201 and the second display 203 may be provided. The operation of identifying the content to be displayed on each of the displays of the electronic device 101 (e.g., graphic processing module 741) and displaying it on the display is described below with reference to FIGS. 13 to 16.

Meanwhile, without limited to those shown in FIG. 7A, the above-described first processor 730 and second processor 740 may be implemented as a single component, rather than being separately implemented. For example, the graphic processing module 741 of the second processor 740 may be implemented in the first processor 730.

Hereinafter, examples of operations of the electronic device 101 according to various embodiments are described. Hereinafter, for convenience of description, it is shown or described that the space 202 is formed between the first display 201 and the second display 203, but as described above in FIG. 6A, the member 207 (e.g., metal, plastic, or optical member) may be disposed between the first display 201 and the second display 203. In contrast, it is shown or described that the member 207 is disposed between the first display 201 and the second display 203, but the space 202 may be formed between the first display 201 and the second display 203.

An example of an operation of an electronic device 101 is described below according to various embodiments.

According to various embodiments, the electronic device 101 may move the position of the fourth structure 330 based on an occurrence of an event for securing a space between the first display 201 and the fourth structure 330 included in the third structure 230.

Figure 8:
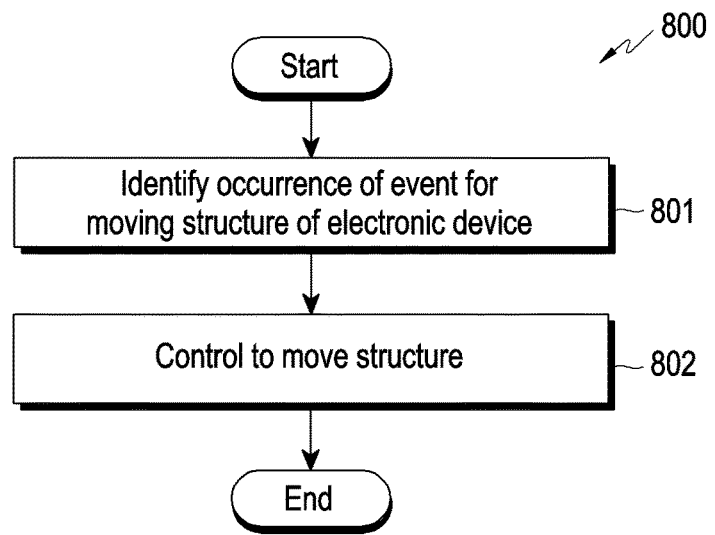
FIG. 8 is a flowchart illustrating an example of an operation of an electronic device according to an embodiment of the disclosure.

FIG. 8 is a flowchart illustrating an example of an operation of an electronic device according to an embodiment of the disclosure. According to various embodiments, the operations shown in FIG. 8 representing flowchart 800 are not limited to the shown order but may rather be performed in other various orders. According to various embodiments, more or less operations than those of FIG. 8 may be performed. FIG. 8 is described below with reference to FIGS. 9A and 9B.

Figure 9A:
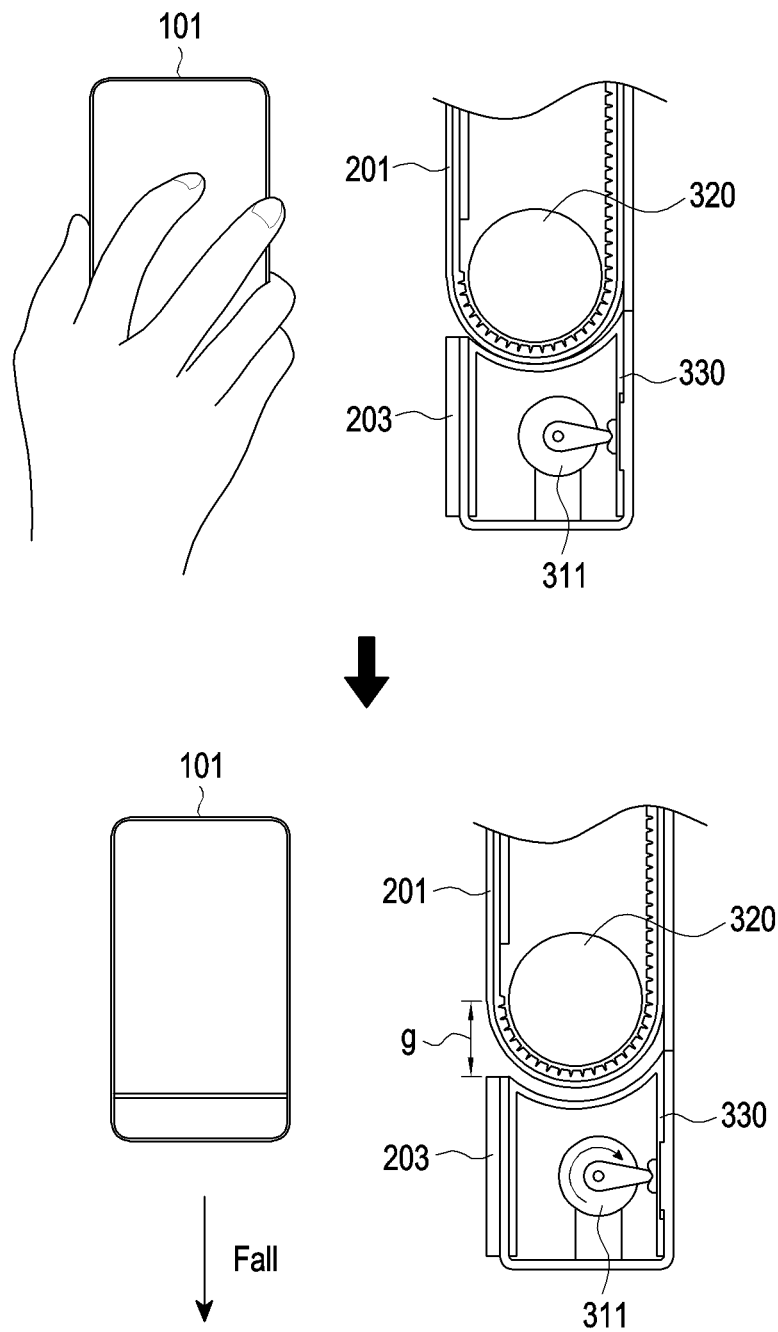
FIG. 9A is a view illustrating an example of an operation to move a position of a fourth structure when an electronic device falls, by an electronic device according to an embodiment of the disclosure.
Figure 9B:
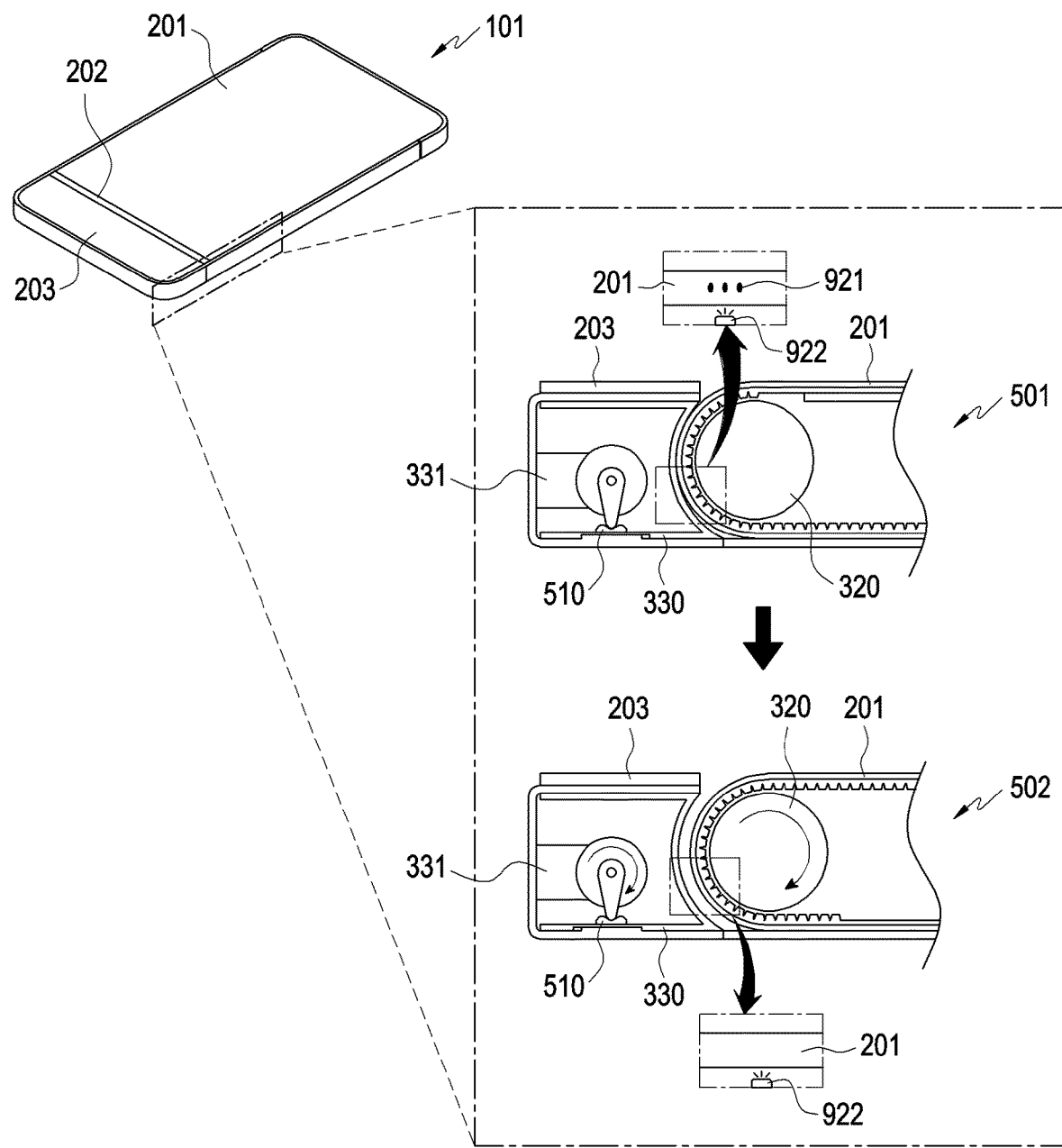
FIG. 9B is a view illustrating an example of an operation to move a position of a fourth structure when a first display slides, by an electronic device according to an embodiment of the disclosure.

FIG. 9A is a view illustrating an example of an operation to move a position of a fourth structure when an electronic device falls, by an electronic device according to an embodiment of the disclosure. FIG. 9B is a view illustrating an example of an operation to move a position of a fourth structure when a first display slides, by an electronic device according to an embodiment of the disclosure.

Referring to FIG. 9B, it is shown that a space is formed between the first display 201 and the second display 203 but, without limited to those shown in FIG. 9B, as described above in connection with FIG. 6A, a member 207 (e.g., metal, plastic, or optical member) may be disposed.

Referring to FIG. 8, according to various embodiments, in operation 801, the electronic device 101 may identify an occurrence of an event for moving the structure (e.g., the fourth structure 330) of the electronic device. For example, the event may include an event where it is required to secure a space between the first display 201 and the fourth structure 330 disposed adjacent to the received area (e.g., the area corresponding to the roller 320) of the first display 201, such as a fall of the electronic device 101 and the start of movement of the first display 201. Since the fourth structure 330 has been described above in connection with FIGS. 3A, 3B, 3C, 4, 5, 6A, and 6B, no duplicate description is given. As an example, upon detecting a fall of the electronic device 101 as shown in FIG. 9A, the electronic device may start moving the fourth structure 330. The electronic device 101 may detect the fall of the electronic device 101 using a gyro sensor or a motion sensor. As another example, as shown in FIG. 9B, the electronic device 101 may detect a slide of the first display 201 using at least one sensor (e.g., optical sensor 922). The electronic device 101 may detect the slide by identifying (e.g., 901 and 902) whether a specific content 921 is displayed which is displayed in the received area of the first display 201 using at least one sensor (e.g., optical sensor 922) described above in connection with FIG. 7A.

According to various embodiments, in operation 802, the electronic device 101 may control to allow the structure (e.g., the fourth structure 330) to move. For example, as shown in FIGS. 9A and 9B, based on the driving of the servo motor 331, the handle provided in the servo motor 331 may be rotated in one direction (e.g., clockwise direction), and an external force may be applied to the groove 510 of the fourth structure 330 in the direction (e.g., left direction) corresponding to the one direction to move the fourth structure 330 in the lower direction. Accordingly, the fourth structure 330 and the first display 201 may be spaced apart to form a space g between the fourth structure 330 and the first display 201. The impact on the first display 201 when falling may be reduced by the formed space g, and the slide of the first display 201 may be smoothed.

Another example of an operation of an electronic device 101 is described below according to various embodiments.

According to various embodiments, the electronic device 101 may perform at least one operation based on inputs (e.g., the user's touch input) received through a plurality of displays (e.g., the first display 201 and the second display 203).

Figure 10:
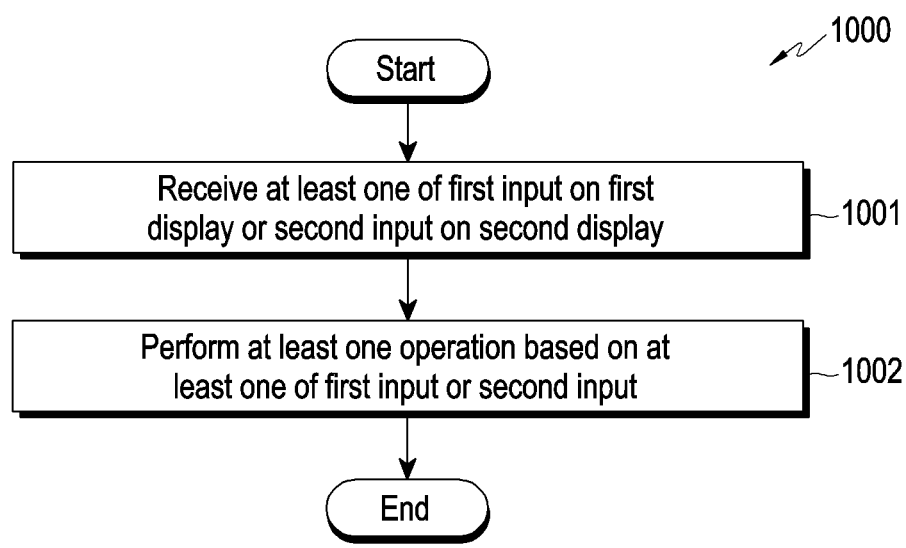
FIG. 10 is a flowchart illustrating an example of an operation of an electronic device according to an embodiment of the disclosure.

FIG. 10 is a flowchart illustrating an example of an operation of an electronic device according to an embodiment of the disclosure. According to various embodiments, the operations shown in FIG. 10 representing flowchart 1000 are not limited to the shown order but may rather be performed in other various orders. According to various embodiments, more or less operations than those of FIG. 10 may be performed. FIG. 10 is described below with reference to FIGS. 11 and 12.

Figure 11:
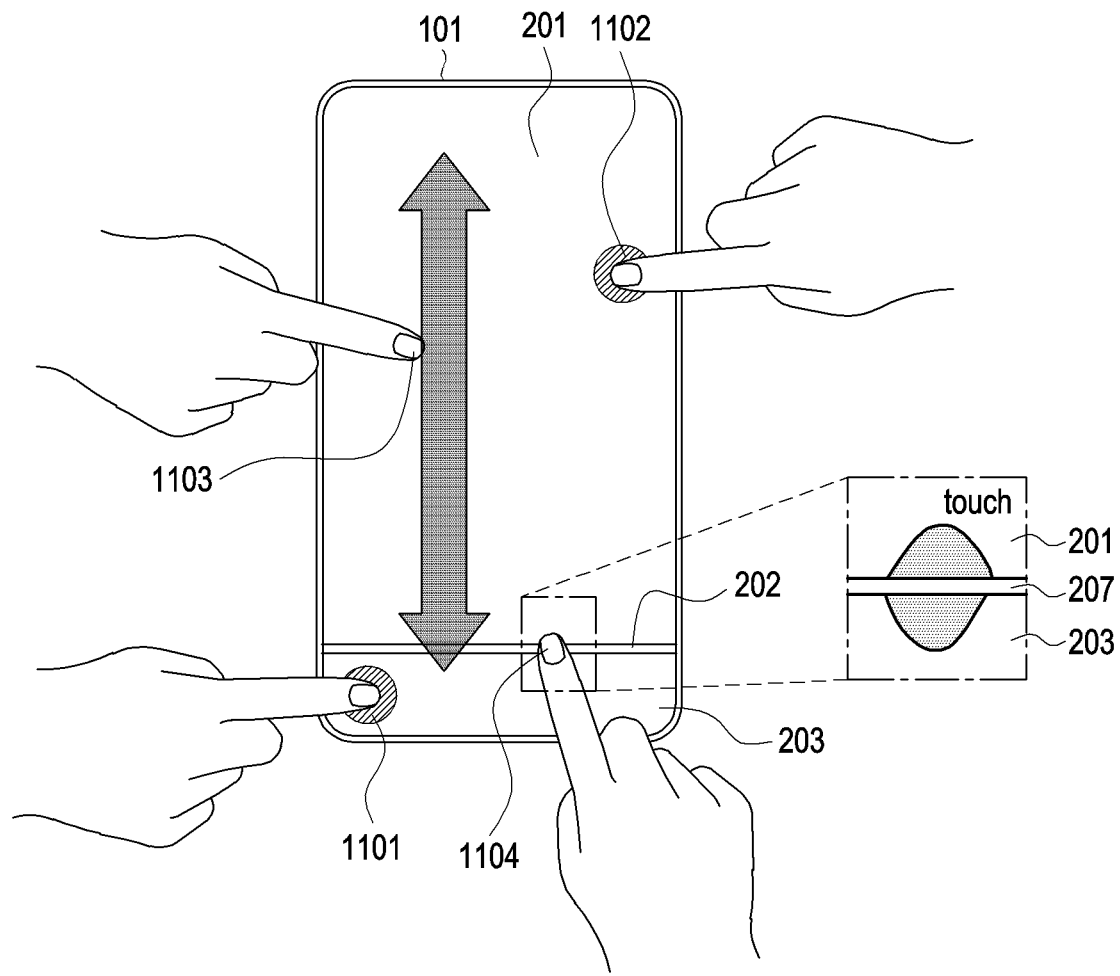
FIG. 11 is a view illustrating examples of a touch input received by an electronic device according to an embodiment of the disclosure.

FIG. 11 is a view illustrating examples of a touch input received by an electronic device according to an embodiment of the disclosure.

Figure 12:
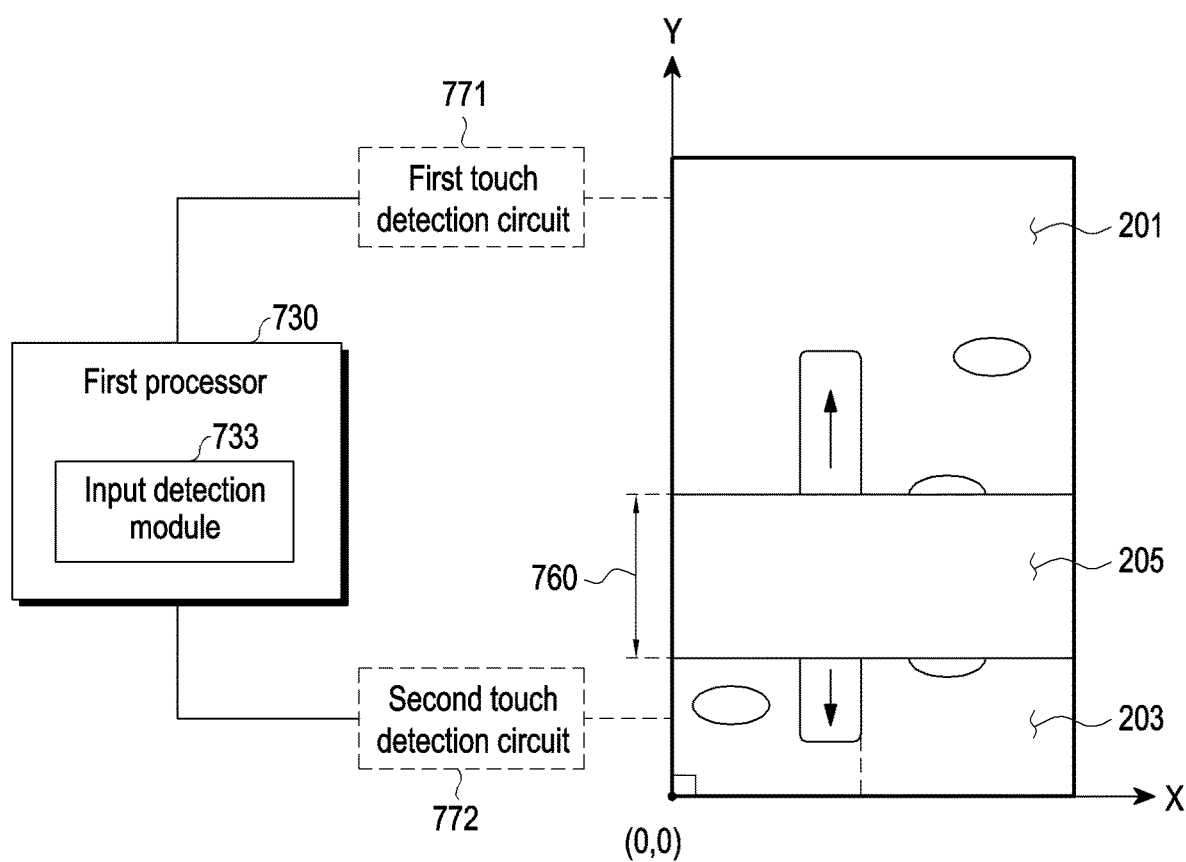
FIG. 12 is a view illustrating an example of an operation of detecting a touch input received by an electronic device according to an embodiment of the disclosure.

FIG. 12 is a view illustrating an example of an operation of detecting a touch input received by an electronic device according to an embodiment of the disclosure. Although FIG. 11 illustrates that the member 207 is disposed between the first display 201 and the second display 203, the space 202 may be formed without limited to those shown in FIG. 11.

Referring to FIG. 10, according to various embodiments, in operation 1001, the electronic device 101 may receive at least one of a first input on the first display 201 or a second input on the second display 203.

Referring to FIG. 11, the electronic device 101 may receive (1103) an input (e.g., the user's touch) on the first display 201, receive (1101) an input (e.g., the user's touch) on the second display 203, or receive (1102 and 1104) inputs on the first display 201 and the second display 203. The input received on each of the first display 201 or the second display 203 may be defined as a single input (e.g., single touch input), and the input received on the first display 201 and the second display 203 may be defined as a multi-input (e.g., multi-touch input). As an example, when the user touches the member 207 using the user's body part, at least a portion of the user's body part except for the area of the member 207 may simultaneously touch the first display 201 and the second display 203. The input received on the first display 201 and the second display 203 may be received on the first display 201 and the second display 203 as various types of attributes (e.g., time and position). For example, the respective inputs received on the first display 201 and the second display 203 may be received at different or corresponding reception time points (or times) or in positions which are associated or not associated with each other. The electronic device 101 may perform different operations according to different attributes of the inputs received on the first display 201 and the second display 203, which is described below with reference to FIGS. 27 and 28. Meanwhile, the electronic device 101 may receive inputs to keys physically implemented in the electronic device 101 (e.g., pressing the keys).

According to various embodiments, in operation 1002, the electronic device 101 may perform at least one operation based on at least one of a first input or a second input. For example, the electronic device 101 (e.g., the input detection module 733 of the first processor 730) may identify information about the attribute (e.g., the position (or coordinates) of the received input, reception time of the input, or sensitivity of the input) based on the value received from the detection circuit (e.g., the first input detection circuit 771 and the second input detection circuit 772) implemented in each display as shown in FIG. 12 and perform at least one operation based on the identified attribute information. The electronic device 101 may integrate attribute information (e.g., reception position, reception time, and sensitivity) about each received input (e.g., first input and second input) and identify at least one operation to be performed corresponding to each input.

Referring to FIG. 12, the electronic device 101 may identify the positions (e.g., coordinates) of the inputs received on the first display 201 and the second display 203 in a single integrated coordinate system. In this case, the electronic device 101 may identify the respective coordinates of the inputs (e.g., the first input and second input) considering the coordinates 760 of the received area of the first display 201. The operation of identifying the position of each input using the integrated coordinate system by the electronic device 101 may be performed as in the operation of the input detection module 733 described above in connection with FIG. 7A, and no duplicate description is thus given. As an example, the electronic device 101 may display a specific screen (e.g., home screen, application execution screen, or unlock screen) for providing at least one service. The specific screen may include objects (e.g., graphic user interface (GUI) elements) implemented to provide at least one service. The electronic device 101 may identify a control event (e.g., select or drag) for the objects included in the specific screen based on the attributes of the inputs and perform at least one operation corresponding to the control of the object. As an example, upon receiving the user's touch on the first display 201, the electronic device 101 may identify one attribute (e.g., receiving a single touch at the first coordinates of the first display 201) based on the value received from the first input detection circuit 771, select an object (e.g., a first object for executing a first application placed in a first position) associated with the identified attribute (e.g., the first coordinates), and provide at least one service (e.g., executing the first application) associated with the selected object. Similarly, upon receiving the user's touch on the second display 203, the electronic device 101 may provide a service corresponding to the attribute of the touch received on the second display 203. As another example, upon receiving the user's touch on the first display 201 and the second display 203, the electronic device 101 may perform at least one operation based on the attribute (e.g., position) of the multi-touch. The operation of the electronic device 101 based on various types of multi-touches is further described below.

Examples of the above-described operation of providing various services based on the user input received on the first display 201 or second display 203 of the electronic device 101 are further described below.

An example of an operation of an electronic device 101 is described below according to various embodiments.

According to various embodiments, the electronic device 101 may obtain content to be displayed based on the input received through the plurality of displays (e.g., the first display 201 and the second display 203) and display content on each of the plurality of displays.

Figure 13:
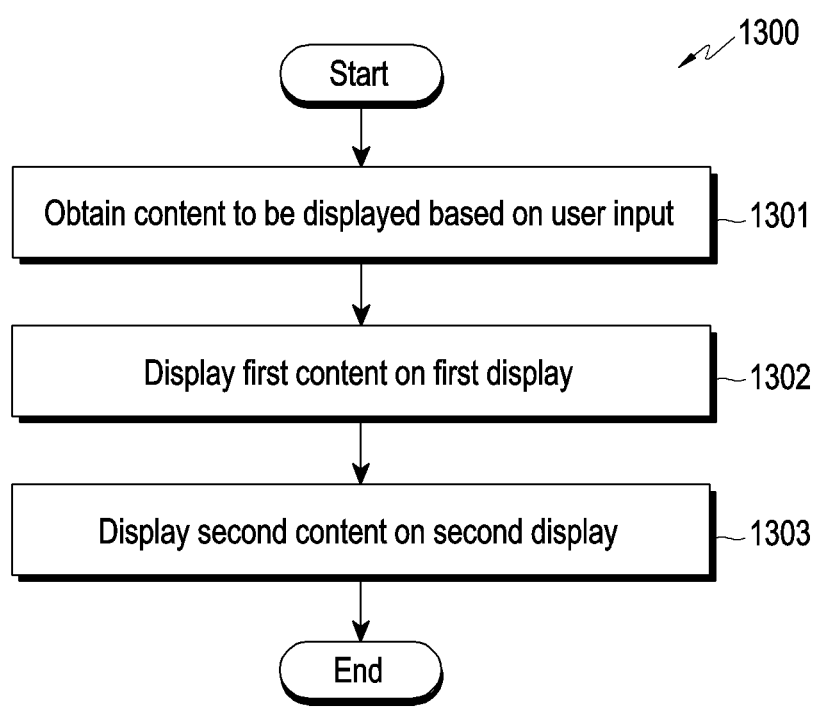
FIG. 13 is a flowchart illustrating an example of an operation of an electronic device according to an embodiment of the disclosure.

FIG. 13 is a flowchart illustrating an example of an operation of an electronic device 101 according to an embodiment of the disclosure. According to various embodiments, the operations shown in FIG. 13 representing flowchart 1300 are not limited to the shown order but may rather be performed in other various orders. According to various embodiments, more or less operations than those of FIG. 13 may be performed. FIG. 13 is described below with reference to FIGS. 14 and 16.

Figure 14:
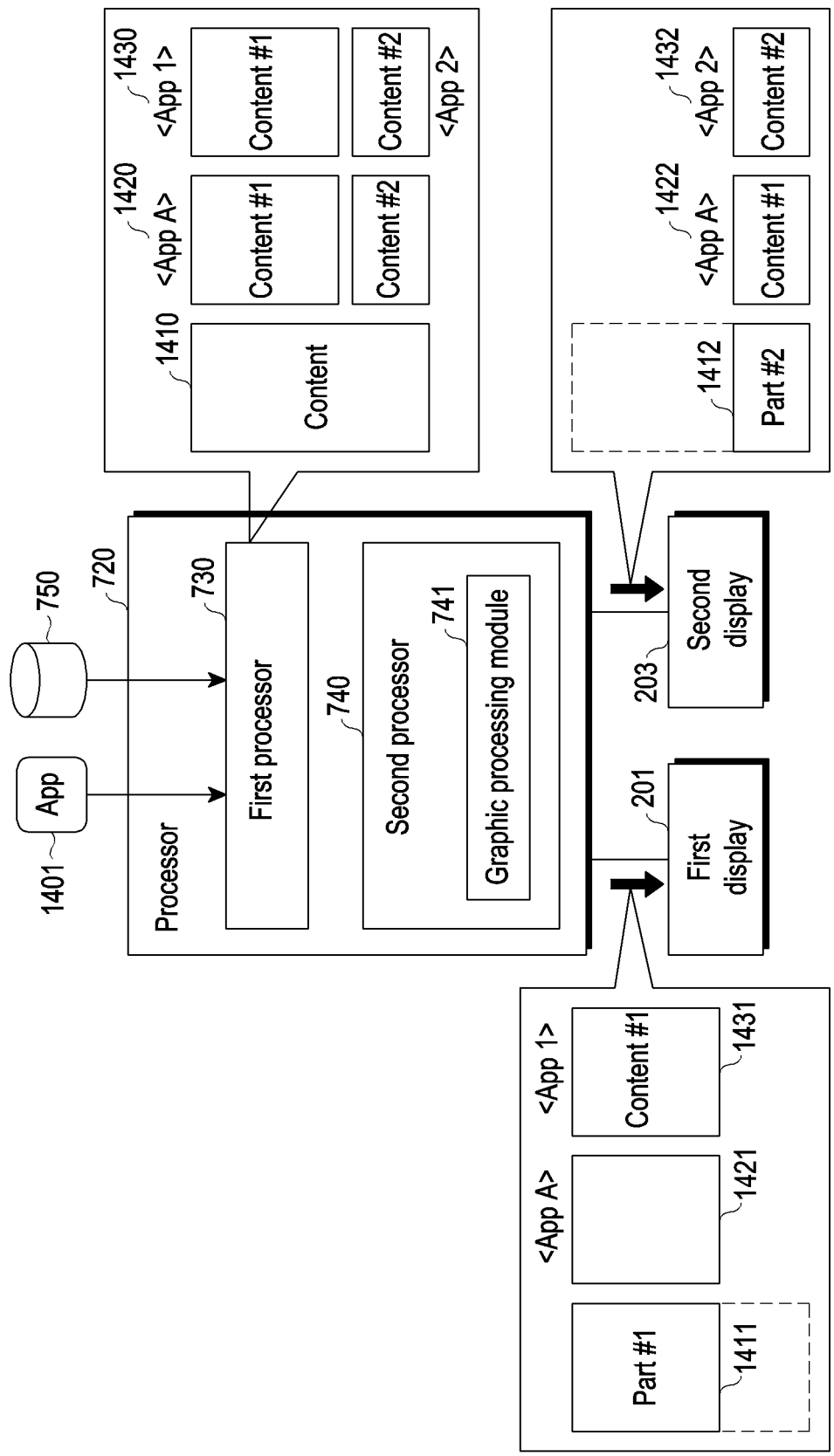
FIG. 14 is a view illustrating various embodiments of an operation of obtaining content of an electronic device and displaying content on each of a plurality of displays (e.g., first display and second display) based on the obtained content according to an embodiment of the disclosure.

FIG. 14 is a view illustrating various embodiments of an operation of obtaining content of an electronic device and displaying content on each of a plurality of displays (e.g., first display and second display) based on the obtained content according to an embodiment of the disclosure.

Figure 15:
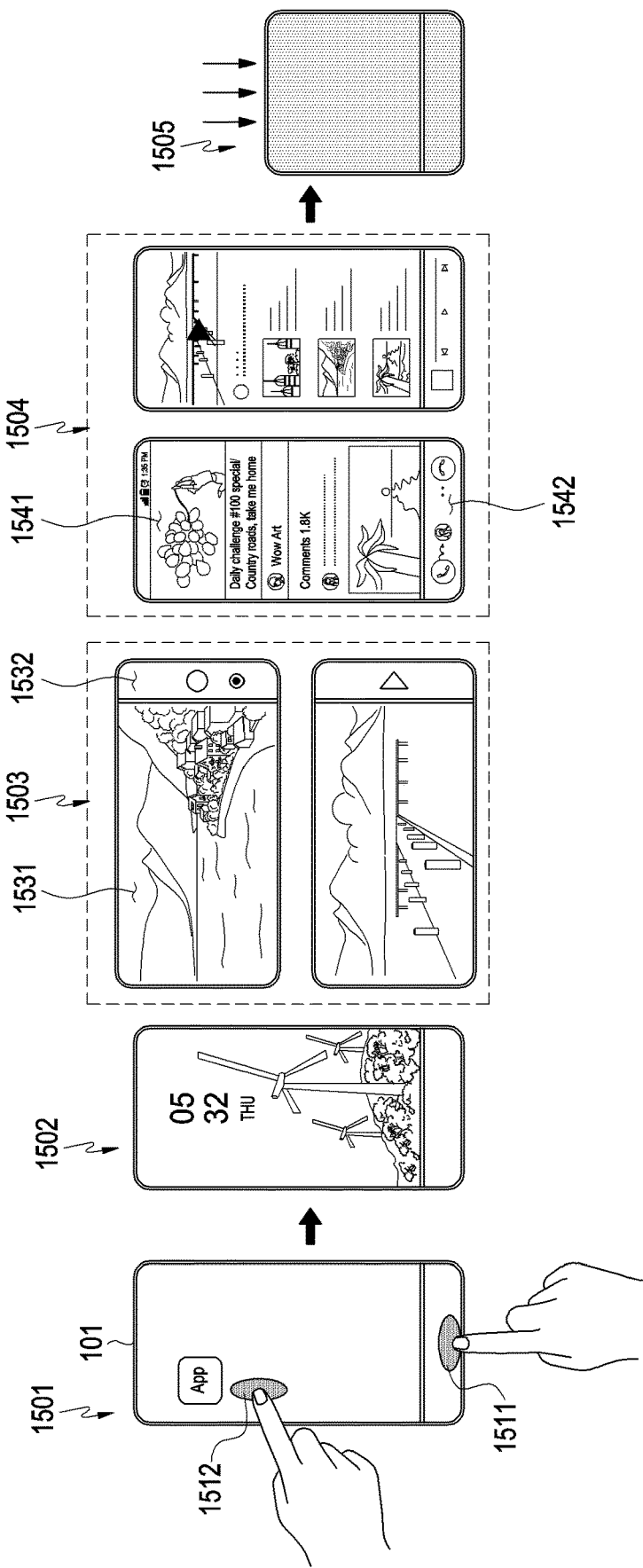
FIG. 15 is a view illustrating various embodiments of obtaining and displaying content based on a user input of an electronic device according to an embodiment of the disclosure.

FIG. 15 is a view illustrating various embodiments of obtaining and displaying content based on a user input of an electronic device according to an embodiment of the disclosure.

Figure 16:
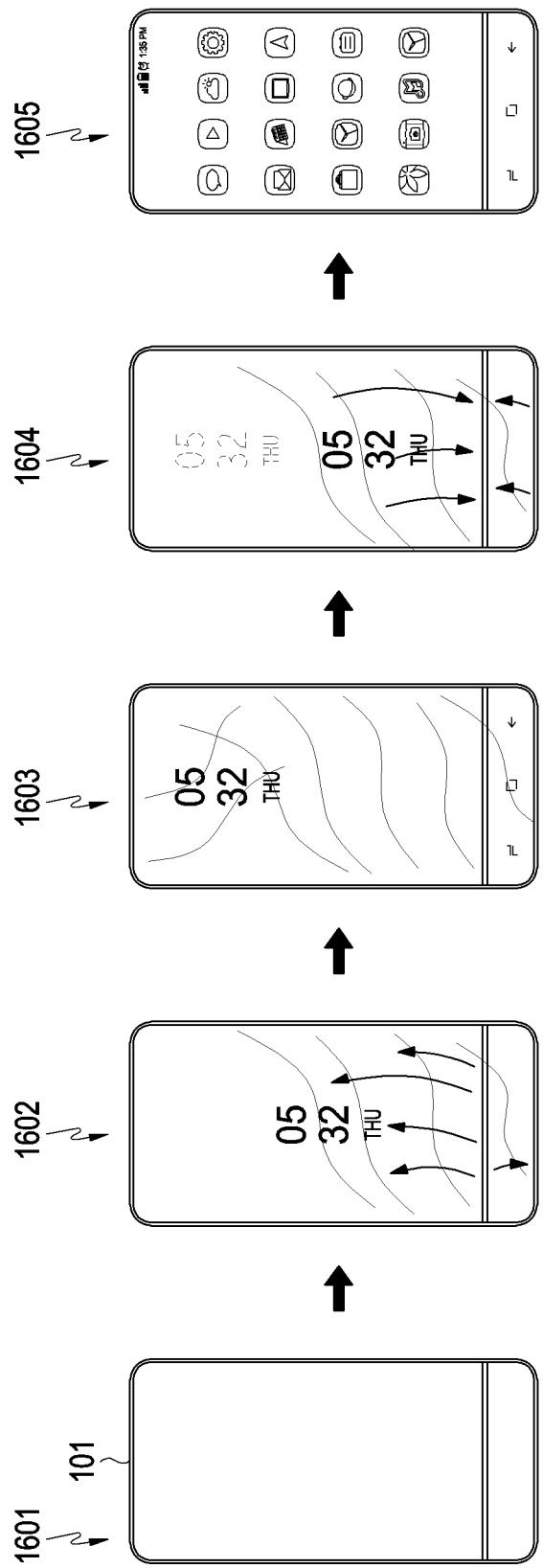
FIG. 16 is a view illustrating an example of an operation of dynamically displaying content when displaying content by an electronic device according to an embodiment of the disclosure.

FIG. 16 is a view illustrating an example of an operation of dynamically displaying content when displaying content by an electronic device according to an embodiment of the disclosure.

Referring to FIG. 13, in operation 1301, the electronic device 101 may obtain content to be displayed based on at least one of a first input (e.g., input received on the first display 201) or a second input (e.g., input received on the second display 203). For example, as shown in 1501 of FIG. 15, the electronic device 101 may receive at least one of the first input 1511 on the first display 201 or the second input 1512 on the second display 203. Meanwhile, without limited to those described, the electronic device 101 may also receive a user input to the key physically implemented in the electronic device 101. The operation of receiving a user input by the electronic device 101 may be performed like the above-described operations 1001 and 1002 of the electronic device 101 as described above, and no duplicate description thereof is given below. Hereinafter, the operation of obtaining content to be displayed based on a user input by the electronic device 101 is described.

Referring to FIG. 15, the electronic device 101 (e.g., the first processor 730) may execute and/or drive an application or program based on a user input (e.g., at least one of the first input 1511 or the second input 1512) received through at least one of the displays (e.g., the first display 201 and the second display 203) and obtain information about at least one content to be displayed according to the execution and/or driving of the application or program. For example, the first processor 730 may obtain the content (e.g., execution screen) to be displayed from the memory 750 or the application 1401 based on the execution of the application or program.

Referring to FIG. 14, the content may include a single content 1410 or at least two or more contents (e.g., contents 1420 associated with one application (e.g., App A) or contents 1430 associated with different applications (e.g., first app App 1 and second app App 2)). Examples of the operation of obtaining content by the electronic device 101 are described below.

For example, the electronic device 101 may obtain a single content 1410 to be displayed based on a user input. As an example, as shown in 1502 of FIG. 15, when the display is turned on according to a user input (e.g., upon receiving a user input having a preset pressure sensitivity or more through the second display 203), the electronic device 101 may obtain information about the protection screen to be displayed.

As another example, the electronic device 101 may obtain at least two or more contents 1420 to be displayed based on the user input. As an example, when an application is executed according to the user input as shown in 1503 of FIG. 15 (e.g., upon receiving a user input in the position of the icon for executing the application displayed on the first display 201 or second display 203), the electronic device 101 may obtain at least one content (e.g., an execution screen 1531 including a content area or an execution screen 1532 including a control area) for displaying the execution screen of the application.

As another example, the electronic device 101 may obtain content 1430 associated with different applications based on a user input. As an example, as shown in 1504 of FIG. 15, the electronic device 101 may obtain an execution screen 1541 of one application and an execution screen 1542 of another application. For example, upon executing the plurality of applications, the electronic device 101 may obtain information for displaying the respective execution screens of the applications. As the other application is executed while one application is running, the electronic device 101 may obtain information for displaying the execution screens of the two applications. As an example, when another application is executed while there is an application running in the foreground mode, the electronic device 101 may obtain information about the execution screen of the application running in the foreground mode and display it on the first display 201 and obtain information about the execution screen of the other application newly executed and display it on the second display 203.

Meanwhile, in addition to the described example, the operation of obtaining and displaying at least one content based on the execution and/or driving of the application by the electronic device 101 may be performed like the operation of displaying content based on the execution and/or driving of various types of applications.

According to various embodiments, the electronic device 101 may display first content on the first display 201 in operation 1302 and display second content on the second display 203 in operation 1303. For example, the electronic device 101 (e.g., the graphic processing module 741 of the second processor 740) may split the obtained single content and display them on the plurality of displays, respectively (e.g., transfer information about the split content to the DDIC implemented in each of the exposed area of the first display 201 and the second display 203 and display it on the display) or display a plurality of obtained contents on the plurality of displays, respectively (e.g., transfer information about each content to the DDIC implemented in each of the exposed area of the first display 201 and the second display 203 and display it). The operation of the graphic processing module 741 is the same as that described above in connection with FIG. 7A, and no duplicate description thereof is thus given below. When the state of the electronic device 101 switches to the locked state or there is no application running in the foreground mode as shown in 1505 of FIG. 15, the electronic device 101 may slide in the flexible second display 203. Meanwhile, after adjusting the exposed area of the first display 201, the electronic device 101 may perform the operation of displaying the obtained content, and this is described below with reference to FIGS. 17, 18, 19, 20A, and 20B. Hereinafter, examples (e.g., examples 1502 to 1504 of FIG. 15) of the operation of displaying content by the electronic device 101 are further described.

According to various embodiments, the electronic device 101 may split one content into a plurality of portions (e.g., two portions 1411 and 1412) and display them on the plurality of displays (e.g., the first display 201 and the second display 203), respectively. For example, the electronic device 101 may split the obtained content into a portion 1411 to be displayed on the first display 201 and a portion 1412 to be displayed on the second display 203. The electronic device 101 may calculate the ratio of the exposed area of the first display 201 and the area of the second display 203. The electronic device 101 may identify the distance (or length) in which the first display 201 moves based on the value (e.g., electrical value) received from the sensor as the first display 201 slides and identify the exposed area of the first display 201 based on the identified distance (e.g., the sum of the originally exposed area and the area corresponding to the moved distance). The electronic device 101 may calculate the ratio of the identified exposed area of the first display 201 and the area of the second display 203 and split (1411 and 1412) the content into two portions based on the calculated ratio (e.g., first value (e.g., 3) indicating the area of the first display 201: second value (e.g., 1) indicating the area of the second display 203) and display them on the displays, respectively. For example, as shown in 1502 of FIG. 15, the electronic device 101 may split the obtained content for screen protection into an upper portion to be displayed on the first display 201 and a lower portion to be displayed on the second display 203 and display the split portions on the displays.

According to various embodiments, the electronic device 101 may obtain different contents and display different contents 1421, 1422, 1431, and 1432 on the displays (e.g., the first display 201 and the second display 203), respectively. For example, the different contents 1421 and 1422 may include a screen including an area (or content area) for displaying the content associated with the application and a screen including an area for controlling the application. For example, as shown in 1503 of FIG. 15, the electronic device 101 may obtain a screen for displaying the content played on the application (e.g., camera application or media player application) and a screen including objects for manipulating the application. The electronic device 101 may display the screen for displaying content in the exposed area of the first display 201 and display the screen including the objects for manipulation on the second display 203. As another example, the different contents 1431 and 1432 may be execution screens of different applications as described above.

According to various embodiments, when displaying content on the first display 201 and second display 203, the electronic device 101 may visually dynamically display the content. As an example, when the electronic device 101 displays a first portion of one content (e.g., content for screen protection) on the first display 201 and a second portion of the one content on the second display 203, the electronic device 101 may visually dynamically display the first portion and second portion. The electronic device 101 may display the contents on the respective displays using a visual effect (e.g., animation effect).

Referring to FIG. 16, when the electronic device 101 displays another content while displaying the one content and/or no content (e.g., off state) as shown in 1601 of FIG. 16, the electronic device 101 may display the first portion of the content to be gradually pushed to the upper end of the first display 201 while displaying the second portion of the content to be gradually pushed to the lower end of the second display 203 with respect to between (e.g., optical member) the first display 201 and the second display 203 as shown in 1602 and 1603 of FIG. 16. When the one content switches to the other content (e.g., the home screen shown in 1605 of FIG. 16), the electronic device 101 may allow the portions of the respective contents being displayed to dynamically disappear and display other content. For example, as shown in 1604 of FIG. 16, the electronic device 101 may display the first portion of the content displayed on the first display 201 to be gradually pushed in between (e.g., optical member) the first display 201 and the second display 203. The electronic device 101 may display the other content on the area where the first portion and second portion of the content are pushed in and disappear from the display. When both the first portion and second portion of the content disappear from the display, the other content may be displayed on the first display 201 and the second display 203. In the foregoing, the operation of displaying the portions split from one content on the respective displays for the dynamic content display operation of the electronic device 101 has been described as an example. However, the above-described operation may also be applied to the operation of displaying different contents on the respective displays.

Another example of an operation of an electronic device 101 is described below according to various embodiments.

According to various embodiments, the electronic device 101 may adjust the exposed area of the first display 201 and may display content on the first display 201 whose exposed area is adjusted.

Figure 17:
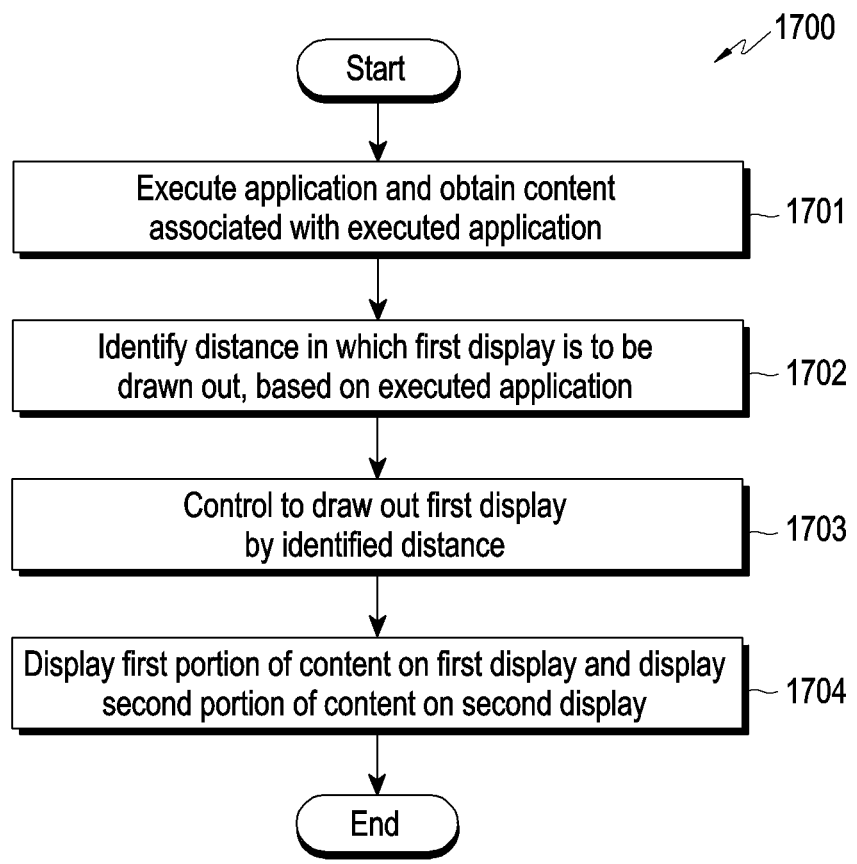
FIG. 17 is a flowchart illustrating another example of an operation of an electronic device according to an embodiment of the disclosure.

FIG. 17 is a flowchart illustrating another example of an operation of an electronic device according to an embodiment of the disclosure. According to various embodiments, the operations shown in FIG. 17 representing flowchart 1700 are not limited to the shown order but may rather be performed in other various orders. According to various embodiments, more or less operations than those of FIG. 17 may be performed. FIG. 17 is described below with reference to FIGS. 18, 19, 20A, and 20B.

Figure 18:
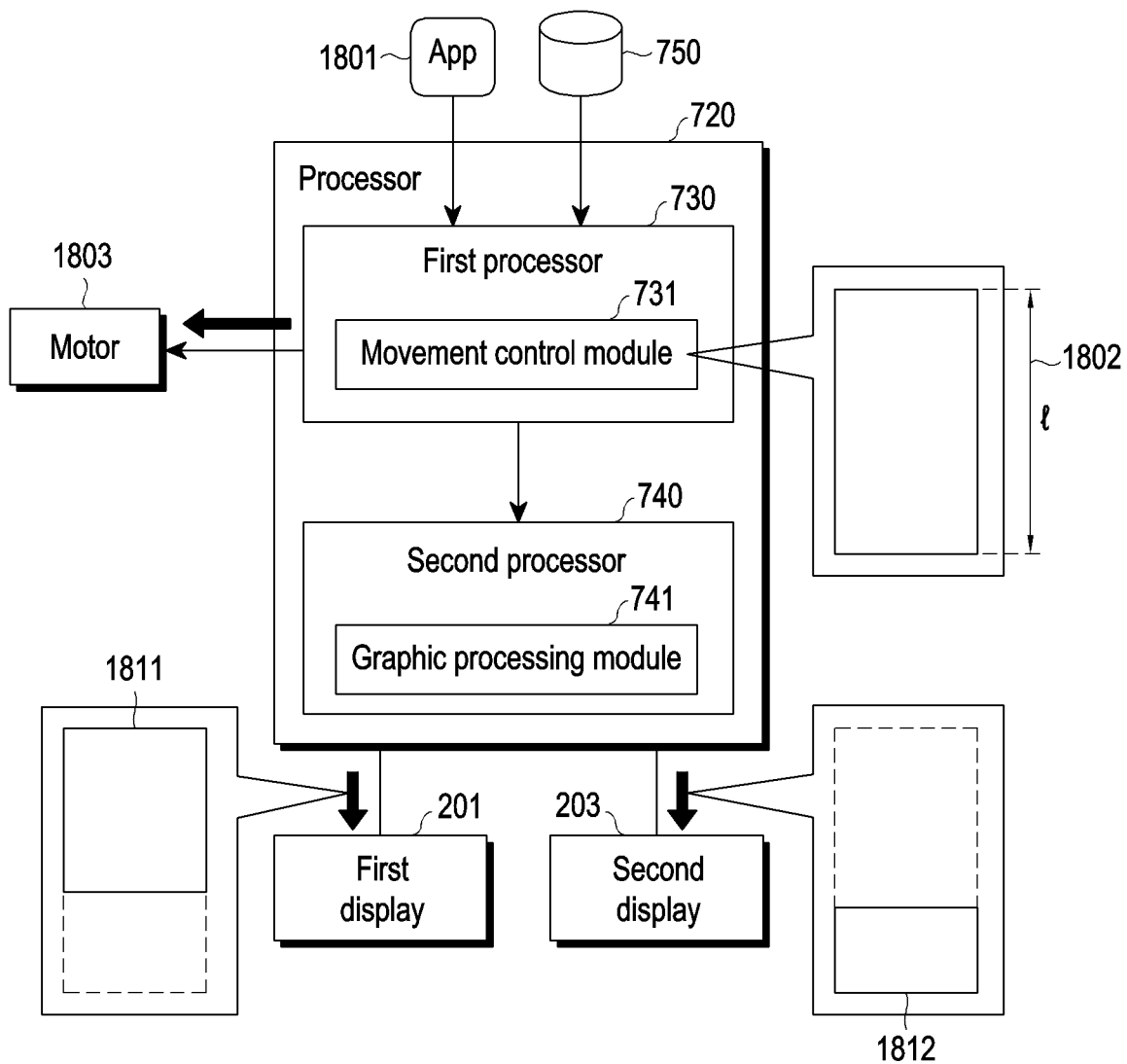
FIG. 18 is a view illustrating an example of an operation of displaying an execution screen of an application based on information about a length of the application executed on an electronic device according to an embodiment of the disclosure.

FIG. 18 is a view illustrating an example of an operation of displaying an execution screen of an application based on information about a length of the application executed on an electronic device according to an embodiment of the disclosure.

Figure 19:
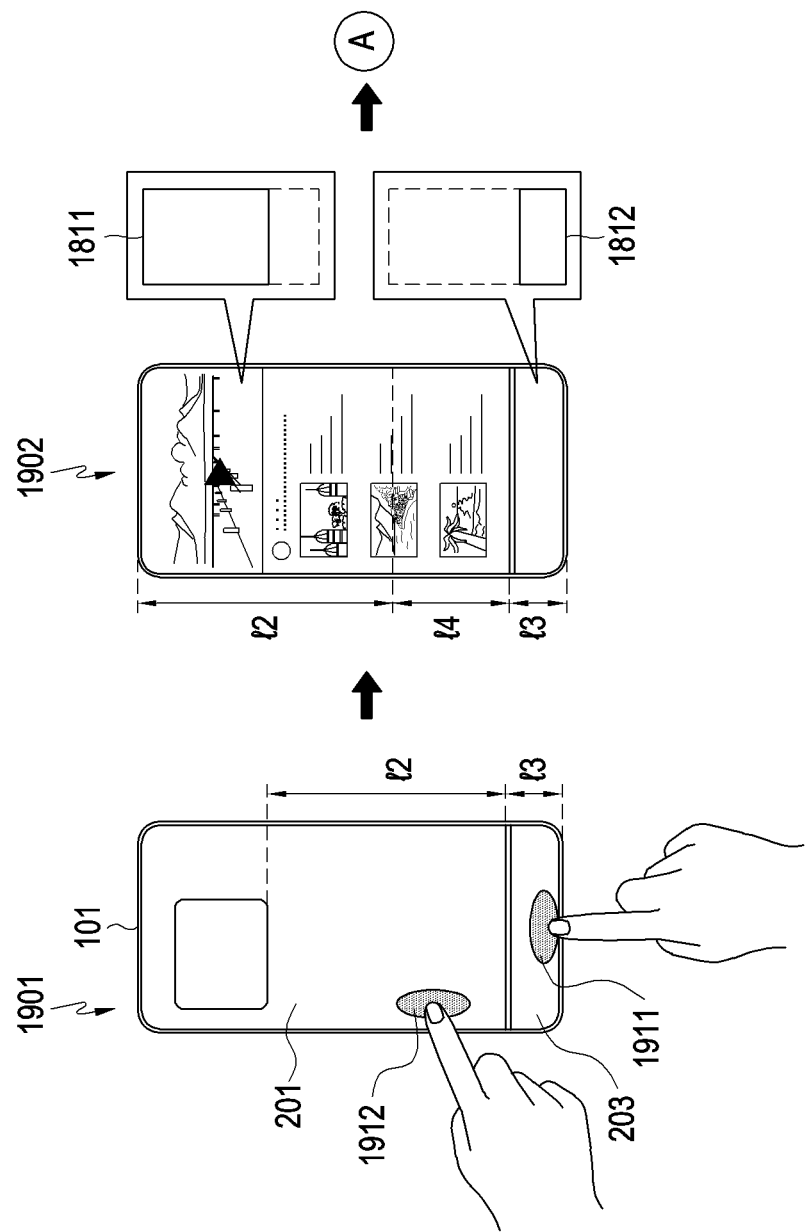
FIG. 19 is a view illustrating an example of an operation of sliding a first display based on information about a length of an application executed on an electronic device according to an embodiment of the disclosure.

FIG. 19 is a view illustrating an example of an operation of sliding a flexible display based on information about a length of an application executed on an electronic device according to an embodiment of the disclosure.

Figure 20A:
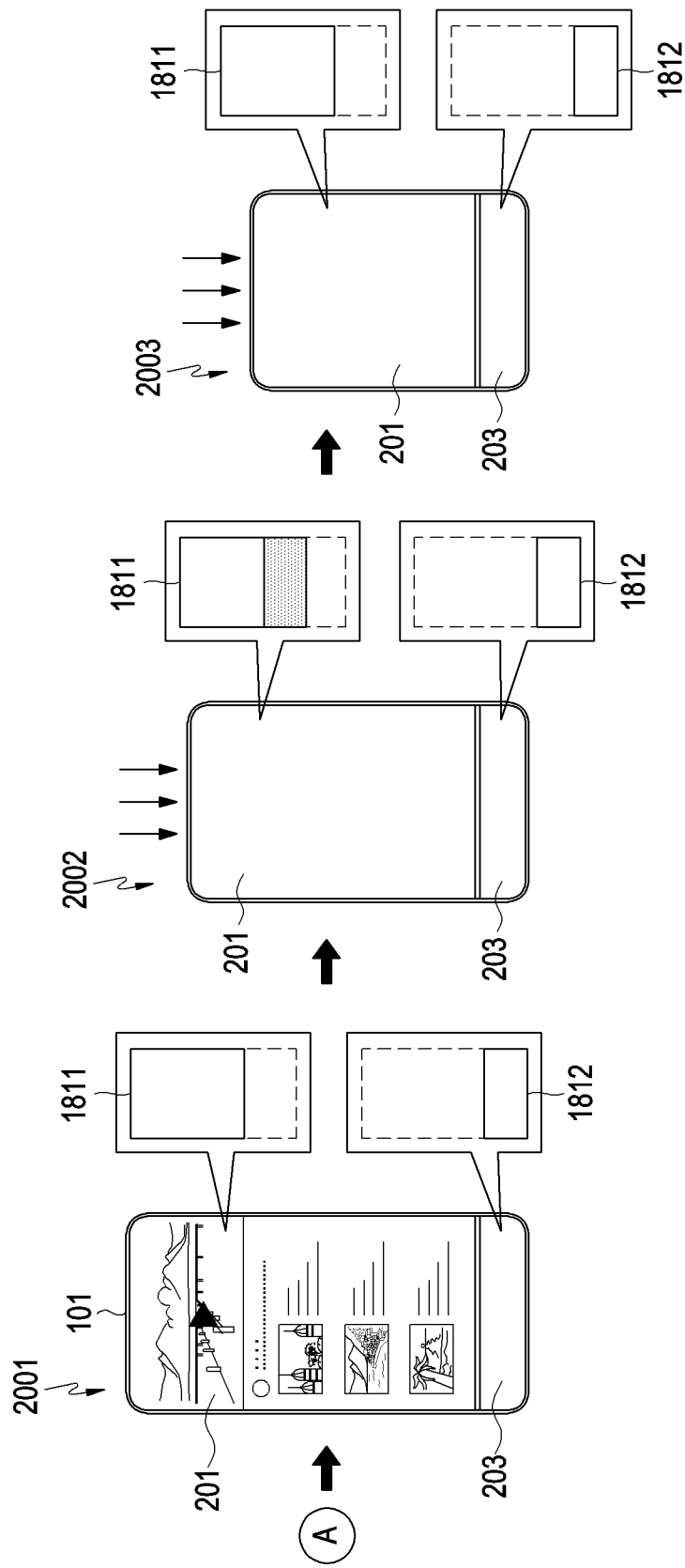
FIG. 20A is a view illustrating an example of an operation of displaying content according to the area of a first display of an electronic device according to an embodiment of the disclosure.
Figure 20B:
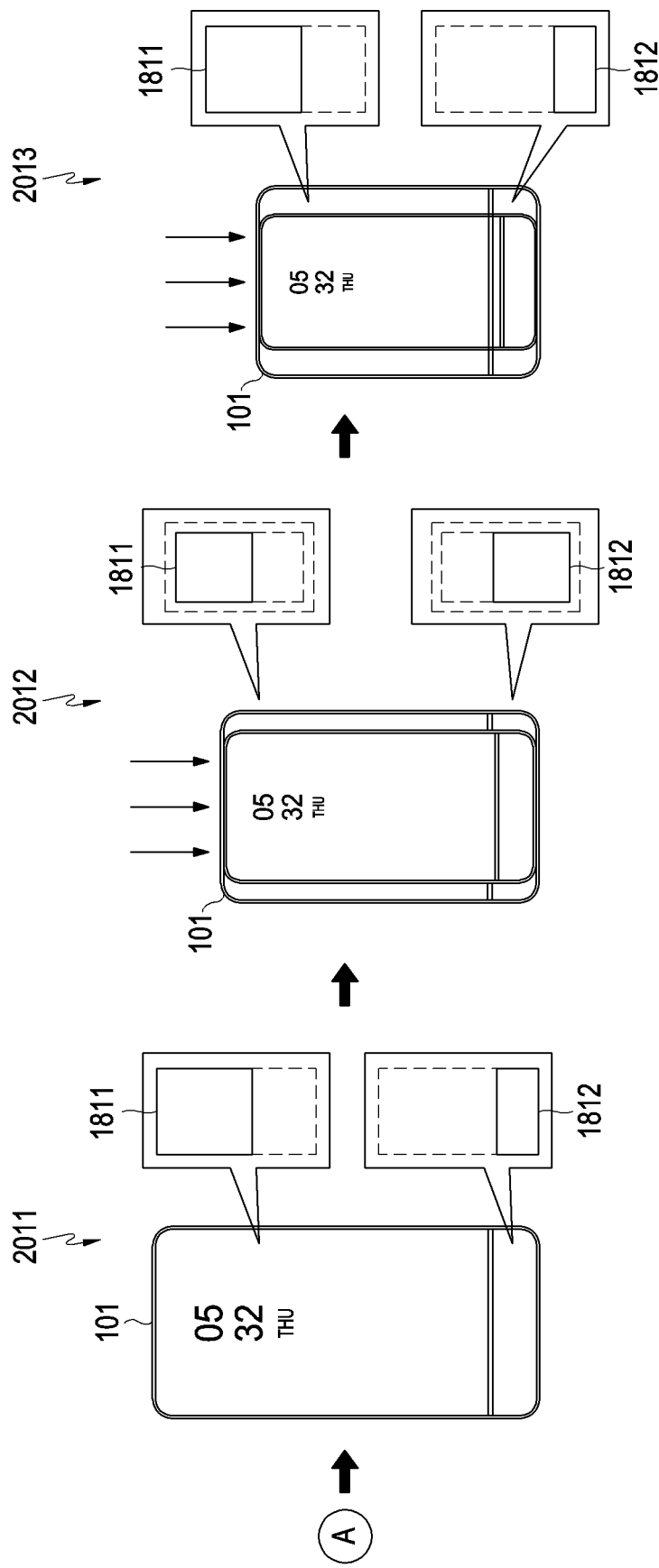
FIG. 20B is a view illustrating an example of an operation of displaying content according to the area of a first display of an electronic device according to an embodiment of the disclosure.

FIG. 20A is a view illustrating an example of an operation of displaying content according to the area of a flexible display of an electronic device according to an embodiment of the disclosure. FIG. 20B is a view illustrating an example of an operation of displaying content according to the area of a flexible display of an electronic device according to an embodiment of the disclosure.

Referring to FIG. 17, in operation 1701, the electronic device 101 may execute an application and obtain content associated with the executed application. For example, as shown in 1901 of FIG. 19, the electronic device 101 may execute and/or drive an application (or program) based on a user input (e.g., 1911 or 1912) (e.g., a user input for selecting an icon for executing the application) received through at least one of a plurality of displays (e.g., the first display 201 and the second display 203) and obtain content (e.g., application execution screen) associated with the application. Operation 1701 of the electronic device 101 may be performed like operation 1301 of the electronic device 101 as described above, and no duplicate description thereof is given below. Meanwhile, the electronic device 101 may display, on the second display 203, icons for executing applications provided by the application management module described above in connection with FIG. 7A and, when one of the displayed icons is selected, execute the application corresponding to the selected icon. This is described below with reference to FIGS. 21 to 23.

According to various embodiments, in operation 1702, the electronic device 101 may identify the distance (or length) in which the first display 201 is drawn, based on the executed application. For example, the electronic device 101 (e.g., the movement control module 731 of the first processor) may identify information about the length (e.g., height, l1) associated with the executed application from the memory 750 or the executed application 1801 as shown in FIG. 18 and identify the distance (or length) in which the first display 201 is to slide, based on the identified information about the length l1. Hereinafter, examples of the operation of identifying the information 1802 about the length associated with the application by the electronic device 101 are described.

According to various embodiments, the electronic device 101 may identify information 1802 about the length corresponding to the application executed based on the information 1802 about length pre-stored per application stored in the memory 750. For example, length-related information 1802 may be preset and stored in the memory for each of various types of applications. For example, upon creating the application, the length and width of the execution screen of the application may be set by the creator of the application. Upon downloading (or installing) the application, the electronic device 101 may obtain information about the length and width of the application execution screen, as set, together with the application, store the obtained information in the memory 750, and store and/or manage the length-related information 1802 for each of various types of applications. Accordingly, when the application is executed, the electronic device 101 may identify the length-related information 1802 corresponding to the executed application from the memory 750. Or, without limited to those described, upon executing the application, the electronic device 101 may obtain the length-related information 1802 from the executed application.

Further, according to various embodiments, the electronic device 101 may identify information associated with the application and identify (or calculate) the length-related information 1802 corresponding to the identified application-associated information. For example, the application-associated information may include information indicating attributes, such as the type of the application. The electronic device 101 may previously store length per application attribute information, compare the stored information with the attribute information obtained from the executed application, and identify the length for the executed application.

Further, according to various embodiments, the above-described application length-related information 1802 may be adjusted by the user. For example, the application management module described above in connection with FIG. 7A may manage length-related information 1802 per application, and the length may be adjusted according to the user's control, using the application management module, which is described below with reference to FIGS. 21 to 23.

According to various embodiments, in operation 1703, the electronic device 101 may control to allow the first display 201 to be drawn out by the identified distance.

Referring to FIG. 18, the electronic device 101 (e.g., the movement control module 731) may identify the distance in which the flexible display is to be drawn out, corresponding to the information 1802 about the length of the application and control the motor 1803 to slide the first display 201 by the identified distance to be drawn out. The electronic device 101 may identify the length l4 of the first display 201 necessary upon displaying the execution screen of the application, based on the identified application length-related information 1802. Further, the electronic device 101 may identify the length l1 of the currently exposed area of the first display 201 using at least one sensor. The electronic device 101 may calculate the length l4 (or distance) in which the first display 201 is to be moved based on comparison between the identified required length of the first display 201 (hereinafter, 'required length') and the area of the exposed first display 201 (hereinafter, 'exposed length') (e.g., by subtracting the calculated length from the exposed length). As an example, when the exposed length is shorter than the required length, the electronic device 101 may draw out the first display 201 by the difference between the lengths (e.g., the exposed length and the required length). As another example, when the exposed length is longer than the required length, the electronic device 101 may draw in the first display 201 by the difference. Further, when there is no difference between the lengths, the electronic device 101 may maintain the exposed area of the first display 201. Without limited to those described, the electronic device 101 may resize the execution screen of the application based on the currently exposed area of the first display 201, which is described below with reference to FIGS. 19, 20A, and 20B. The operation of moving the first display 201 by the sliding control module is the same as that described above in connection with FIG. 7A, and no duplicate description thereof is thus given below.

According to various embodiments, in operation 1704, the electronic device 101 may display a first portion of the content on the first display 201 and display a second portion of the content on the second display 203.

Referring to 1902 of FIG. 19, the electronic device 101 may display one content 1811 on the exposed area of the first display 201, drawn out by a predetermined distance, and another content 1812 on the second display 203. The electronic device 101 (e.g., the graphic processing module 741) may split the content into two portions (e.g., one content 1811 and the other content 1812) (e.g., an upper portion and a lower portion) based on the ratio of the length l2+l4 of the exposed area of the first display 201 and the length l3 of the second display 203 and display the split contents on the first display 201 and the second display 203, respectively. Further, without limited to those described, the above-described operation of sliding the first display 201 of the electronic device 101 and displaying content may be applied to the operation of displaying different contents on the respective displays (e.g., the first display 201 and the second display 203) by the electronic device 101. Operation 1704 of the electronic device 101 may be performed like operations 1301 to 1303 of the electronic device 101 as described above, and no duplicate description thereof is given below.

According to various embodiments, without limited to those described, the electronic device 101 may transform and display the execution screen of the application based on the current display size. For example, as shown in FIGS. 20A and 20B, the electronic device 101 may transform and display one content (e.g., protection screen) being displayed, based on the current entire area of the display (e.g., the sum of the exposed area of the first display 201 and the area of the second display 203) determined according to the slide-out or slide-in of the first display 201. The current entire area of the display may mean the area of the first display 201 externally exposed (or viewable by the user) and the area of the second display 203.

Referring to 2001, 2002, and 2003 of FIG. 20A, when the exposed area of the first display 201 is changed while content is displayed on the display (e.g., the first display 201 and the second display 203), the electronic device 101 may maintain the display of the portion (e.g., lower portion) of the content 1812 on the second display 203 while resizing and displaying the other portion (e.g., upper portion) of the content 1811 displayed on the changed exposed area of the first display 201. In this case, the electronic device 101 may crop the upper portion of the content displayed on the first display 201 to correspond to the exposed area of the first display 201 and display it.

Referring to 2011, 2012, and 2013 of FIG. 20B, the electronic device 101 may resize the entire size of the entire content (e.g., 1811 and 1812) into the area corresponding to the current area of the display and display the resized content.

Another example of an operation of an electronic device 101 is described below according to various embodiments.

According to various embodiments, the electronic device 101 may execute the application using the application management module 734 described above in connection with FIG. 7A and slide the first display 201 based on the information associated with the executed application. As described above, the application management module 734 may be implemented as a function (e.g., specific menu) provided by a kind of application, program, or a specific application (e.g., settings application). An example in which the application management module 734 is implemented as a kind of application or program is described below, but the following description may also be applied to other embodiments (e.g., a specific menu of the settings application).

Figure 21:
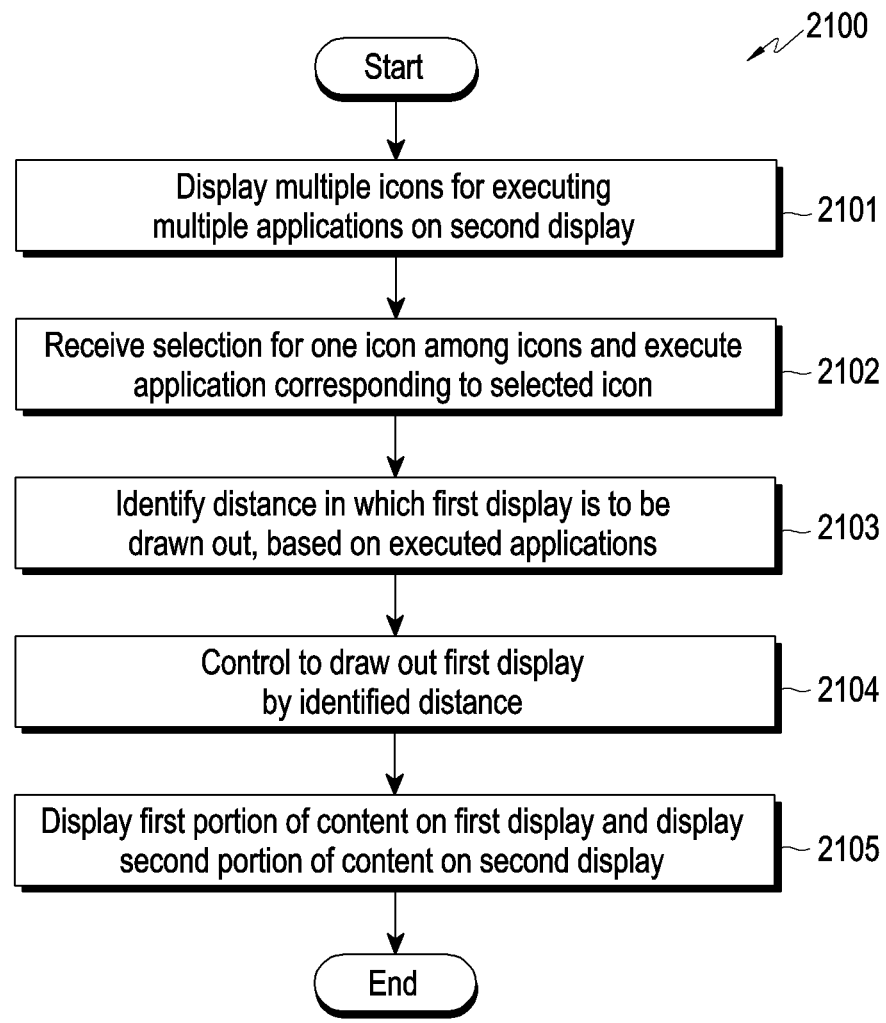
FIG. 21 is a flowchart illustrating another example of an operation of an electronic device according to an embodiment of the disclosure.

FIG. 21 is a flowchart illustrating another example of an operation of an electronic device according to an embodiment of the disclosure. According to various embodiments, the operations shown in FIG. 21 representing flowchart 2100 are not limited to the shown order but may rather be performed in other various orders. According to various embodiments, more or less operations than those of FIG. 21 may be performed. FIG. 21 is described below with reference to FIGS. 22 and 23.

Figure 22:
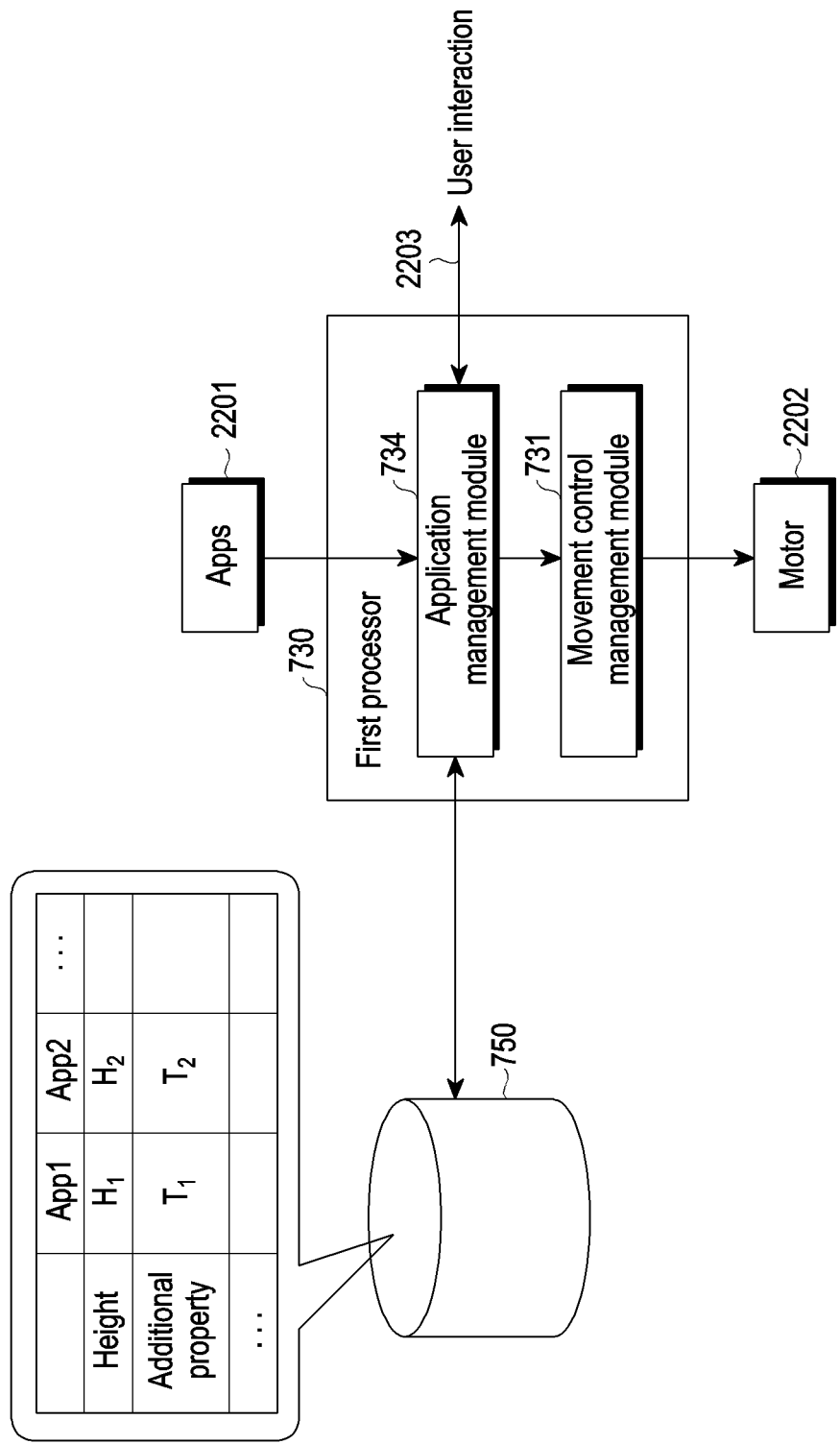
FIG. 22 is a view illustrating an example of an operation based on an application management module of an electronic device according to an embodiment of the disclosure.

FIG. 22 is a view illustrating an example of an operation based on an application management module of an electronic device according to an embodiment of the disclosure.

Figure 23:
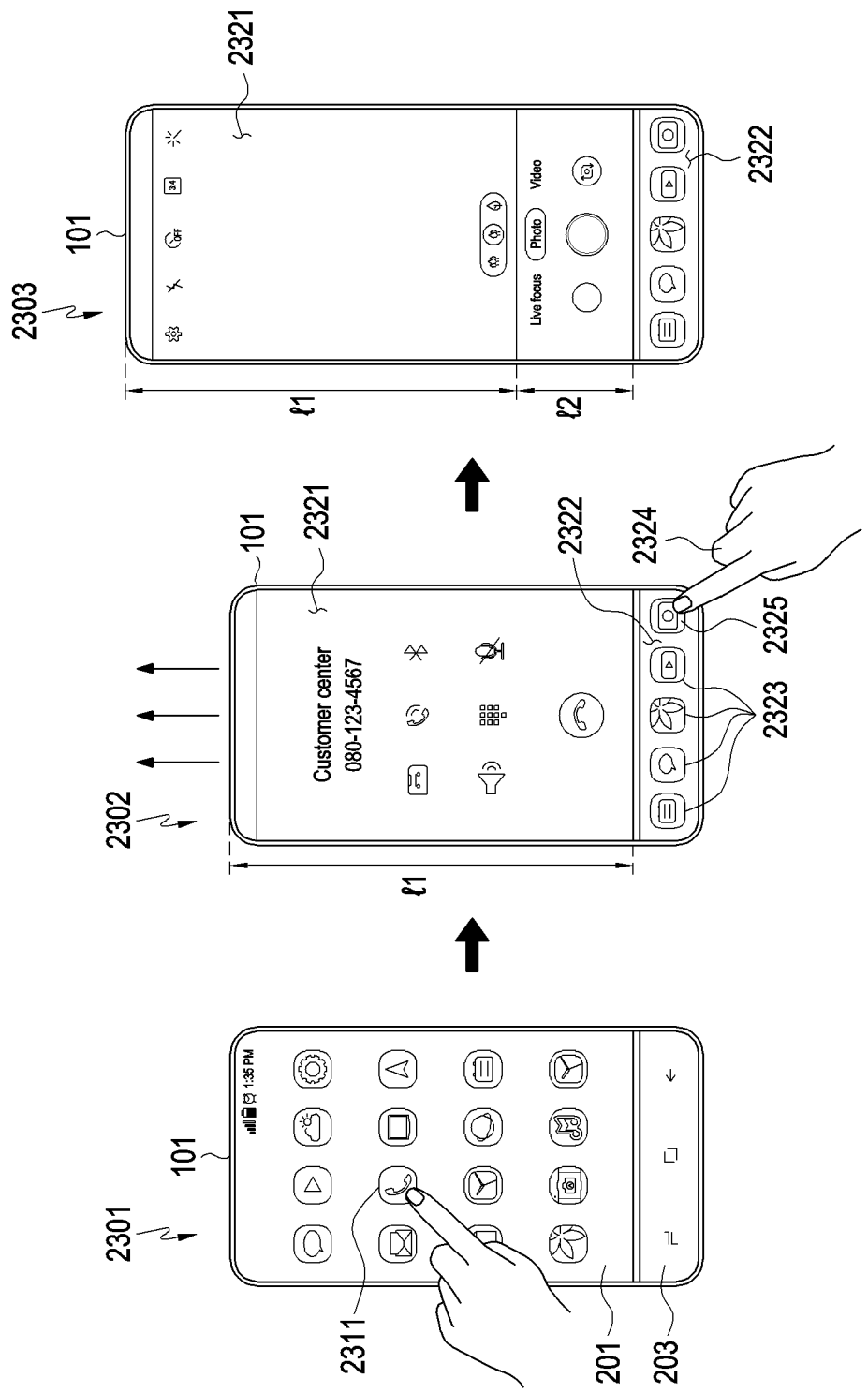
FIG. 23 is a view illustrating an example of an operation of executing an application and sliding a first display based on an application management module of an electronic device according to an embodiment of the disclosure.

FIG. 23 is a view illustrating an example of an operation of executing an application and sliding a flexible display based on an application management module of an electronic device according to an embodiment of the disclosure.

Referring to FIG. 21, in operation 2101, the electronic device 101 may display a plurality of icons 2323 for executing a plurality of applications on the second display 203. For example, as shown in 2301 of FIG. 23, the electronic device 101 may identify an occurrence of an event to execute and/or invoke the application management module 734 while displaying one content (e.g., home screen). The electronic device 101 may execute the application management module 734 based on the identified occurrence of the event and display a screen 2322 including a plurality of icons 2323 for executing the plurality of applications on a rigid application as shown in 2302 of FIG. 23, as the execution screen of the executed application management module 734. Upon receiving the user's drag input on the screen, the electronic device 101 may switch the screen and sequentially display icons for executing other applications according to the drag input, instead of the icons 2323. Without limited to those described, the screen including the icons 2323 may also be displayed on the first display 201. Hereinafter, examples of events for executing the application management module 734 are described.

For example, the event for executing the application management module 734 may include execution of one application. When one application (e.g., execution according to selection of one icon 2311) is executed, the electronic device 101 may automatically execute the application management module 734. As shown in 2302 of FIG. 23, the electronic device 101 may display the execution screen 2321 of the executed application on the first display 201 and display a screen 2322 including a plurality of icons 2323 on the second display 203 based on the execution of the application management module 734. In this case, the electronic device 101 may execute the application management module 734 only when a designated application among the plurality of applications installed on the electronic device 101 is executed. For example, when an application for interworking with the application management module 734 is selected from among the plurality of applications installed on the electronic device 101 in the settings window of the application management module 734, the electronic device 101 may set the application management module 734 to be executed when the selected application is executed.

As another example, the event may include detecting a preset user input on the second display 203. The electronic device 101 may display a portion of the screen 2322 including the plurality of icons 2323 on an edge portion of the display (e.g., the second display 203) and, when the displayed portion is moved by the user's drag input, display the entire screen 2322. For example, the screen 2322 including the plurality of icons 2323 may be implemented as a movable drawer.

As another example, the event for executing the application management module 734 may include selecting an object (e.g., icon) for executing and/or invoking the application management module 734.

According to various embodiments, the electronic device 101 may edit information associated with the plurality of applications managed (or executed) by the application management module 734 according to the user's control 2203. For example, the electronic device 101 may set only applications selected by the user among the plurality of applications to be managed by the application management module 734. The electronic device 101 may display a screen for editing the applications managed by the application management module 734 based on a user input (e.g., selecting the object for displaying the execution screen of the application management module 734) and display information about the plurality of applications installed on the electronic device 101 on the displayed screen. The electronic device 101 may receive a user input for selecting at least one application among the plurality of applications and allow the selected at least one application to be managed by the application management module 734. Accordingly, when the application management module 734 is executed, the electronic device 101 may display a screen including at least one icon for executing the at least one application managed by the application management module 734.

According to various embodiments, in operation 2102, the electronic device 101 may receive a selection for one icon from among the icons 2323 and execute the application corresponding to the selected icon. For example, as shown in 2302 of FIG. 23, the electronic device 101 may receive a user input 2324 for selecting one icon 2325 from among the plurality of icons 2323 displayed on the second display 203 and execute the application (e.g., camera application) corresponding to the selected icon 2325.

According to various embodiments, the electronic device 101 may identify the distance in which the first display 201 is to be drawn out, based on the applications executed in operation 2103. For example, the electronic device 101 may identify information about the length of the application from the memory 750 or the application 2201, using the application management module 734 as shown in FIG. 22. For example, the application management module 734 may identify application length-related information preset in the application or information about the length corresponding to the application attribute information (e.g., type of application). The identified length-related information may be adjusted according to a user input. The operation of identifying the application length-related information based on the application management module 734 is the same as that described above in connection with FIG. 7B, and no duplicate description thereof is thus given below. The electronic device 101 may identify (or calculate) the length l3 (or distance) in which the first display 201 is to be drawn out, based on the current exposed length l1 of the first display 201 and the identified application length-related information. The operation of identifying the distance in which the first display 201 is to be drawn out in operation 2103 by the electronic device 101 may be performed like operation 1703 of the electronic device 101 as described above, and no duplicate description thereof is thus given below.

According to various embodiments, in operation 2104, the electronic device 101 may control to allow the first display 201 to be drawn out by the identified distance.

Referring to FIG. 22, the electronic device 101 (e.g., the movement control module 731) may drive the motor 2202 based on information about the length to be drawn out, obtained using the application management module 734 and control the first display 201 to slide by a predetermined length. Operation 2104 of the electronic device 101 may be performed like operation 1703 of the electronic device 101 as described above, and no duplicate description thereof is given below.

According to various embodiments, in operation 2105, the electronic device 101 may display first content on the first display 201 and second content on the second display 203.

Referring to 2303 of FIG. 23, the electronic device 101 may display an execution screen of the executed application (e.g., camera application) on the first display 201 and maintain the display of the screen 2322 including the plurality of icons 2323 on the second display 203. In this case, the icon 2325 selected on the second display 203 may disappear from the second display 203. An icon 2325 corresponding to a new application may be displayed in the disappearing position. Further, without limited to those described, when the display of the icon 2325 is maintained, and the icon 2325 is selected again, the corresponding application (e.g., camera application) may terminate execution or switch to background mode.

Another example of an operation of an electronic device 101 is described below according to various embodiments.

According to various embodiments, different contents (e.g., execution screens) associated with one application may be displayed according to the current entire area of the display (e.g., the sum of the exposed area of the first display 201 and the area of the second display 203).

Figure 24:
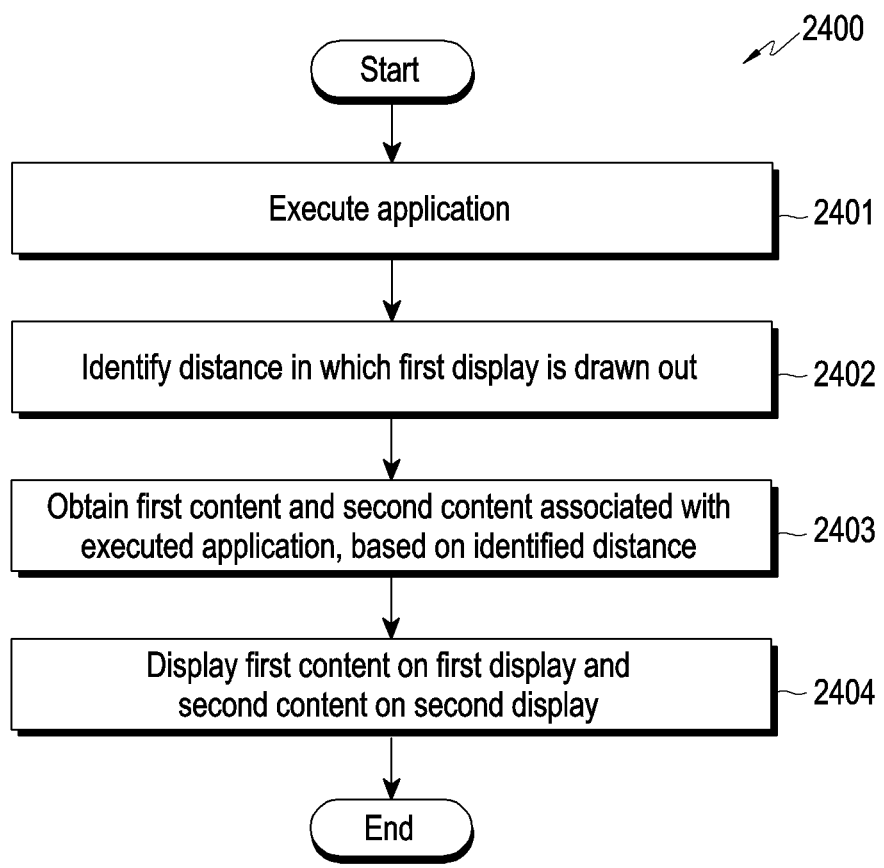
FIG. 24 is a flowchart illustrating another example of an operation of an electronic device according to an embodiment of the disclosure.

FIG. 24 is a flowchart illustrating another example of an operation of an electronic device according to an embodiment of the disclosure. According to various embodiments, the operations shown in FIG. 24 representing flowchart 2400 are not limited to the shown order but may rather be performed in other various orders. According to various embodiments, more or less operations than those of FIG. 24 may be performed. FIG. 24 is described below with reference to FIGS. 25 and 26.

Figure 25:
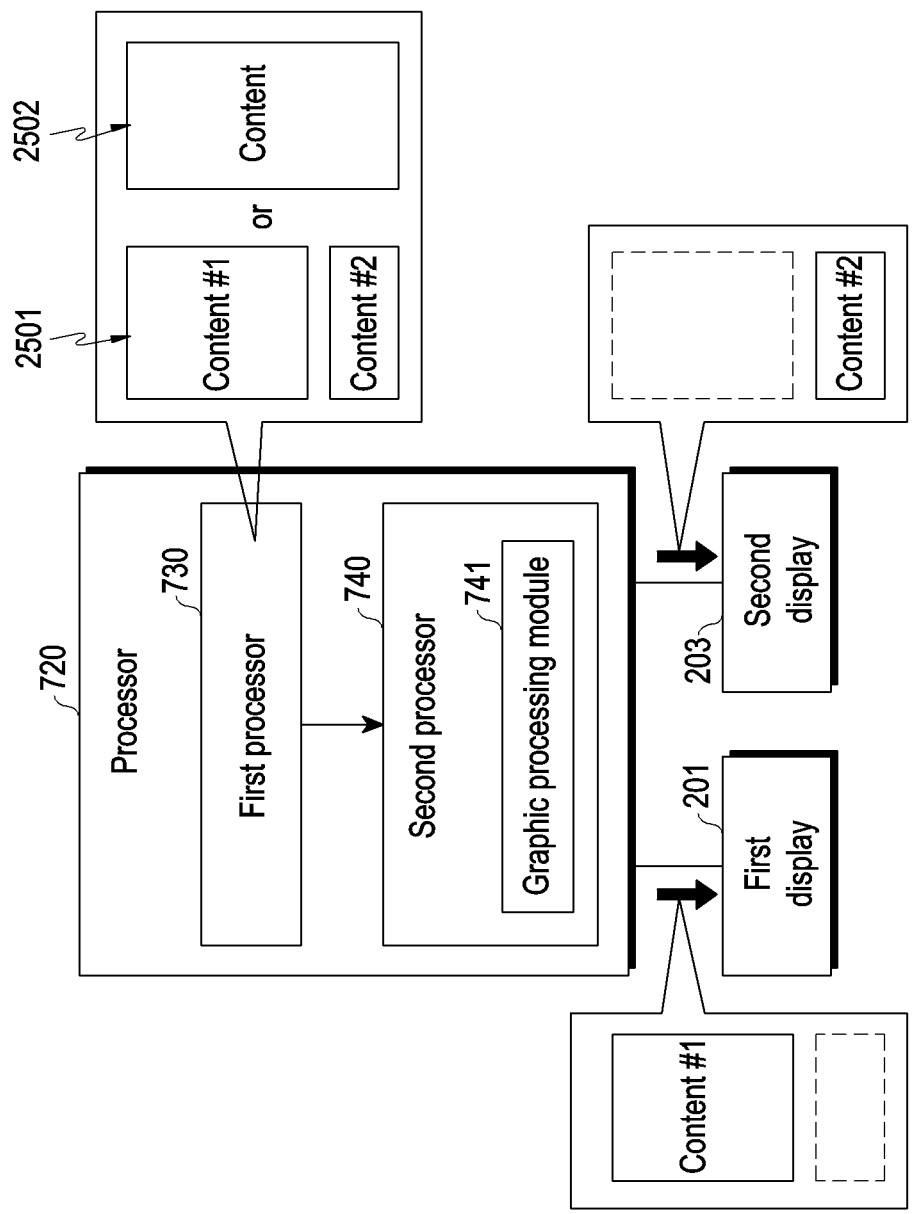
FIG. 25 is a view illustrating an example of an operation of displaying content by an electronic device according to an embodiment of the disclosure.

FIG. 25 is a view illustrating an example of an operation of displaying content by an electronic device according to an embodiment of the disclosure.

Figure 26:
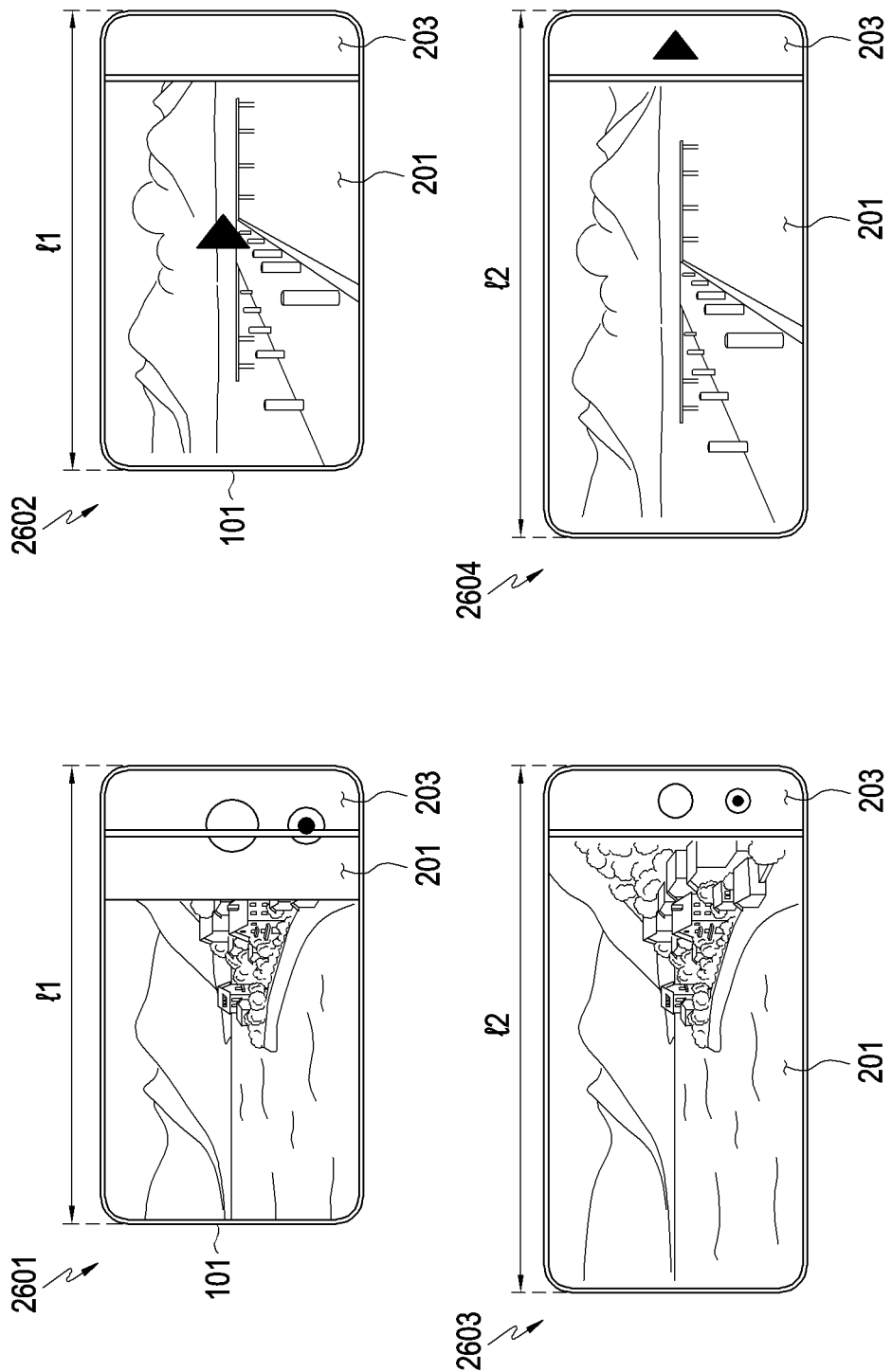
FIG. 26 is a view illustrating an example of an operation of displaying content based on the entire area of a display of an electronic device according to an embodiment of the disclosure.

FIG. 26 is a view illustrating an example of an operation of displaying content based on the entire area of a display of an electronic device according to an embodiment of the disclosure.

Referring to FIG. 24, according to various embodiments, the electronic device 101 may execute an application in operation 2401. For example, the electronic device 101 may execute and/or drive an application (or program) based on a user input (e.g., a user input for selecting an icon for executing the application) received through at least one of a plurality of displays (e.g., the first display 201 and the second display 203) and obtain content (e.g., application execution screen) associated with the application.

Referring to FIG. 25, the electronic device 101 (e.g., the first processor 730) may obtain at least two or more contents 2501 (e.g., a screen including split content areas and a screen including a control area) or one content 2502 (e.g., a single screen including a content area and a control area). Operation 2401 of the electronic device 101 may be performed like operation 1301 of the electronic device 101 as described above, and no duplicate description thereof is given below.

According to various embodiments, in operation 2402, the electronic device 101 may identify the current entire area of the display. For example, referring to FIG. 26, the electronic device 101 may identify the current exposed area of the first display 201 and add the identified exposed area of the first display 201 to the area of the second display 203 to identify the current entire area of the display (e.g., 11 and 12 of FIG. 26). The electronic device 101 may identify the moved distance of the first display 201 using at least one sensor and identify the exposed area of the first display 201 based on the identified distance.

According to various embodiments, in operation 2403, the electronic device 101 may obtain first content and second content associated with the executed application, based on the identified entire area. The electronic device 101 may identify the content to be displayed among two kinds of contents based on the result of comparison between the identified entire area of the display and a threshold. For example, when the current entire area of the display exceeds a preset value, the electronic device 101 may identify (2603 and 2604 of FIG. 26) the at least two or more contents as the content to be displayed and, when the current entire area of the display is less than the preset value, identify (2601 and 2602 of FIG. 26) the single content as the content to be displayed. As an example, the electronic device 101 may obtain at least two or more contents to be displayed among contents associated with the application in the opened state (e.g., a state in which the first display 201 is maximally drawn out) and obtain a single content to be displayed among the contents associated with the application in the closed state (e.g., a state in which the first display 201 is maximally drawn in).

According to various embodiments, various types of applications may include different execution screens per area of the first display 201. For example, a specific application may include a first execution screen to be displayed on a larger display (e.g., the entire area of the display is a preset value or more) and a second execution screen to be displayed on a smaller display, in an application state for implementing a specific function. Accordingly, the electronic device 101 may identify and display a type of execution screen corresponding to the entire area of the display as described above. Further, without limited to those described, rather than implementing an execution screen corresponding to each entire area of the display, one execution screen may be implemented and be resized to correspond to the respective areas of the displays.

According to various embodiments, in operation 2404, the electronic device 101 may display first content on the first display 201 and second content on the second display 203. For example, as shown in 2601 and 2602 of FIG. 26, the electronic device 101 may display one portion of one content on the first display 201 and another portion on the second display 203.

Referring to 2603 and 2604 of FIG. 26, the electronic device 101 may display one content (e.g., a screen including a content area) associated with one application on the first display 201 and another content (e.g., a screen including a control area) on the second display 203.

Another example of an operation of an electronic device 101 is described below according to various embodiments.

According to various embodiments, the electronic device 101 may receive the user's multi-input on a plurality of displays (e.g., the first display 201 and the second display 203). The electronic device 101 may perform different operations according to the attribute (e.g., reception time of input or reception position of input) of the user's multi-input received on each of the displays (e.g., the first display 201 and the second display 203).

Figure 27:
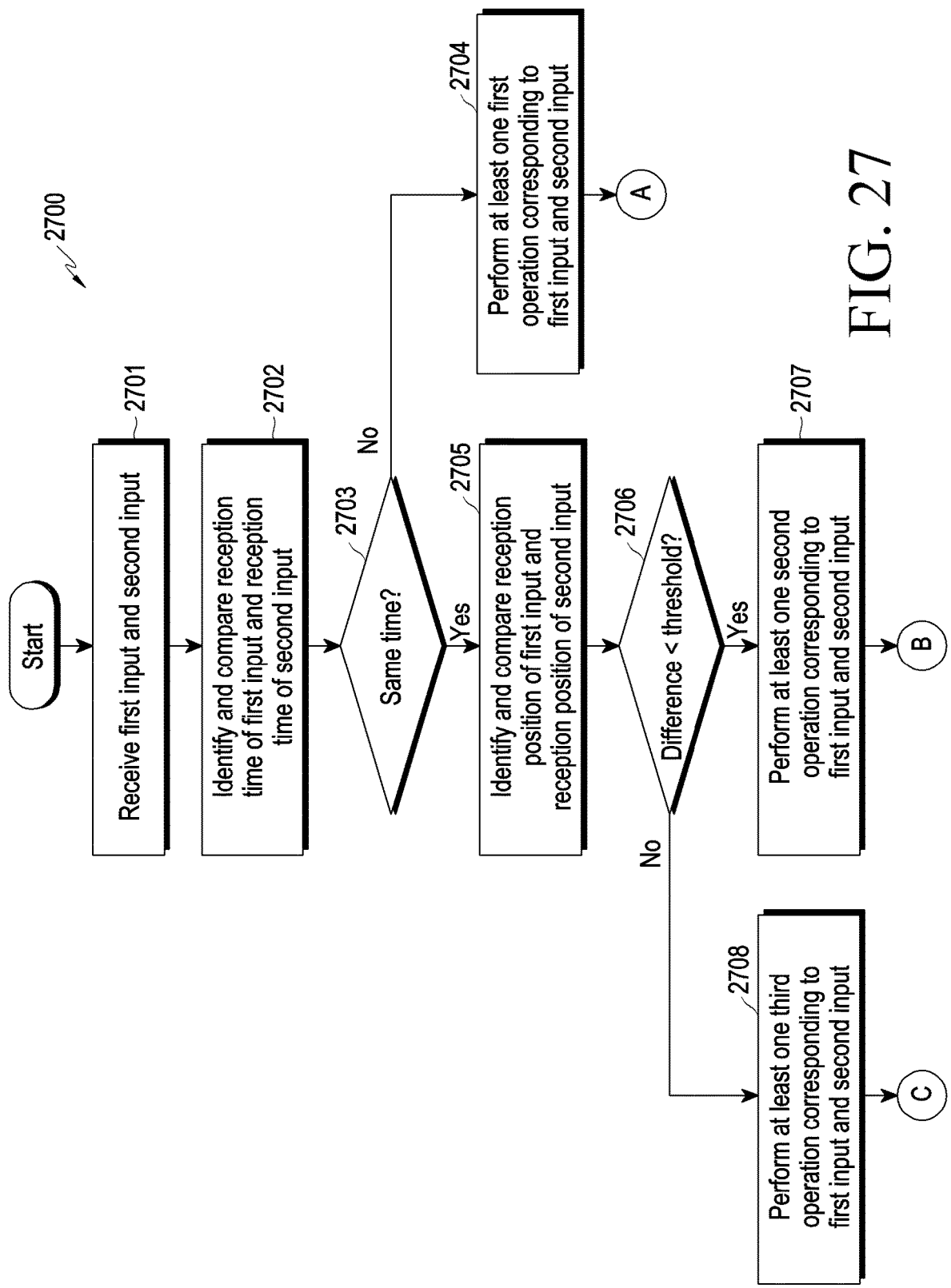
FIG. 27 is a flowchart illustrating another example of an operation of an electronic device according to an embodiment of the disclosure.

FIG. 27 is a flowchart illustrating another example of an operation of an electronic device 101 according to an embodiment of the disclosure. According to various embodiments, the operations shown in FIG. 27 representing flowchart 2700 are not limited to the shown order but may rather be performed in other various orders. According to various embodiments, more or less operations than those of FIG. 27 may be performed. FIG. 27 is described below with reference to FIG. 28.

Figure 28:
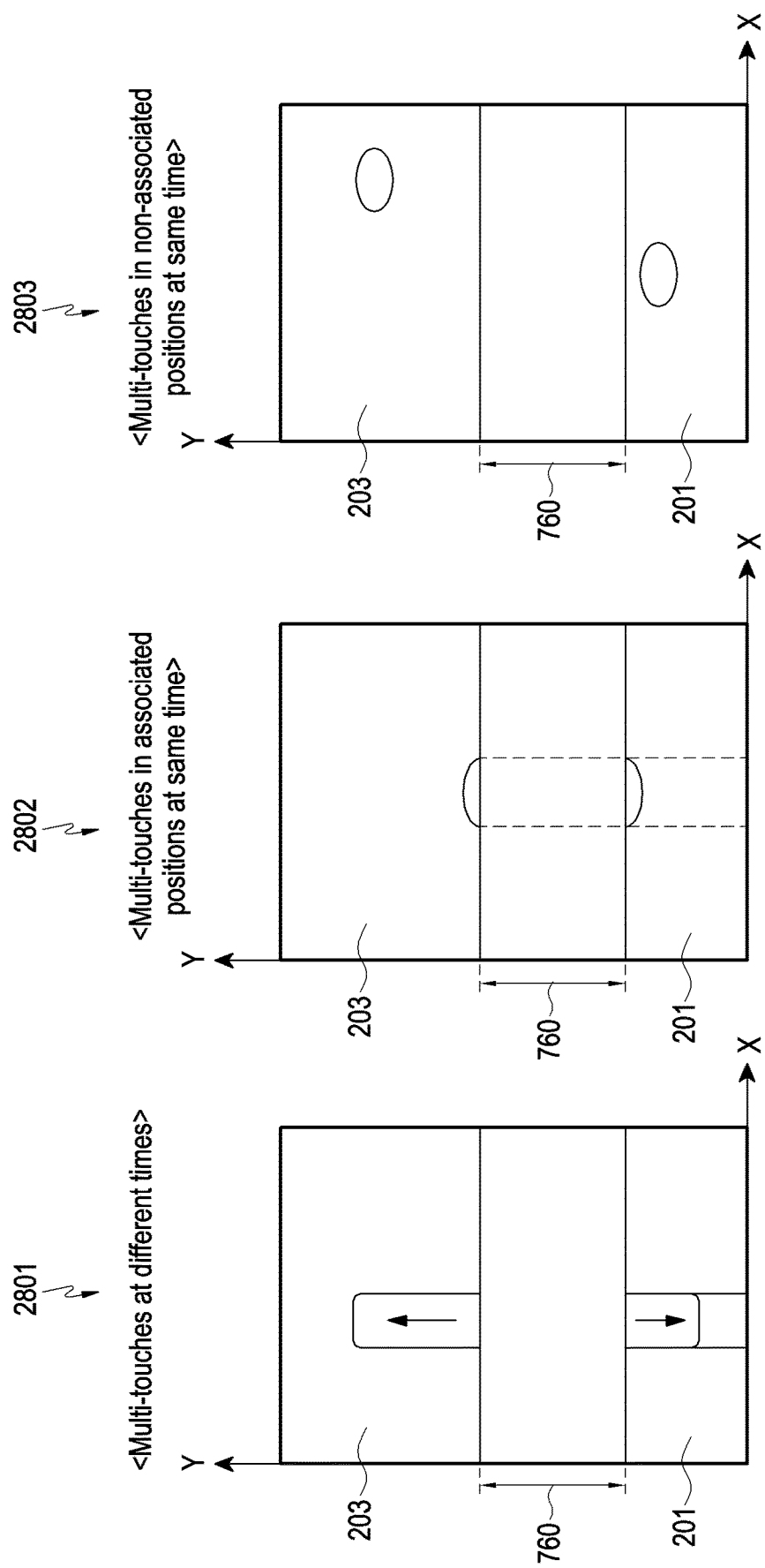
FIG. 28 is a view illustrating examples of types of multi-inputs received by an electronic device according to an embodiment of the disclosure.

FIG. 28 is a view illustrating examples of types of multi-inputs received by an electronic device according to an embodiment of the disclosure.

Referring to FIG. 27, according to various embodiments, in operation 2701, the electronic device 101 may receive a first input on the first display 201 and a second input on the second display 203. For example, the electronic device 101 may receive (e.g., 2801 of FIG. 28) a user input on each of the first display 201 and the second display 203, at a different time. As another example, the electronic device 101 may receive a user input at the same time (i.e., simultaneously) on each of the first display 201 and the second display 203. The user inputs received at the same time may be received (e.g., 2802 of FIG. 28) in positions associated with each other, of the displays (e.g., the first display 201 and the second display 203) or received (e.g., 2803 of FIG. 28) in positions not associated with each other (or different positions). The electronic device 101 may identify the respective reception positions of the user inputs received at the same time and perform different operations based on whether the identified positions are associated with each other, which is described below in connection with the operations of the electronic device 101 of FIGS. 29 to 44.

According to various embodiments, in operation 2702, the electronic device 101 may identify and compare the reception time of the first input and the reception time of the second input. When the reception times (e.g., the reception time of the first input and the reception time of the second input) are determined to be different from each other as a result of comparison in operation 2703, the electronic device 101 may perform at least one first operation in operation 2704. For example, the electronic device 101 (e.g., touch detection module) may sequentially receive inputs on the first display 201 and the second display 203 as shown in 2801 of FIG. 28. As an example, the electronic device 101 may receive a touch input on the first display 201 and, as the received touch input continuously moves onto the second display 203, receive a touch input (or drag input) on the second display 203. As another example, the electronic device 101 may receive a touch input continuously moved from the rigid display to the first display 201. The electronic device 101 may identify information about the reception time of the user input received from the input detection circuit (e.g., the first input detection circuit 771 or the second input detection circuit 772) provided in each display and determine that the inputs are received at different times based on the identified time information. The electronic device 101 may integrate and identify the information about the respective positions of the inputs. In this case, as described above, the electronic device 101 may identify information about the respective positions of the inputs further considering the coordinates 760 of the received area of the first display 201. The electronic device 101 may perform at least one operation corresponding to the inputs received at different times, and examples of the operation are described below in connection with the operation of the electronic device 101 of FIGS. 29 to 36.

According to various embodiments, in operation 2702, the electronic device 101 may identify and compare the reception time of the first input and the reception time of the second input. In operation 2703, the electronic device 101 may determine that the reception times (e.g., the reception time of the first input and the reception time of the second input) are the same as a result of determining whether the reception times are the same (or correspond to each other).

Referring to 2802 of FIG. 28, the electronic device 101 may receive the user's touch input on a portion of the exposed area of the first display 201 and a portion of the second display 203 adjacent to the portion of the exposed area. For example, when the user's body part (e.g., finger) contacts between the first display 201 and the second display 203, the electronic device 101 may identify that a portion of the body part contacts the first display 201, and another portion of the body part contacts the second display 203. As another example, as shown in 2803 of FIG. 28, the electronic device 101 may receive a first touch input on a portion of the exposed area of the first display 201 and a second touch input on the area of the second display 203 spaced apart by a predetermined distance. For example, the electronic device 101 may detect that the user's body part (e.g., the index finger of the left hand) contacts the first display 201, and another body part (e.g., the index finger of the right hand) of the user contacts the second display 203. Upon receiving a user input as described above, the electronic device 101 may obtain information about the reception time of each of the inputs received from the input detection circuits of the displays, compare the reception times, and identify that the inputs are simultaneously received.

According to various embodiments, the electronic device 101 may identify and compare the reception position of the first input and the reception position of the second input in operation 2705, based on the reception times of the inputs (e.g., the first input and second input) being the same. For example, the electronic device 101 may identify information about positions (e.g., coordinates) in the respective specific directions (e.g., x-axis direction and y-axis direction) of the received inputs based on the information about the inputs obtained from the input detection circuits provided in the displays. As described above in connection with FIG. 7B, the electronic device 101 may integrate the coordinate system of the first display 201 and the coordinate system of the second display 203 into one coordinate system, compare the positions (e.g., coordinates) of the inputs received on the different displays (e.g., the first display 201 and the second display 203) on the integrated coordinate system, and identify the degree of association of the positions. For example, the electronic device 101 may identify (or calculate) the difference between first coordinates in the specific directions (e.g., x-axis direction and y-axis direction) of the first input received on the first display 201 and second coordinates in the specific directions (e.g., x-axis direction and y-axis direction) of the second input received on the second display 203. The electronic device 101 may determine that as the difference between the coordinates decreases, the degree of association of the positions where the inputs are received increases.

According to various embodiments, upon performing position comparison, the electronic device 101 may further reference (or reflect) information about the coordinates 760 (or information about area) of the drawn-in area (i.e., non-exposed area) of the first display 201 in the comparison operation. For example, upon comparing the positions in the y-axis direction (or length direction or vertical direction) of the two inputs, the electronic device 101 may further reflect information about the coordinates 760 of the drawn-in area of the first display 201. For example, when the coordinate in the y-axis direction of the first input is a first coordinate, and the coordinate in the length direction of the second input is a second coordinate, the electronic device 101 may calculate the difference between the first coordinate and the second coordinate and identify the final difference value by subtracting the length in the y-axis direction of the drawn-in area of the first display 201 from the calculated difference. The electronic device 101 may determine that as the final difference value decreases, the degree of association of the positions where the inputs are received increases.

According to various embodiments, upon identifying that the difference identified based on the result of comparison is smaller than a threshold in operation 2706, the electronic device 101 may perform at least one second operation corresponding to the first input and the second input in operation 2707. For example, the electronic device 101 may perform at least one operation corresponding to the inputs received in positions associated with each other at the same time, and examples of the operation are described below in connection with the operation of the electronic device 101 of FIGS. 37 to 40.

According to various embodiments, upon identifying that the difference identified based on the result of comparison is larger than or equal to the threshold in operation 2706, the electronic device 101 may perform at least one third operation corresponding to the first input and the second input in operation 2708. For example, the electronic device 101 may perform at least one operation corresponding to the inputs received in positions not associated with each other (different or spaced apart from each other) at the same time, and examples of the operation are described below in connection with the operation of the electronic device 101 of FIGS. 41 to 44.

Hereinafter, various examples of the operation of the electronic device 101 based on the type of a multi-input (e.g., multi-inputs received at different times, multi-inputs simultaneously received in positions associated with each other, or multi-inputs received in positions not associated with each other at different times) by the above-described electronic device 101 are described.

Hereinafter, another example of an operation based on multi-inputs received at different times by the electronic device 101 according to various embodiments is described.

According to various embodiments, the electronic device 101 may receive multi-inputs received at different times while displaying one content (e.g., lock screen), identify information (e.g., pattern) corresponding to the received multi-inputs, and perform at least one operation (e.g., release the lock screen).

Figure 29:
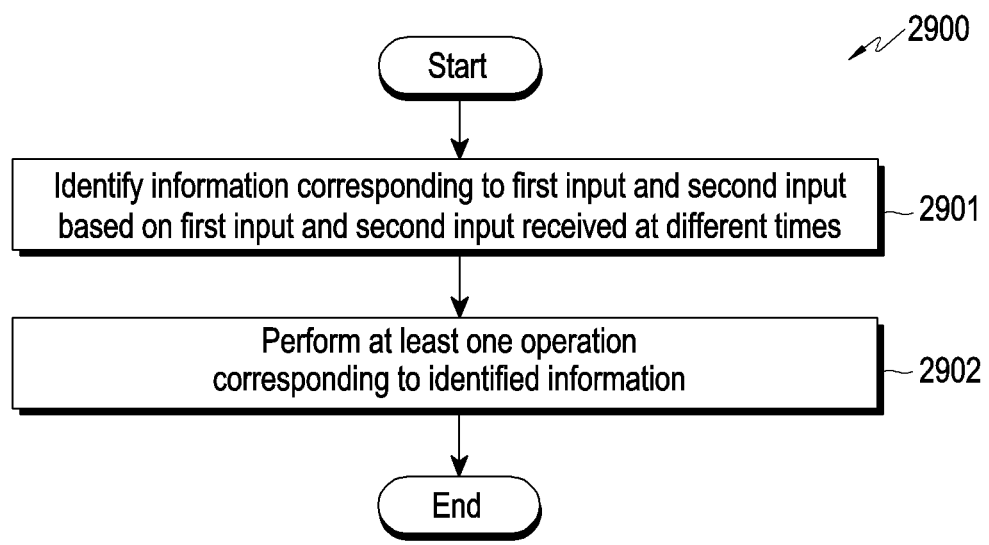
FIG. 29 is a flowchart illustrating another example of an operation of an electronic device according to an embodiment of the disclosure.

FIG. 29 is a flowchart illustrating another example of an operation of an electronic device according to an embodiment of the disclosure. According to various embodiments, the operations shown in FIG. 29 representing flowchart 2900 are not limited to the shown order but may rather be performed in other various orders. According to various embodiments, more or less operations than those of FIG. 29 may be performed. FIG. 29 is described below with reference to FIG. 30.

Figure 30:
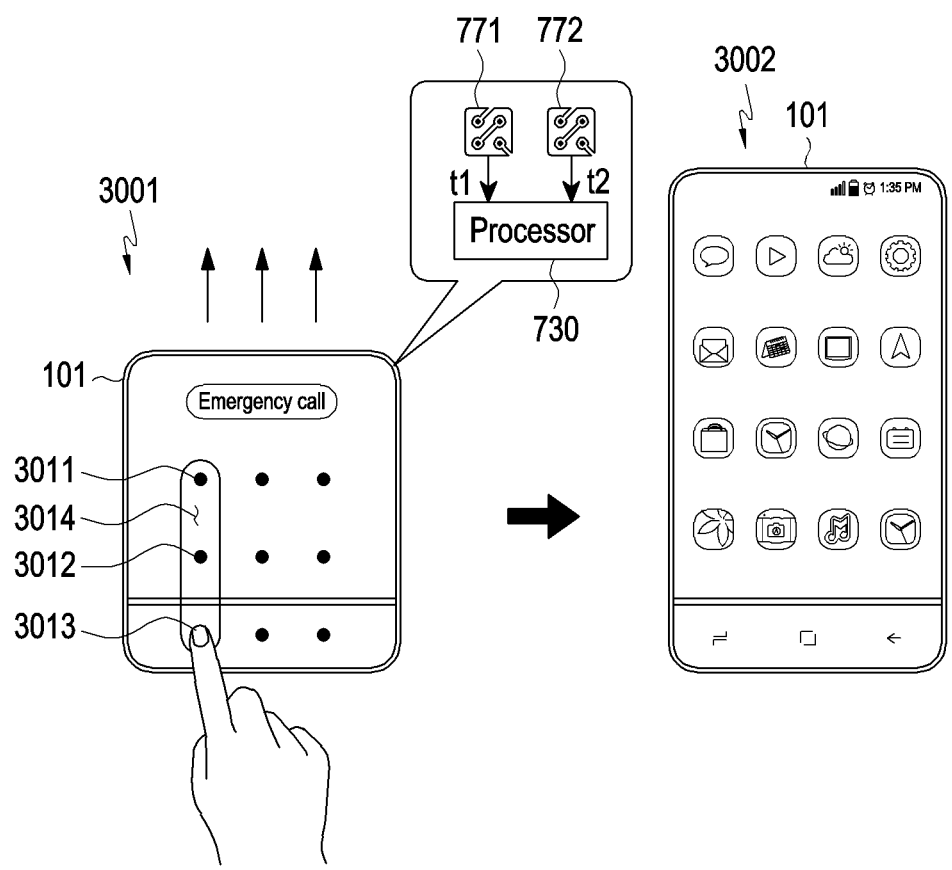
FIG. 30 is a view illustrating an example of performing at least one operation based on multi-inputs received by an electronic device at different times according to an embodiment of the disclosure.

FIG. 30 is a view illustrating an example of performing at least one operation based on multi-inputs received by an electronic device at different times according to an embodiment of the disclosure.

Referring to FIG. 29, according to various embodiments, in operation 2901, the electronic device 101 may identify information corresponding to a first input and a second input based on the first input and the second input received at different times. For example, the electronic device 101 may receive attribute information about the inputs (e.g., information about the positions of the inputs or information about the reception times of the inputs) from the respective input detection circuits of the displays based on user inputs received at different times on two displays (e.g., the first display 201 and the second display 203) while displaying one screen (e.g., unlock screen) for obtaining user inputs. As an example, when the electronic device 101 wakes up in the locked state of the electronic device 101, the electronic device 101 may display a portion of the lock screen on the first display 201 and another portion on the second display 203. The portions of the lock screen respectively displayed on the two displays (e.g., the first display 201 and the second display 203) may include objects 3011, 3012, and 3013 selectable by a user input as shown in 3001 of FIG. 30. The electronic device 101 may receive a user input (e.g., a drag input) 3014 moved on the lock screen displayed on the two displays (e.g., the first display 201 and the second display 203). The electronic device 101 (e.g., the first processor 730) may obtain information about the positions (e.g., coordinates) received at different times t1 and t2 from the input detection circuits (e.g., the first input detection circuit 771 and the second input detection circuit 772) respectively implemented in the two displays based on the moved user input and compare the obtained position-related information and the objects 3011, 3012, and 3013 and identify selected objects. One screen displayed on the electronic device 101 is not limited to the above-described examples and may include the execution screens (e.g., execution screen implemented to provide the function of displaying objects according to the user input) of various types of applications (e.g., drawing application) to obtain a user input and identify and/or provide information (e.g., hand writing) corresponding to the user input.

According to various embodiments, in operation 2902, the electronic device 101 may perform at least one operation corresponding to the identified information. For example, the electronic device 101 may identify the pattern based on the objects 3011, 3012, and 3013 selected by the drag input received on the first display 201 and the second display 203 and determine whether the identified pattern is a pattern for unlocking. In this case, the electronic device 101 may display an object (e.g., a line) for connecting the objects selected on the two displays (e.g., the first display 201 and the second display 203) according to a user input, on the two displays. When the pattern is a pattern for unlocking, the electronic device 101 may release the locked state of the electronic device 101 and display the home screen as shown in 3002 of FIG. 30. Without limited to those described, the electronic device 101 may perform the operation of displaying an object (e.g., a handwriting, line, or figure) according to the drag input received on the execution screens of various types of applications (e.g., drawing application).

According to various embodiments, when the locked state is released, the electronic device 101 may slide the first display 201 by a predetermined distance. For example, the distance in which the first display 201 is to slide may be identified based on information about the length of the execution screen of the application displayed when the locked state of the electronic device 101 is released or information about a distance preset by the user. For example, when unlocked, the electronic device 101 may slide (e.g., draw out or draw in) the first display 201 by the distance corresponding to the information about the length of the execution screen of one application displayed. The operation of sliding the first display 201 based on the information about the length of the execution screen of the application by the electronic device 101 may be performed like the operation of the electronic device 101 described above in connection with FIGS. 17 to 23, and no duplicate description thereof is thus given below.

Another example of an operation of an electronic device 101 is described below according to various embodiments.

According to various embodiments, the electronic device 101 may display a plurality of icons for executing a plurality of applications on a rigid application based on the application management module.

Figure 31:
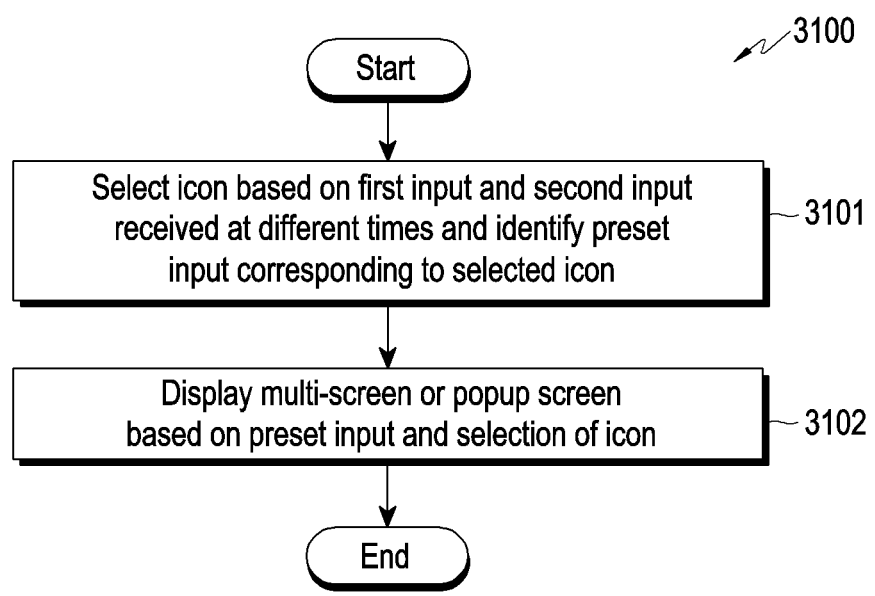
FIG. 31 is a flowchart illustrating another example of an operation of an electronic device according to an embodiment of the disclosure.

FIG. 31 is a flowchart illustrating another example of an operation of an electronic device according to an embodiment of the disclosure. According to various embodiments, the operations shown in FIG. 31 representing flowchart 3100 are not limited to the shown order but may rather be performed in other various orders. According to various embodiments, more or less operations than those of FIG. 31 may be performed. FIG. 31 is described below with reference to FIGS. 32 and 34.

Figure 32:
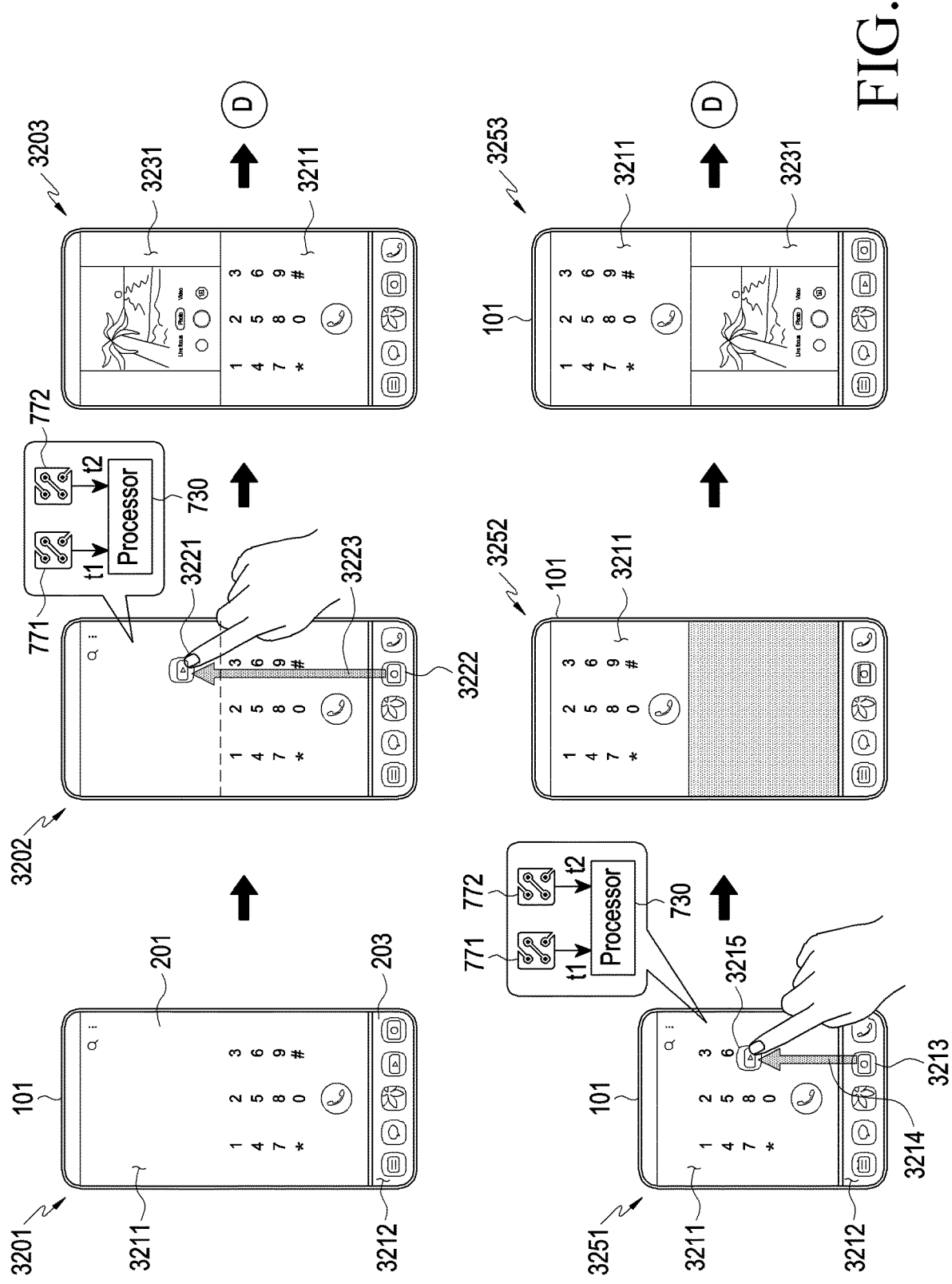
FIG. 32 is a view illustrating an example of an operation of displaying multi-screens based on multi-touches received by an electronic device at different times according to an embodiment of the disclosure.

FIG. 32 is a view illustrating an example of an operation of displaying multi-screens based on multi-touches received by an electronic device at different times according to an embodiment of the disclosure.

Figure 33:
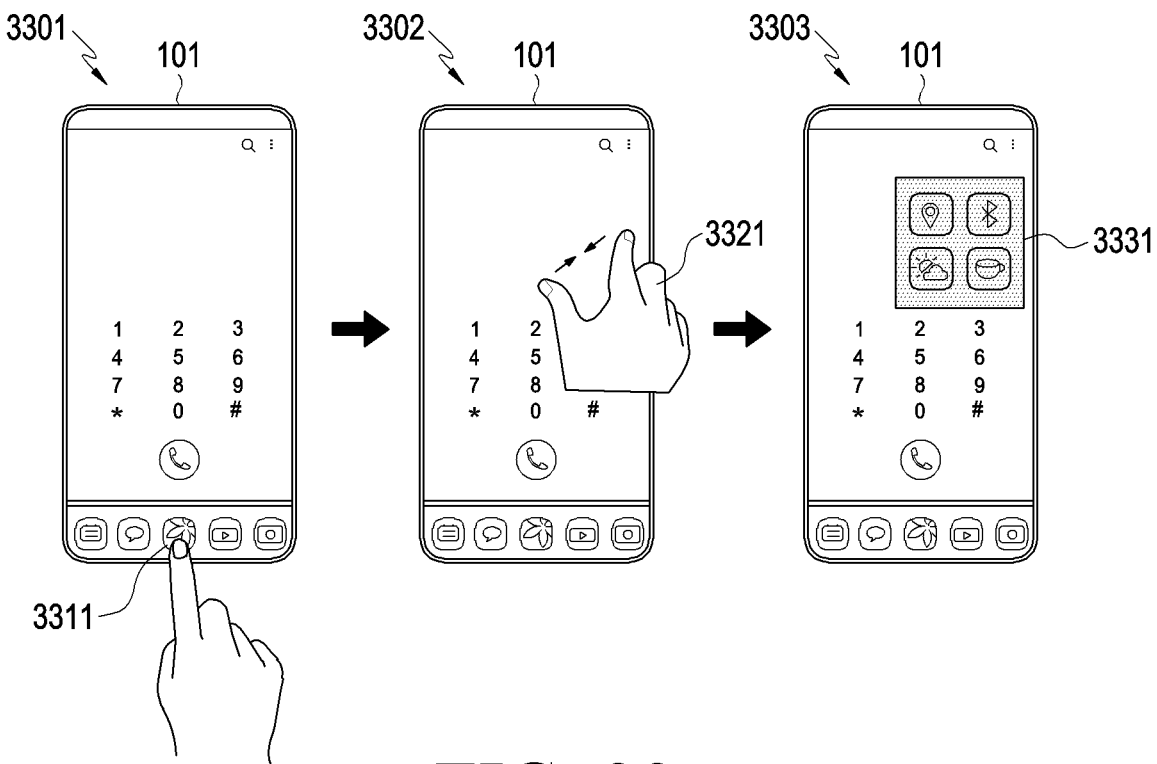
FIG. 33 is a view illustrating an example of an operation of displaying a popup screen based on multi-touches received by an electronic device at different times according to an embodiment of the disclosure.

FIG. 33 is a view illustrating an example of an operation of displaying a popup screen based on multi-touches received by an electronic device at different times according to an embodiment of the disclosure.

Figure 34:
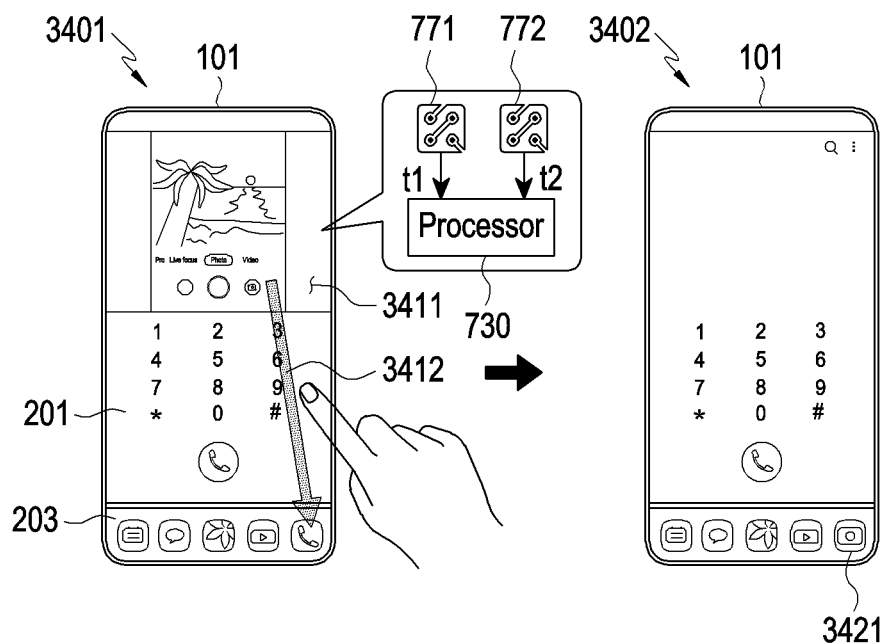
FIG. 34 is a view illustrating an example of an operation of controlling (e.g., causing to disappear) an execution screen of an application based on multi-touches received by an electronic device at different times according to an embodiment of the disclosure.

FIG. 34 is a view illustrating an example of an operation of controlling (e.g., causing to disappear) an execution screen of an application based on multi-touches received by an electronic device at different times according to an embodiment of the disclosure.

Referring to FIG. 31, according to various embodiments, in operation 3101, the electronic device 101 may select an icon and identify a preset input corresponding to the selected icon based on the first input and the second input received at different times. For example, as shown in 3201 and 3251 of FIG. 32 and 3301 of FIG. 33, the electronic device 101 may display the execution screen 3211 of one application on the first display 201 while displaying a screen 3312 including a plurality of icons for executing the plurality of applications on the second display 203 based on the application management module. The operation of displaying the screen 3312 including the plurality of icons based on the application management module by the electronic device 101 may be performed as described above in connection with FIGS. 21 to 23, and no duplicate description thereof is thus given below.

Referring to 3202 and 3251 of FIG. 32 and 3301 of FIG. 33, the electronic device 101 may receive the user's touch input 3222 or 3213 for selecting one icon 3221 or 3215 among the plurality of icons on the second display 203 displaying the plurality of icons and receive various types of user inputs (e.g., drag inputs 3223 and 3214, touch input, or pinch input 3321) on the first display 201. The electronic device 101 (e.g., the first processor 730) may obtain information about the positions (e.g., coordinates) received at different times t1 and t2 from the input detection circuits (e.g., the first input detection circuit 771 and the second input detection circuit 772) respectively implemented in the two displays based on the moved user input, identify a touch input on the second display 203 based on the obtained position-related information, and identify the type of the user input on the first display 201.

According to various embodiments, in operation 3102, the electronic device 101 may display a multi-screen or popup screen based on selection of the icon and the identified preset input. For example, after selecting the icon, the electronic device 101 may perform different operations (e.g., a multi-screen display operation (e.g., 3253 of FIG. 32) and a popup screen display operation (e.g., 3303 of FIG. 33)) according to the type of the user input (e.g., drag inputs 3223 and 3214, touch input, or pinch input 3321) received on the first display 201. For example, the electronic device 101 may pre-store information about the operation to be performed (e.g., multi-screen display operation or popup screen display operation) per type of user input received on the first display 201 after selecting the icon. Hereinafter, an example of the multi-screen display operation and an example of the popup screen display operation by the electronic device 101 are described.

Hereinafter, examples of the multi-screen display operation of the electronic device 101 are described.

According to various embodiments, as shown in 3202 and 3251 of FIG. 32, upon receiving a drag input 3223 or 3214 to move to the first display 201 after receiving a touch input 3213 or 3222 for selecting one icon 3221 or 3215 on the second display 203, the electronic device 101 may perform the operation of displaying a multi-screen. Hereinafter, different examples of the operation of displaying a multi-screen are described.

For example, as shown in 3201 and 3202 of FIG. 32, the electronic device 101 may receive a drag input 3223 for moving one selected icon 3221 to at least a partial area of the first display 201. When the received drag input 3223 is released on the first display 201, the electronic device 101 may display the execution screen 3231 of the application (e.g., camera application) corresponding to the selected icon along with the execution screen 3211 of the application (e.g., phone application) previously displayed as shown in 3203 of FIG. 32. In this case, the icon 3221 selected on the second display 203 may disappear from the second display 203. An icon corresponding to a new application may be displayed in the disappearing position. Further, without limited to those described, when the display of the icon 3221 is maintained, and the icon 3221 is selected again, the corresponding application (e.g., camera application) may terminate execution or switch to background mode. The execution screens of the applications displayed together on the first display 201 may not overlap. In this case, the electronic device 101 may identify the area where the execution screen of the application corresponding to one icon is used based on the position of the drag input 3223 on the first display 201 and highlight and display the identified area. For example, as shown in 3202 of FIG. 32, the electronic device 101 may split the currently exposed area of the first display 201 into two areas (e.g., upper area and lower area) and display the execution screen 3231 of the application (e.g., camera application) corresponding to one icon on the area (e.g., upper area of 3202 of FIG. 32) where the drag input is positioned and released among the split areas. The electronic device 101 may highlight and display the area (e.g., upper area) where the drag input is positioned or display a ghost view corresponding to the execution screen 3231 of the application in the area (e.g., upper area), thereby previously indicating the area where the execution screen 3231 of the application is to be displayed before the execution screen 3231 of the application is displayed. The ghost view is a screen having at least one visual attribute (e.g., at least one of brightness, color, or size) associated with the execution screen 3231 of the application and may be a screen that is not identical to the execution screen 3231 of the application but is visually similar to the execution screen of the application.

As another example, as shown in 3251 of FIG. 32, upon receiving a drag input 3214 for moving one selected icon 3215 to at least a partial area of the first display 201, the electronic device 101 may slide the first display 201 based on information about the length of the application corresponding to one icon as shown in 3252 of FIG. 32. The operation of sliding the first display 201 based on the information about the length of the application by the electronic device 101 may be performed like the operation of the electronic device 101 described above in connection with FIGS. 18, 19, 20A, 20B, and 21 to 23, and no duplicate description thereof is thus given below. The electronic device 101 may slide the first display 201 while maintaining the execution screen 3211 of the application (e.g., phone application) being displayed in the originally exposed area of the first display 201. As shown in 3253 of FIG. 32, the electronic device 101 may display the execution screen 3231 of the application corresponding to one icon 3215 on the newly exposed area of the first display 201 after the first display 201 slides. Further, without limited to those described, the electronic device 101 may resize and display the area of the execution screen 3211 of the application into the exposed area of the first display 201 while sliding the first display 201. Thereafter, after the slide of the first display 201 is completed, the electronic device 101 may split the exposed area of the first display 201 into two areas (e.g., upper area and lower area) and display the respective execution screens 3211 and 3254 of the applications on the split areas. In this case, the icon 3215 selected on the second display 203 may disappear from the second display 203. An icon corresponding to a new application may be displayed in the disappearing position. Further, without limited to those described, when the display of the icon 3215 is maintained, and the icon 3215 is selected again, the corresponding application (e.g., camera application) may terminate execution or switch to background mode.

As another example, although not shown, when at least two or more icons are selected on the second display 203, the electronic device 101 may display the execution screens of the application corresponding to the selected icons as a multi-screen on the first display 201. As an example, the electronic device 101 may receive a drag input (e.g., a drag input on the icons to be selected) and/or touch input (e.g., touch input on the icons with fingers) for selecting at least two or more icons on the second display 203 and then, upon receiving a drag input to the first display 201, further display the execution screens of at least two or more applications on the first display 201.

Hereinafter, examples of the popup screen display operation of the electronic device 101 are described.

According to various embodiments, as shown in 3302 and 3303 of FIG. 33, upon receiving a pinch input 3321 on the first display 201 after one icon is selected (3311) on the second display 203, the electronic device 101 may display the execution screen of the application (e.g., gallery application) corresponding to the one icon in the form of a popup screen 3331. For example, as shown in 3303 of FIG. 33, the electronic device 101 may display the popup screen 3331 in the position where the pinch input 3321 is received. Upon receiving the pinch input 3321 within a preset time after receiving the touch input for selecting one icon, the electronic device 101 may perform the operation of displaying the popup screen 3331. In this case, the icon selected on the second display 203 may disappear from the second display 203. An icon corresponding to a new application may be displayed in the disappearing position. Further, without limited to those described, when the display of the icon is maintained, and the icon is selected again, the corresponding application (e.g., gallery application) may terminate execution or switch to background mode.

The types (e.g., drag input and pinch input) of user inputs for displaying the multi-screen or popup screen are merely an example, and the operation of displaying the multi-screen or popup screen based on various types of user inputs may be performed. As an example, when a rotate input is received on the first display 201, instead of the pinch input, the popup screen display operation may be performed. For example, the application management module may manage and/or set the type of user input for triggering the operation of displaying the multi-screen or the operation of displaying the popup screen and reset the type of user input set, according to the user's control.

Meanwhile, according to various embodiments, the electronic device 101 may perform the operation corresponding to the drag input moved from the first display 201 to the second display 203. For example, referring to FIG. 34, as shown in 3401 of FIG. 34, the electronic device 101 may receive a touch input for selecting the execution screen 3411 being displayed on the first display 201 and then receive a drag input 3412 to the second display 203. The electronic device 101 may switch the mode of the application corresponding to the selected execution screen from the foreground mode to the background mode and, as shown in 3402 of FIG. 34, display the icon 3421 of the application switched to the background mode on the second display 203. When the displayed icon 3421 is selected, the electronic device 101 may switch the application to the foreground mode and execute it.

Another example of an operation of an electronic device 101 is described below according to various embodiments.

According to various embodiments, the electronic device 101 may authenticate the user based on a user input received on the second display 203 and, when the authentication is completed, slide the first display 201.

Figure 35:
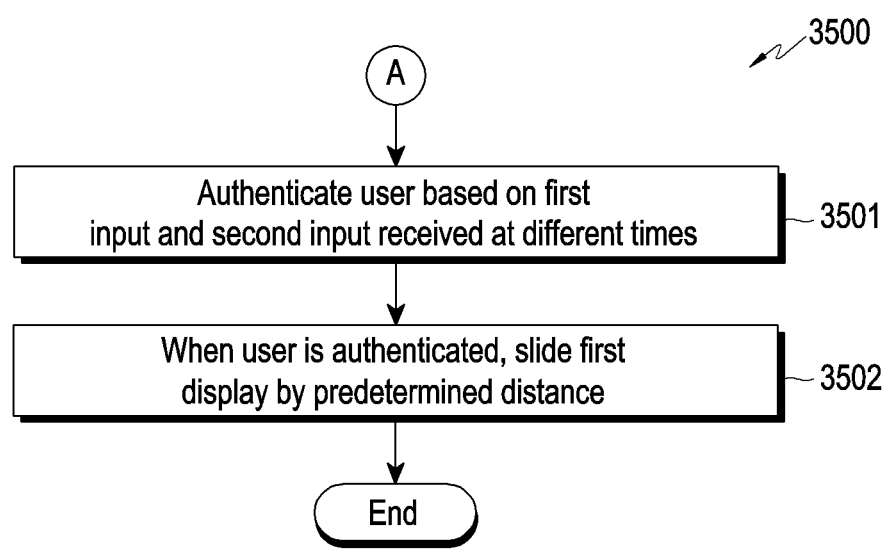
FIG. 35 is a flowchart illustrating another example of an operation of an electronic device according to an embodiment of the disclosure.

FIG. 35 is a flowchart illustrating another example of an operation of an electronic device according to an embodiment of the disclosure. According to various embodiments, the operations shown in FIG. 35 representing flowchart 3500 are not limited to the shown order but may rather be performed in other various orders. According to various embodiments, more or less operations than those of FIG. 35 may be performed. FIG. 35 is described below with reference to FIG. 36.

Figure 36:
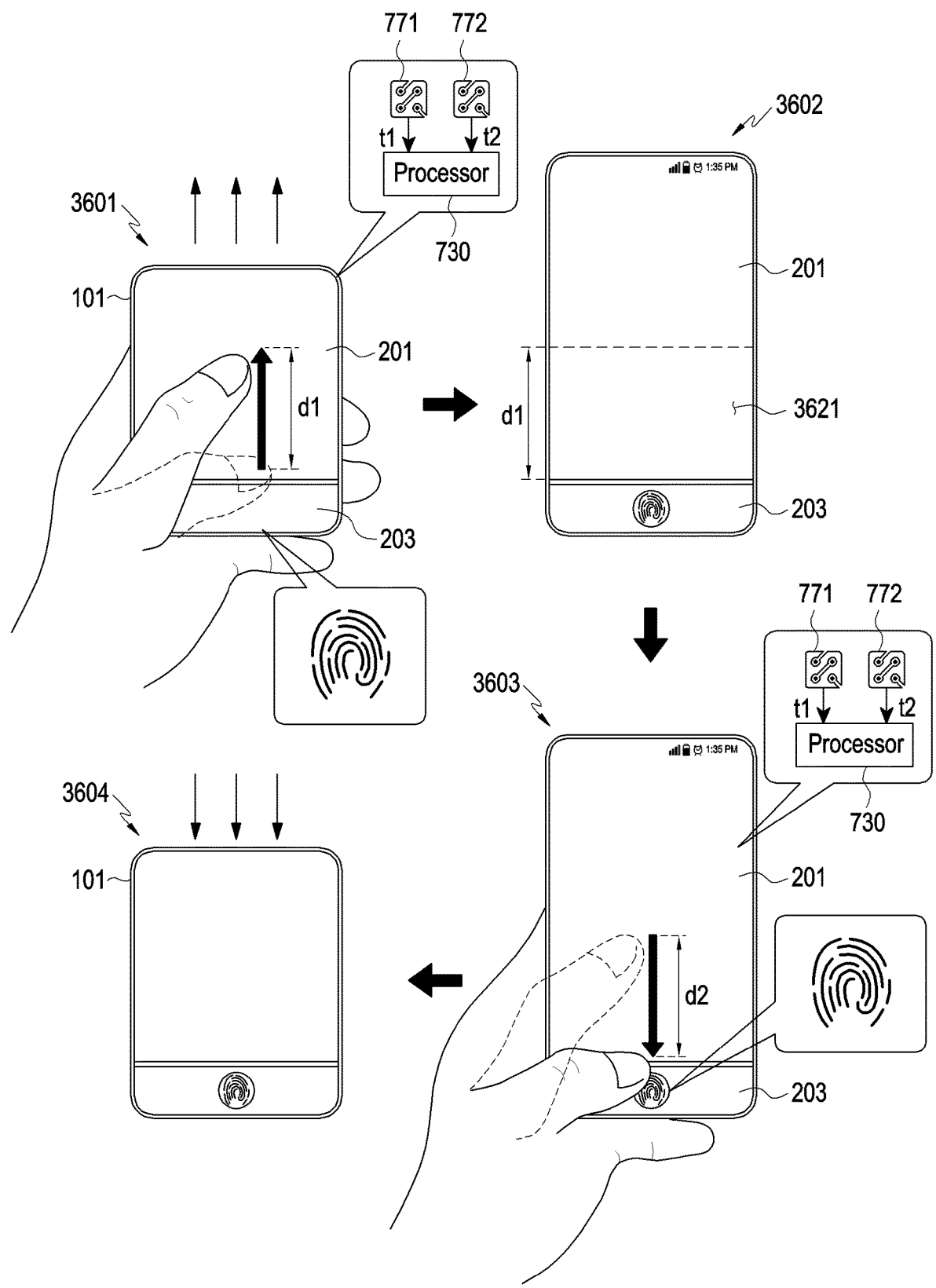
FIG. 36 is a view illustrating an example of an operation of authenticating a user and sliding a first display based on inputs received by an electronic device at different times according to an embodiment of the disclosure.

FIG. 36 is a view illustrating an example of an operation of authenticating a user and sliding a first display based on inputs received by an electronic device at different times according to an embodiment of the disclosure.

Referring to FIG. 35, According to various embodiments, in operation 3501, the electronic device 101 may authenticate the user based on a first input and a second input received at different times. For example, as shown in 3601 of FIG. 36, the electronic device 101 may detect contact of the user's finger on the fingerprint sensor formed in at least a partial area of the second display 203 in the locked state. The fingerprint sensor, along with the second input detection circuit 772, may be implemented in the second display 203. The electronic device 101 may compare the user's fingerprint identified using the fingerprint sensor with the user's fingerprint pre-registered in the electronic device 101 and authenticate the user based on the result of comparison. The electronic device 101 may detect a user input on the second display 203 and then receive a drag input moved to the first display 201. When the fingerprint sensor is contacted by the user while turning off the input detection circuit (e.g., the first input detection circuit 771) implemented in the first display 201 in the locked state, the electronic device 101 may turn on the input detection circuit (e.g., the first input detection circuit 771) of the first display 201 to detect a drag input received on the first display 201.

According to various embodiments, in operation 3502, the electronic device 101 may slide the first display 201 by a predetermined distance when the user is authenticated. For example, when the user's fingerprint is identified as the fingerprint registered in the electronic device 101 as shown in 3602 of FIG. 36, the electronic device 101 may complete the user's authentication and slide (e.g., slide-out) the first display 201 by a designated distance. The designated distance may correspond to the moving distance d1 of the drag input received on the first display 201. For example, the electronic device 101 may identify information about the position of the drag input from the second input detection circuit 772 implemented in the first display 201 and identify the moving distance of the drag input based on the identified position-related information. The electronic device 101 (e.g., the movement control module 731) may control the motor to slide (e.g., slide-out) the first display 201 by the identified moving distance d1. Accordingly, the area 3621 of the first display 201 corresponding to the identified moving distance may be drawn out. Without limited to those described, the designated distance may be a distance preset in the electronic device 101.

According to various embodiments, the electronic device 101 may slide the first display 201 based on a drag input starting on the first display 201 and moving to the second display 203. For example, the electronic device 101 (e.g., the first processor 730) may receive a touch input on the first display 201 as shown in 3603 of FIG. 36 by the input detection circuit (e.g., the first input detection circuit 771 or second input detection circuit 772) and receive a drag input that is moved to the fingerprint sensor of the second display 203. The electronic device 101 may authenticate the user on the fingerprint sensor and, when authentication is completed, slide (e.g., slide-in) the first display 201 by a designated distance as shown in 3604 of FIG. 36. The designated distance may correspond to the moving distance d2 of the drag input identified on the first display 201.

Another example of an operation of an electronic device 101 is described below according to various embodiments.

According to various embodiments, the electronic device 101 may identify the distance in which the first display 201 is to slide based on the moving distance of the multi-touches received in positions associated with each other at the same time and display information about the identified distance.

Figure 37:
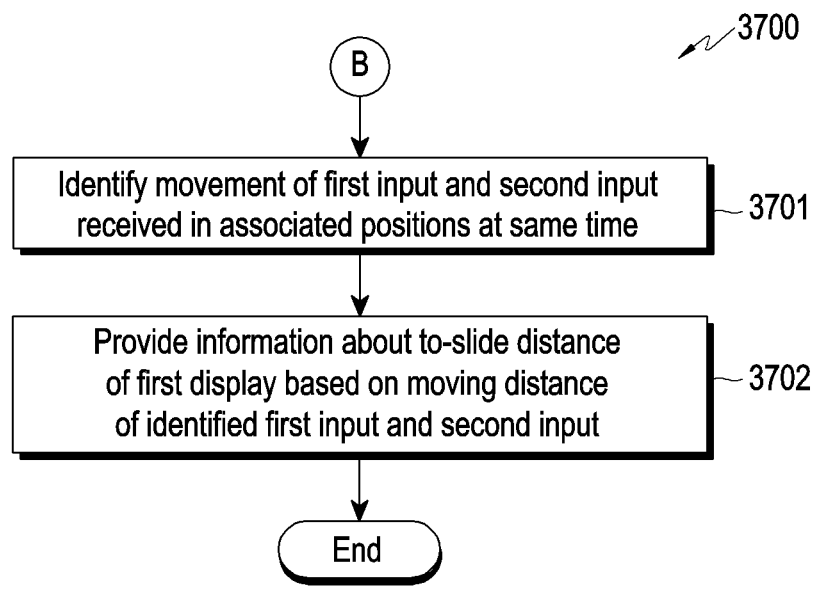
FIG. 37 is a flowchart illustrating another example of an operation of an electronic device according to an embodiment of the disclosure.

FIG. 37 is a flowchart illustrating another example of an operation of an electronic device according to an embodiment of the disclosure. According to various embodiments, the operations shown in FIG. 37 representing flowchart 3700 are not limited to the shown order but may rather be performed in other various orders. According to various embodiments, more or less operations than those of FIG. 37 may be performed. FIG. 37 is described below with reference to FIG. 38.

Figure 38:
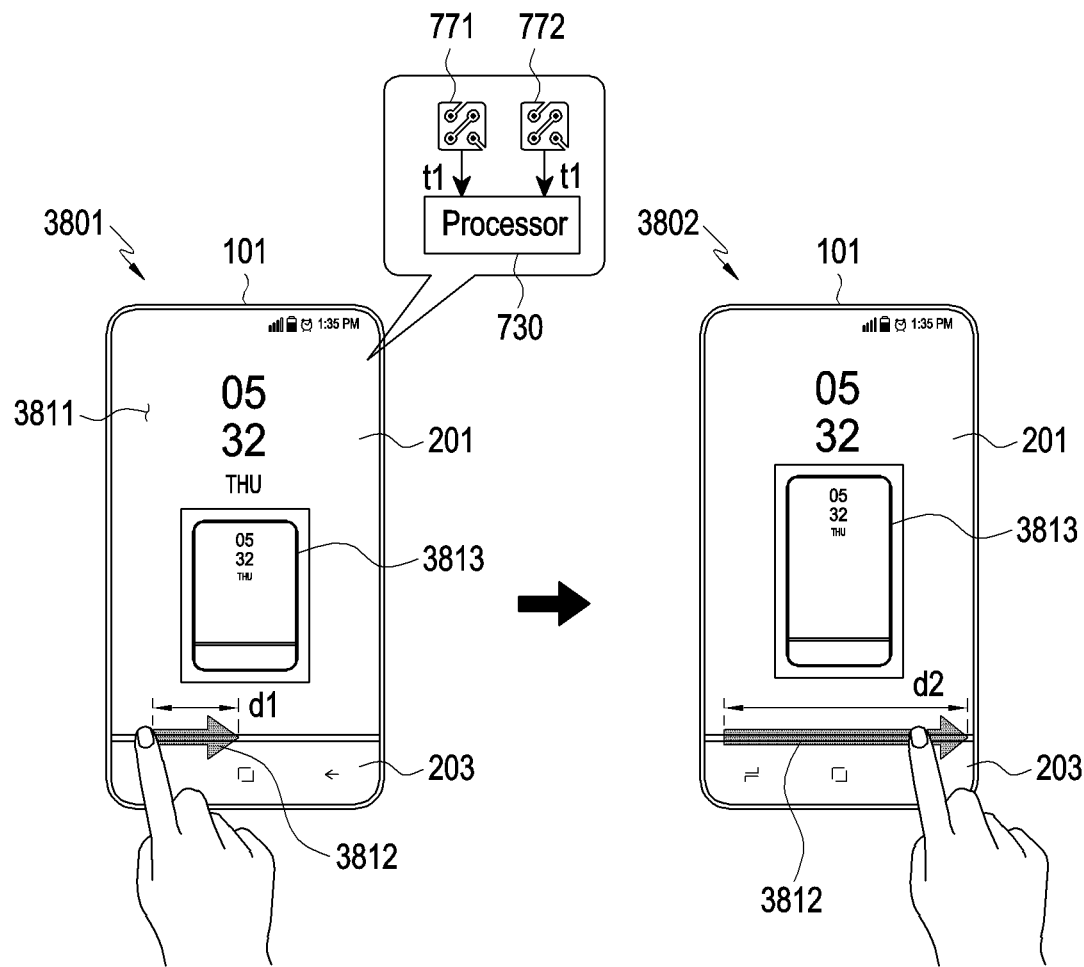
FIG. 38 is a view illustrating an example of an operation of displaying information about a distance at which a first display is to slide, based on inputs simultaneously received by an electronic device in positions associated with each other according to an embodiment of the disclosure.

FIG. 38 is a view illustrating an example of an operation of displaying information about a distance at which a first display is to slide, based on inputs simultaneously received by an electronic device in positions associated with each other according to an embodiment of the disclosure.

Referring to FIG. 37, according to various embodiments, in operation 3701, the electronic device 101 may identify the moving distance of a first input and a second input received in associated positions at the same time. For example, as shown in 3801 of FIG. 38, the electronic device 101 may simultaneously receive user inputs (e.g., the user's touches) on the exposed area of the first display 201 adjacent to the member (e.g., optical member) between the first display 201 and the second display 203 and the area of the second display 203 while displaying one content (e.g., protection screen) 3811. The electronic device 101 (e.g., the first processor 730) may identify that the inputs obtained from the respective input detection circuits (e.g., the first input detection circuit 771 and second input detection circuit 772) of the displays (e.g., the first display 201 and second display 203) are received at the same time (e.g., first time t1) based on information about the reception times of the inputs and calculate the degree of association of the positions of the inputs based on information about the reception positions of the inputs. When the calculated degree of association is a preset value or more, the electronic device 101 may determine that the inputs are received in the associated positions.

According to various embodiments, in operation 3702, the electronic device 101 may provide information about the distance in which the first display 201 is to slide.

Referring to 3801 and 3802 of FIG. 38, the electronic device 101 may identify the movement 3812 in one direction (e.g., horizontal direction) of the user inputs in a state in which the inputs received in the simultaneously associated positions are maintained. Based on identifying the movement 3812 of the user inputs while displaying one content, the electronic device 101 may identify that an event to trigger a slide of the first display 201 is generated. The electronic device 101 may identify the distance in which the user inputs are moved in the associated positions and identify that the distance corresponding to the identified moving distance is the distance in which the first display 201 is to slide. When the user inputs are released or the user inputs fall out the associated positions (e.g., when the user's touch is moved to the first display 201 or second display 203 as the user's touch is moved), the electronic device 101 may slide the first display 201 by the identified distance.

According to various embodiments, the electronic device 101 may display information about the distance in which the first display 201 is to slide, before the first display 201 slides. For example, as shown in 3801 and 3802 of FIG. 38, the electronic device 101 may transform one content being currently displayed based on the distance (e.g., d1 or d2) in which the first display 201 is to move and display the transformed content as a preview 3813 (e.g., display on the first display 201 or second display 203). The transformed content may be a resized content to be displayed in the changed areas of the displays (e.g., the exposed area of the first display 201 and the area of the second display 203) after the first display 201 has been moved. Accordingly, the area (or width and length) of the transformed content may be proportional to the moving distance of the first display 201. The user may identify the distance in which the first display 201 is to be moved, based on the area of the displayed content.

Another example of an operation of an electronic device 101 is described below according to various embodiments.

According to various embodiments, the electronic device 101 may switch the screen of the display (e.g., at least one of the first display 201 or second display 203) and display it based on the movement of the multi-touches received in the associated positions at the same time.

Figure 39:
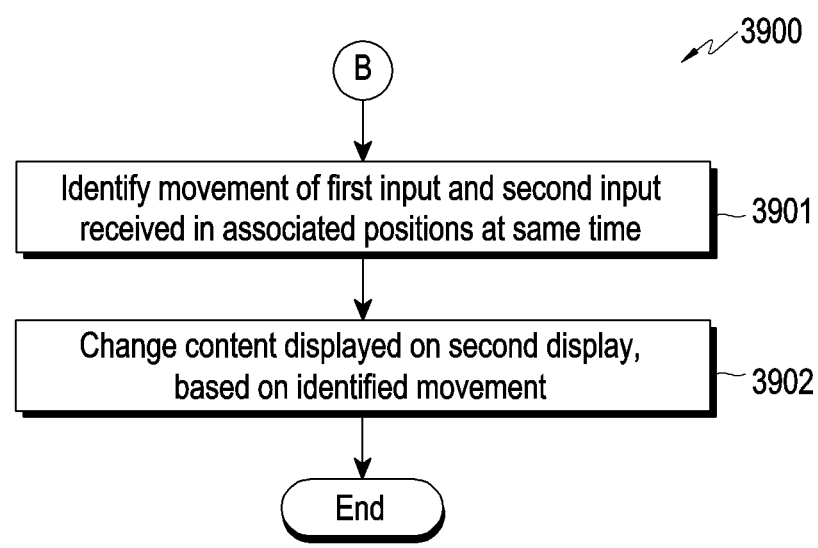
FIG. 39 is a flowchart illustrating another example of an operation of an electronic device according to an embodiment of the disclosure.

FIG. 39 is a flowchart illustrating another example of an operation of an electronic device according to an embodiment of the disclosure. According to various embodiments, the operations shown in FIG. 39 representing flowchart 3900 are not limited to the shown order but may rather be performed in other various orders. According to various embodiments, more or less operations than those of FIG. 39 may be performed. FIG. 39 is described below with reference to FIG. 40.

Figure 40:
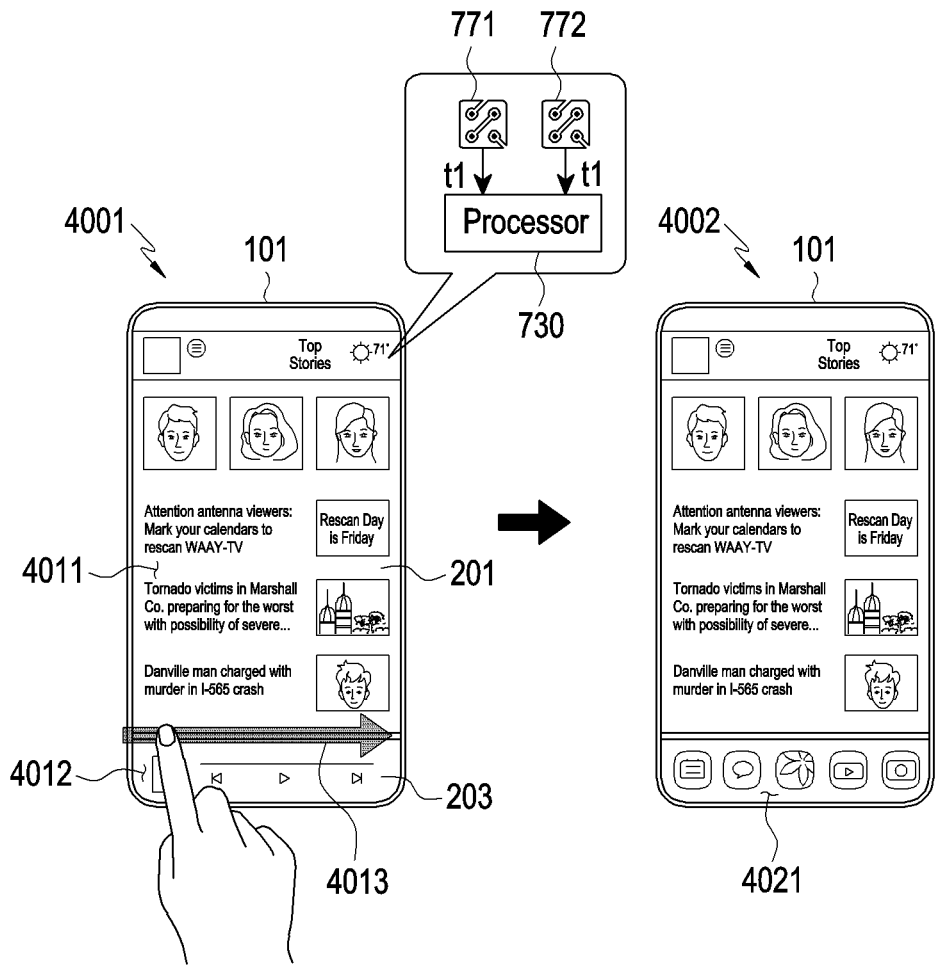
FIG. 40 is a view illustrating an example of an operation of switching display screens based on inputs simultaneously received by an electronic device in positions associated with each other according to an embodiment of the disclosure.

FIG. 40 is a view illustrating an example of an operation of switching display screens based on inputs simultaneously received by an electronic device in positions associated with each other according to an embodiment of the disclosure.

Referring to FIG. 39, according to various embodiments, in operation 3901, the electronic device 101 may identify the movement of a first input and a second input received in associated positions at the same time. For example, as shown in 4001 of FIG. 40, the electronic device 101 may display a content 4011 (e.g., execution screen) associated with the first application on the first display 201 and a content 4012 (e.g., execution screen) associated with the second application on the second display 203. The electronic device 101 may simultaneously receive user inputs (e.g., the user's touches) on the exposed area of the first display 201 adjacent to the member (e.g., optical member) between the first display 201 and the second display 203 and the area of the second display 203 while displaying the contents. The electronic device 101 (e.g., the first processor 730) may identify that the inputs obtained from the respective input detection circuits (e.g., the first input detection circuit 771 and second input detection circuit 772) of the displays (e.g., the first display 201 and second display 203) are received at the same time (e.g., first time t1) based on information about the reception times of the inputs and calculate the degree of association of the positions of the inputs based on information about the reception positions of the inputs. When the calculated degree of association is a preset value or more, the electronic device 101 may determine that the inputs are received in the associated positions.

According to various embodiments, in operation 3902, the electronic device 101 may change the content displayed on the second display 203, based on the identified movement. For example, the electronic device 101 may identify the movement 4013 in one direction (e.g., horizontal direction) of the user inputs in a state in which the inputs received in the simultaneously associated positions are maintained.

Referring to 4001 of FIG. 40, upon identifying a movement 4013 of the user input while displaying content (e.g., not a portion of a single content but different screens associated with one application or execution screens of different applications) not associated with the content displayed on the first display 201, on the second display 203, the electronic device 101 may identify that an event to switch the screen of the display (e.g., the second display 203) occurs. The electronic device 101 may display another content 4021 (e.g., a screen including a plurality of icons provided by the application management module) instead of the content (e.g., execution screen) displayed on the second display 203, based on the movement 4013 of the user input, as shown in 4002 of FIG. 40.

According to various embodiments, without limited to those described, the content switched and displayed on the second display 203 may include the message (e.g., text message or message provided by an SNS app) currently received by the electronic device 101, and the execution screen (e.g., an execution screen for controlling the music player application) of the designated app as displayed when switched.

Another example of an operation of an electronic device 101 is described below according to various embodiments.

According to various embodiments, the electronic device 101 may display information about the content to be displayed (e.g., the execution screen of the application) in a state in which the multi-touches received in positions not associated with each other at the same time are maintained.

Figure 41:
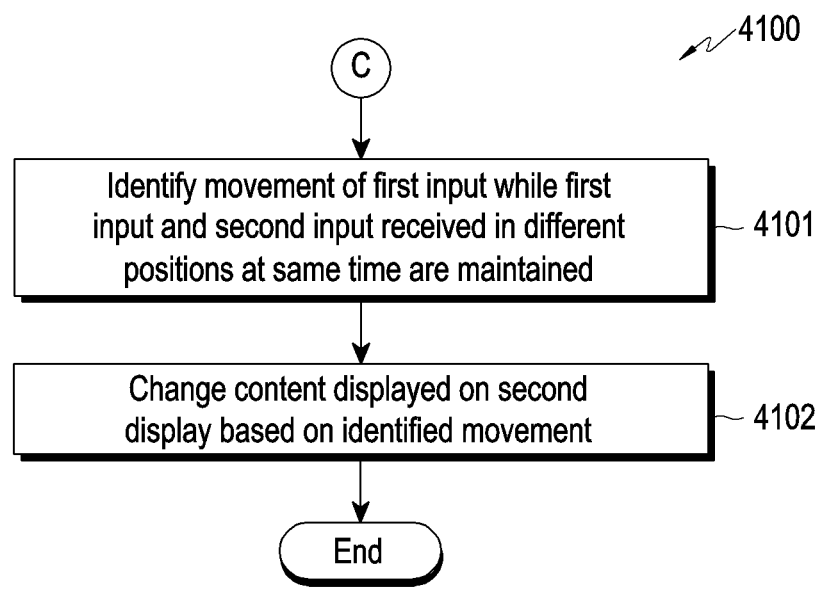
FIG. 41 is a flowchart illustrating another example of an operation of an electronic device according to an embodiment of the disclosure.

FIG. 41 is a flowchart illustrating another example of an operation of an electronic device according to an embodiment of the disclosure. According to various embodiments, the operations shown in FIG. 41 representing flowchart 4100 are not limited to the shown order but may rather be performed in other various orders. According to various embodiments, more or less operations than those of FIG. 41 may be performed. FIG. 41 is described below with reference to FIG. 42.

Figure 42:
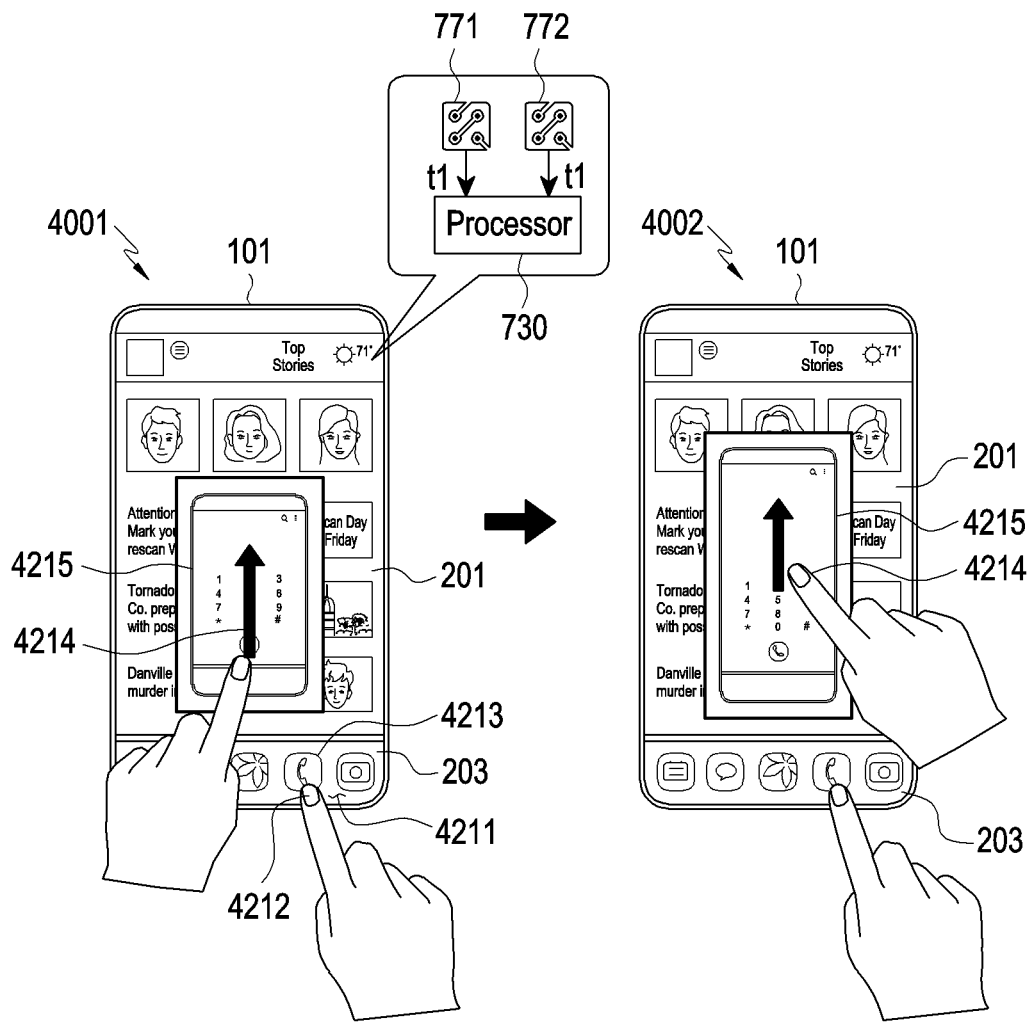
FIG. 42 is a view illustrating an example of an operation of displaying information about content to be displayed in a state of maintaining multi-touches simultaneously received by an electronic device in positions not associated with each other according to an embodiment of the disclosure.

FIG. 42 is a view illustrating an example of an operation of displaying information about content to be displayed in a state of maintaining multi-touches simultaneously received by an electronic device in positions not associated with each other according to an embodiment of the disclosure.

Referring to FIG. 41, according to various embodiments, in operation 4101, the electronic device 101 may identify a movement of a first input while the first input and a second input received in different positions at the same time are maintained.

Referring to 4201 of FIG. 42, the electronic device 101 may display one content (e.g., the execution screen of one application) on the first display 201 and display a screen 4211 including a plurality of icons for executing a plurality of applications on the second display 203. The electronic device 101 may simultaneously receive user inputs (e.g., a first user input 4214 and a second user input 4212) on the first display 201 and the second display 203, respectively, while displaying content on each of the two displays (e.g., the first display 201 and the second display 203). The electronic device 101 (e.g., the first processor 730) may obtain information about the reception time and reception position of the user input from the input detection circuit (e.g., the first input detection circuit 771 and the second input detection circuit 772) respectively provided in the displays and identify that the user inputs are received in positions not associated with each other (e.g., with a degree of association less than a threshold) at the same time (e.g., the first time t1) based on the obtained information. The second user input 4212 received on the second display 203 may be an input for selecting one icon 4213 from among the plurality of icons. As shown in 4202 of FIG. 42, the electronic device 101 may display the execution screen of the application corresponding to one icon 4213 selected by the second user input received on the second display 203, as a preview 4215, in the position where the user input is received on the first display 201.

According to various embodiments, in operation 4102, the electronic device 101 may display the preview for the content to be displayed, based on the movement of the identified first input. As shown in 4202 of FIG. 42, the electronic device 101 may identify a movement of the first user input 4214 on the first display 201 in a state in which the second user input 4212 for selecting one icon 4213 is maintained on the second display 203. The electronic device 101 may adjust the area of the application execution screen (e.g., the preview 4215) according to the moving distance of the first user input (e.g., adjust the area of the execution screen in proportion to the moving distance) and identify the distance in which the first display 201 is to slide, as the distance corresponding to the adjusted area. When the two user inputs (e.g., the first user input and the second user input) are released, the electronic device 101 may move the first display 201 by the identified distance and display the application execution screen corresponding to the selected icon on the display.

Another example of an operation of an electronic device 101 is described below according to various embodiments.

According to various embodiments, the electronic device 101 may perform a control operation associated with the content displayed on the second display 203 based on the movement of the user input in a state in which the multi-touches received in positions not associated with each other at the same time are maintained.

Figure 43:
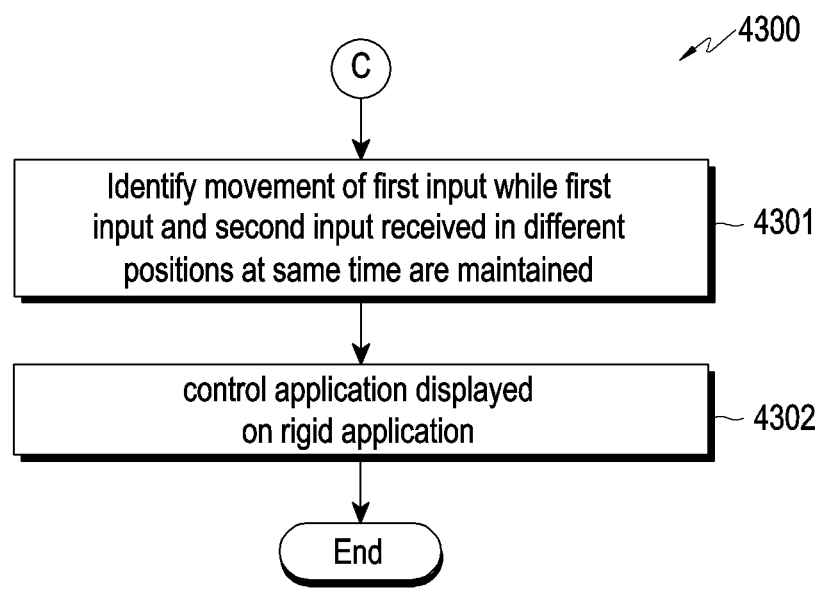
FIG. 43 is a flowchart illustrating another example of an operation of an electronic device according to an embodiment of the disclosure.

FIG. 43 is a flowchart illustrating another example of an operation of an electronic device according to an embodiment of the disclosure. According to various embodiments, the operations shown in FIG. 43 representing flowchart 4300 are not limited to the shown order but may rather be performed in other various orders. According to various embodiments, more or less operations than those of FIG. 43 may be performed. FIG. 43 is described below with reference to FIG. 44.

Figure 44:
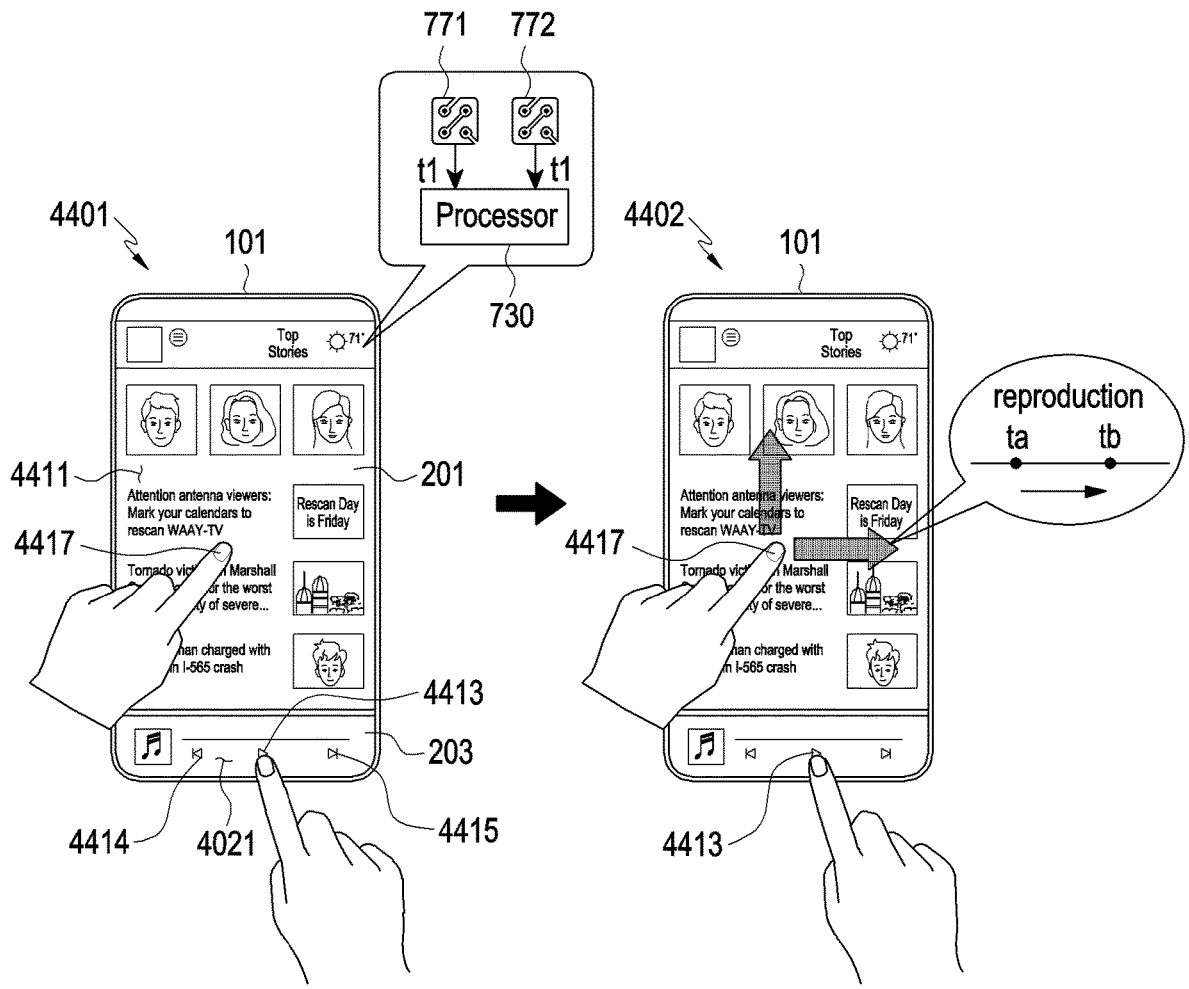
FIG. 44 is a view illustrating an example of a control operation associated with content displayed on a second display based on a movement of a user input in a state of maintaining multi-touches received at the same time by an electronic device in positions not associated with each other according to an embodiment of the disclosure.

FIG. 44 is a view illustrating an example of a control operation associated with content displayed on a second display based on a movement of a user input in a state of maintaining multi-touches received at the same time by an electronic device in positions not associated with each other according to an embodiment of the disclosure.

Referring to FIG. 43, according to various embodiments, in operation 4301, the electronic device 101 may identify a movement of a first input while the first input and a second input received in different positions at the same time are maintained. For example, the electronic device 101 may display one content 4411 (e.g., the execution screen of one application) on the first display 201 and display another content 4412 (e.g., the execution screen of another application) on the second display 203. The content 4412 displayed on the second display 203 may include the execution screen of a specific application including objects 4413, 4414, and 4415 for controlling (e.g., playback time control or volume control) a specific application (e.g., music player application).

Referring to 4401 of FIG. 44, the electronic device 101 may receive a first user input 4417 on the first display 201 and may receive a second user input for selecting one object 4413 from among objects 4413, 4414, and 4415 included in the execution screen of the specific application displayed on the rigid application.

According to various embodiments, in operation 4302, the electronic device 101 may control the application displayed on the rigid application. For example, as shown in 4402 of FIG. 44, the electronic device 101 may perform a control operation (e.g., playback time control operation) on the specific application (e.g., music player application) associated with the function (e.g., playback time control function) corresponding to the object 4413 selected by the second user input 4416 on the second display 203, based on the movement of the first user input 4417 on the first display 201. The electronic device 101 may adjust the degree of the control operation depending on the moving direction and/or moving distance of the first user input 4417. For example, the electronic device 101 may perform opposite control operations (e.g., volume up/down) for the moving directions (e.g., up/down/left/right). As another example, the electronic device 101 may perform a control operation by a degree corresponding to the moving distance (e.g., move the playback time by a value corresponding to the moving distance).

Another example of an operation of an electronic device 101 is described below according to various embodiments.

According to various embodiments, the electronic device 101 may provide predetermined light through a specific area 4601 of the first display 201, and the light may be diffused by the member 207 (hereinafter, optical member 207) and be viewed by the user.

Figure 45:
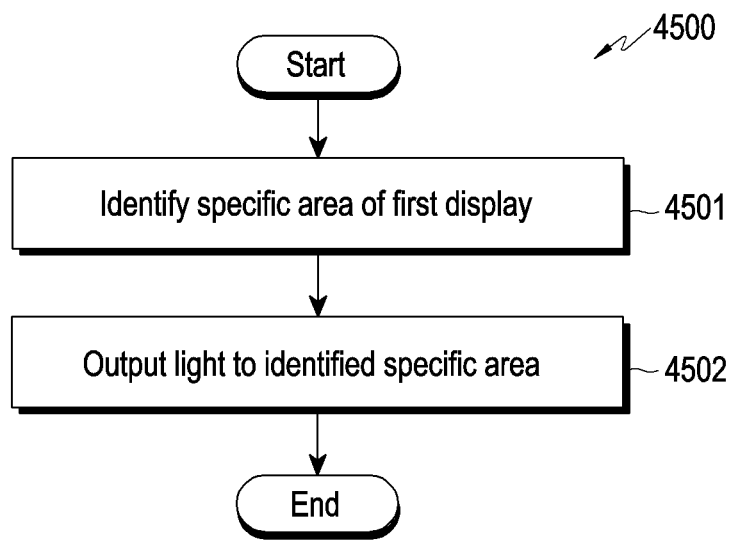
FIG. 45 is a flowchart illustrating another example of an operation of an electronic device according to an embodiment of the disclosure.

FIG. 45 is a flowchart illustrating another example of an operation of an electronic device according to an embodiment of the disclosure. According to various embodiments, the operations shown in FIG. 45 representing flowchart 4500 are not limited to the shown order but may rather be performed in other various orders. According to various embodiments, more or less operations than those of FIG. 45 may be performed. FIG. 45 is described below with reference to FIGS. 46 and 47.

Figure 46:
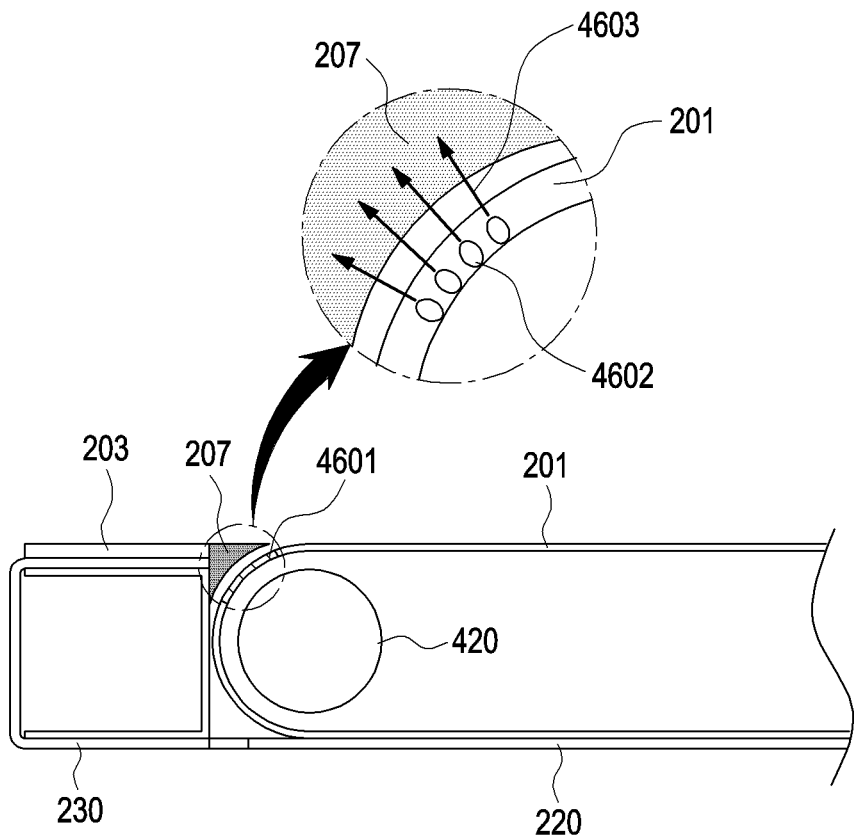
FIG. 46 is a view illustrating an example of operation of outputting light by an electronic device according to an embodiment of the disclosure.
Figure 47:
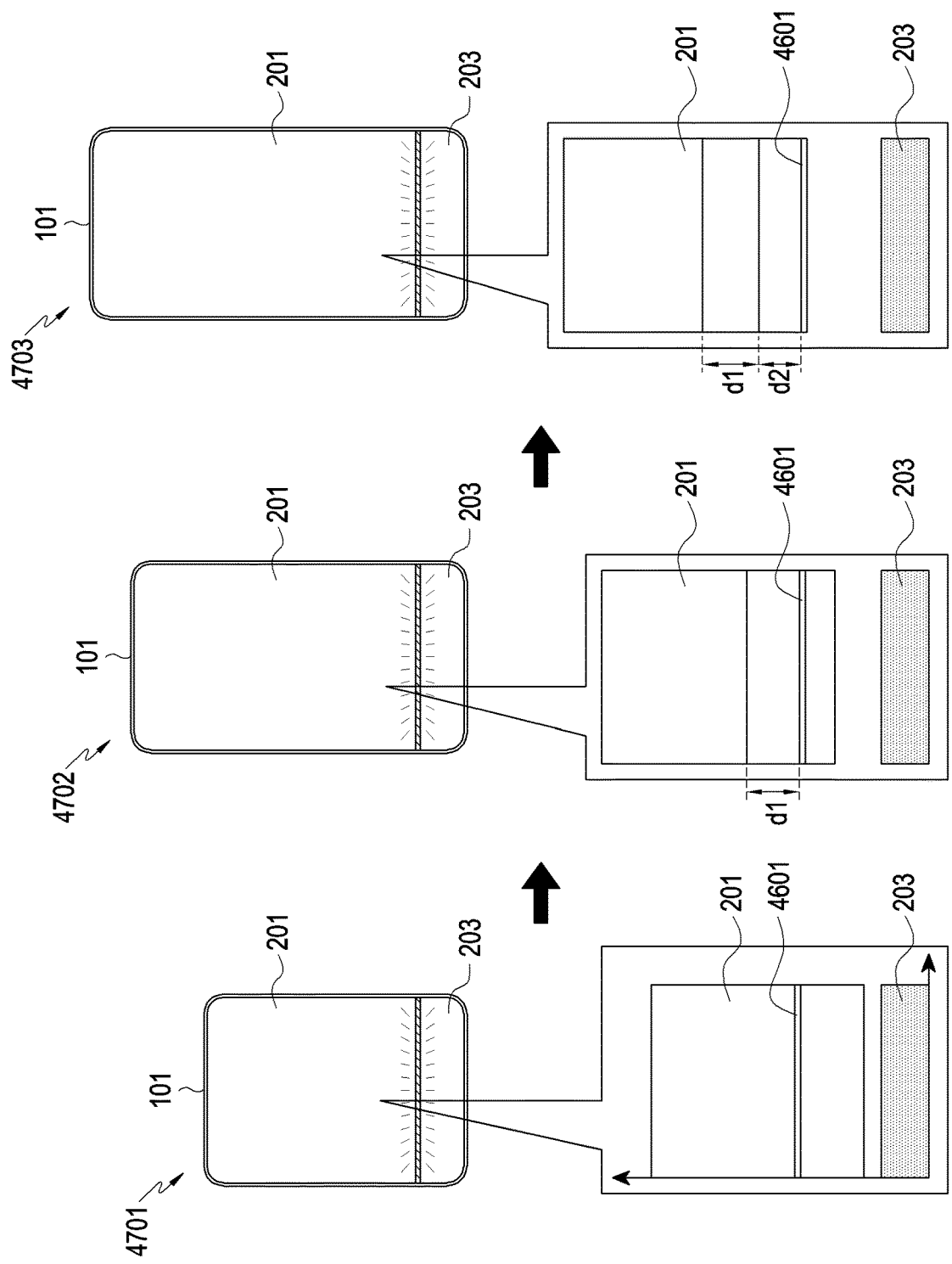
FIG. 47 is a view illustrating an example of operation of outputting light according to a change in the exposed area of a first display of an electronic device according to an embodiment of the disclosure.

FIG. 46 is a view illustrating an example of operation of outputting light by an electronic device according to an embodiment of the disclosure. FIG. 47 is a view illustrating an example of operation of outputting light according to a change in the exposed area of a first display of an electronic device according to an embodiment of the disclosure.

Referring to FIG. 45, according to various embodiments, in operation 4501, the electronic device 101 may identify a specific area 4601 of the first display 201.

Referring to FIG. 46, the electronic device 101 may identify an area adjacent to the optical member 207 as the specific area 4601 for outputting light. An example of the specific area 4601 is described below.

According to various embodiments, the specific area 4601 may be implemented on the first display 201. For example, the specific area 4601 of the first display 201 may be an area corresponding to one surface of the optical member 207 of the bent area corresponding to the position of the roller 420 of the first display 201 as shown in FIG. 46. Further, the specific area 4601 of the first display 201 may be an area connected to the exposed flat area of the bent area of the first display 201. Without limited to those described, as described above in connection with 602 of FIG. 6A, when the optical member 207 is implemented to extend from the second display 203, a partial area connected to the optical member 207 of the second display 203 may be the specific area 4601 for outputting light.

According to various embodiments, the specific area 4601 may be implemented in various forms. For example, the specific area 4601 may be a bar-shaped area extending from the left end to right end of the first display 201. Further, without limited to those described, the specific area 4601 may also be implemented in various polygonal shapes, such as a circle or triangle. The shape of the specific area 4601 may be adjusted. For example, the length in the horizontal direction and length in the vertical direction of the specific area 4601 may be adjusted by the user.

According to various embodiments, the electronic device 101 may identify the position of the specific area 4601 corresponding to the exposed area of the first display 201. Hereinafter, examples of the operation of identifying the position of the specific area 4601 by the electronic device 101 are described.

For example, the electronic device 101 may store information about the position of the specific area 4601 for outputting light in a specific state (e.g., closed state or opened state) and update and identify the stored position of the specific area 4601 according to the slide of the first display 201. As an example, as shown in 4701 of FIG. 47, the electronic device 101 may previously store information about the position of the specific area 4601 corresponding to the closed state (e.g., the state in which the first display 201 is maximally drawn in). Thereafter, as shown in 4702 and 4703 of FIG. 47, when the first display 201 slides (e.g., slide-out), the electronic device 101 may identify the moving distance of the first display 201 and update the position of the specific area 4601 by subtracting the identified moving distance from the position (e.g., y-axis coordinate) of the specific area 4601. As another example, the electronic device 101 may store the information about the position of the specific area 4601 in the opened state and update the position of the specific area 4601 by adding the moving distance of the first display 201 to the y-axis coordinate of the specific area 4601. The operation of identifying the moving distance of the first display 201 is the same as that described above in connection with the operation of the movement detection module, and no duplicate description thereof is thus given below.

As another example, the electronic device 101 may previously store information about the position (e.g., coordinates) of the specific area 4601 per area of the first display 201. Accordingly, the electronic device 101 may identify information about the position of the specific area 4601 corresponding to each area of the first display 201 shown in 4701, 4702, and 4703 of FIG. 47 based on the pre-stored information. The operation of identifying the area of the first display 201 is the same as that described above in connection with the operation of the movement detection module, and no duplicate description thereof is thus given below.

As another example, the position of the specific area 4601 may correspond to the area (i.e., light receiving area) other than the light blocking area formed in the optical member 207.

According to various embodiments, in operation 4502, the electronic device 101 may output light to the specific area 4601. For example, as shown in FIG. 46, the electronic device 101 may control at least one light emitting body 4602 (e.g., organic light emitting diode (OLED)) disposed in the specific area 4601 of the first display 201 to output light 4603. The electronic device 101 may perform the operation of outputting light based on various types of state information, which is described below with reference to FIGS. 48 to 51. As shown in 4701, 4702, and 4703 of FIG. 47, the electronic device 101 may control at least one light emitting body disposed in the specific area 4601 in the updated position to output light. Accordingly, although the exposed area of the first display 201 is changed, light between (e.g., optical member 207) the first display 201 and the second display 203 may be viewed by the user. The light incident on the optical member 207 may be diffused in the optical member 207. In this case, light may be received into the optical member 207 through the area other than the light blocking area formed in the optical member 207. This is the same as that described above in connection with FIG. 6A, and no duplicate description thereof is thus given below.

Another example of an operation of an electronic device 101 is described below according to various embodiments.

According to various embodiments, the electronic device 101 may manage the visual attributes (e.g., the color, position, and output pattern of light) for outputting light per information about various types of states (e.g., battery or execution of a specific app) associated with the electronic device 101 and output light according to the visual attribute corresponding to the currently identified state-related information.

Figure 48:
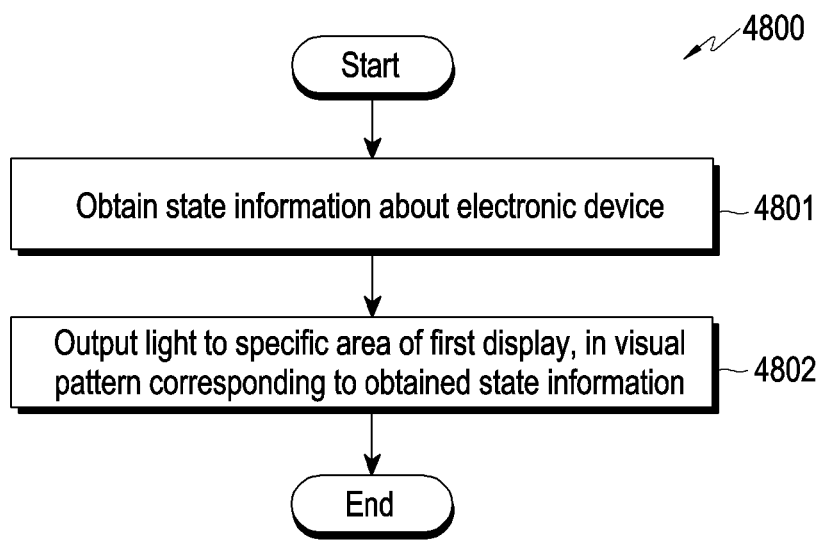
FIG. 48 is a flowchart illustrating another example of an operation of an electronic device according to an embodiment of the disclosure.

FIG. 48 is a flowchart illustrating another example of an operation of an electronic device according to an embodiment of the disclosure. According to various embodiments, the operations shown in FIG. 48 representing flowchart 4800 are not limited to the shown order but may rather be performed in other various orders. According to various embodiments, more or less operations than those of FIG. 48 may be performed. FIG. 48 is described below with reference to FIGS. 49 and 51.

Figure 49:
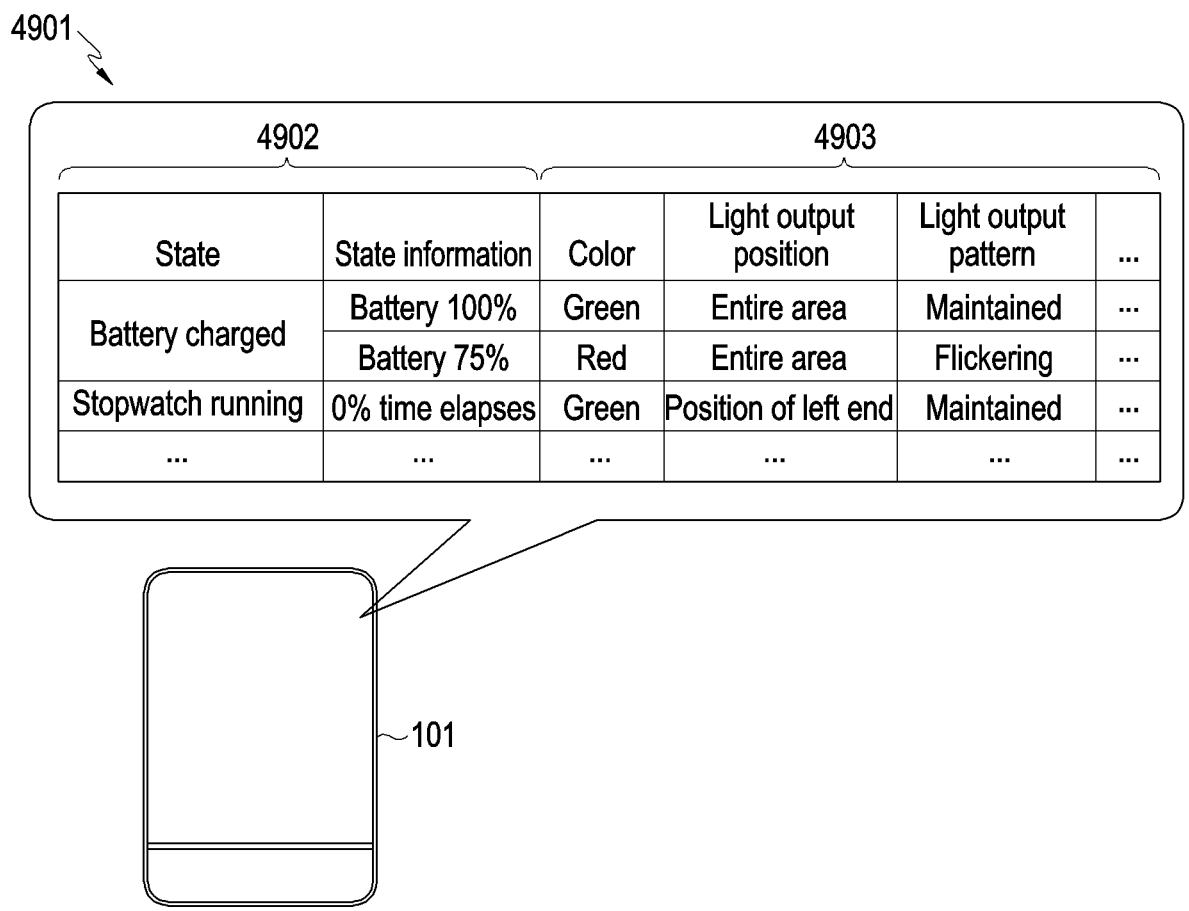
FIG. 49 is a view illustrating an example of operation of identifying various pieces of state information associated with an electronic device for outputting light by the electronic device according to an embodiment of the disclosure.

FIG. 49 is a view illustrating an example of operation of identifying various pieces of state information associated with an electronic device for outputting light by the electronic device according to an embodiment of the disclosure.

Figure 50:
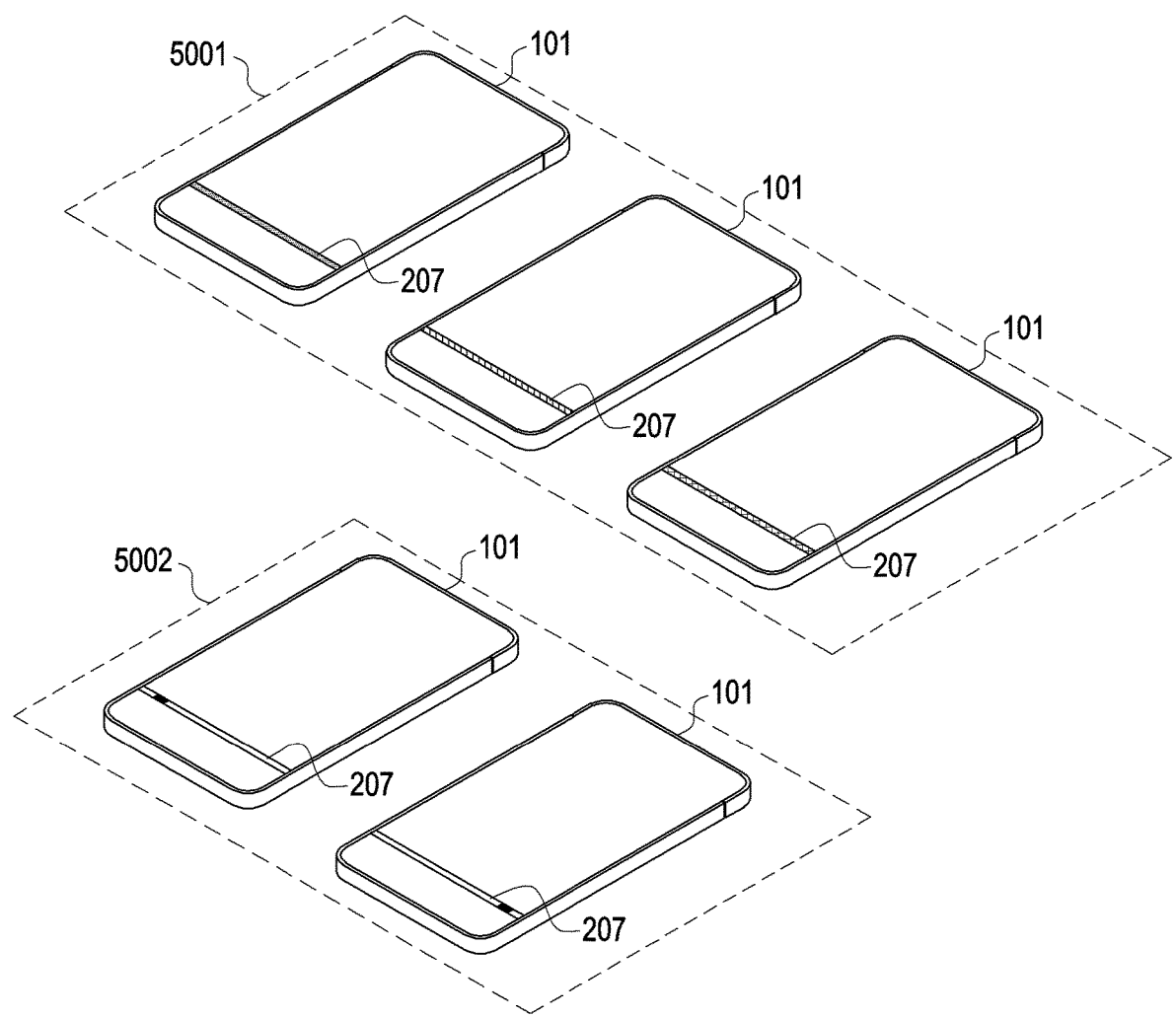
FIG. 50 is a view illustrating various embodiments of an operation of outputting light by an electronic device according to an embodiment of the disclosure.

FIG. 50 is a view illustrating various embodiments of an operation of outputting light by an electronic device according to an embodiment of the disclosure.

Figure 51:
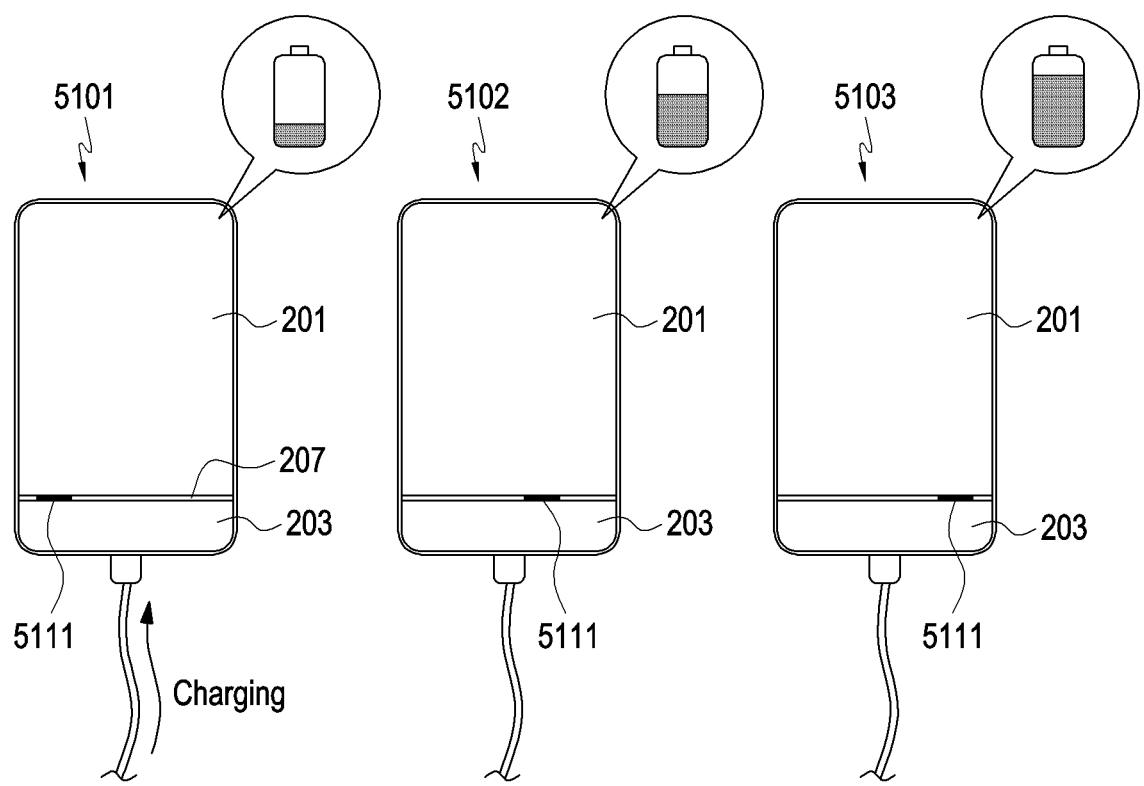
FIG. 51 is a view illustrating an example of operation of outputting light according to identified state information by an electronic device according to an embodiment of the disclosure.

FIG. 51 is a view illustrating an example of operation of outputting light according to identified state information by an electronic device according to an embodiment of the disclosure.

Figure 52:
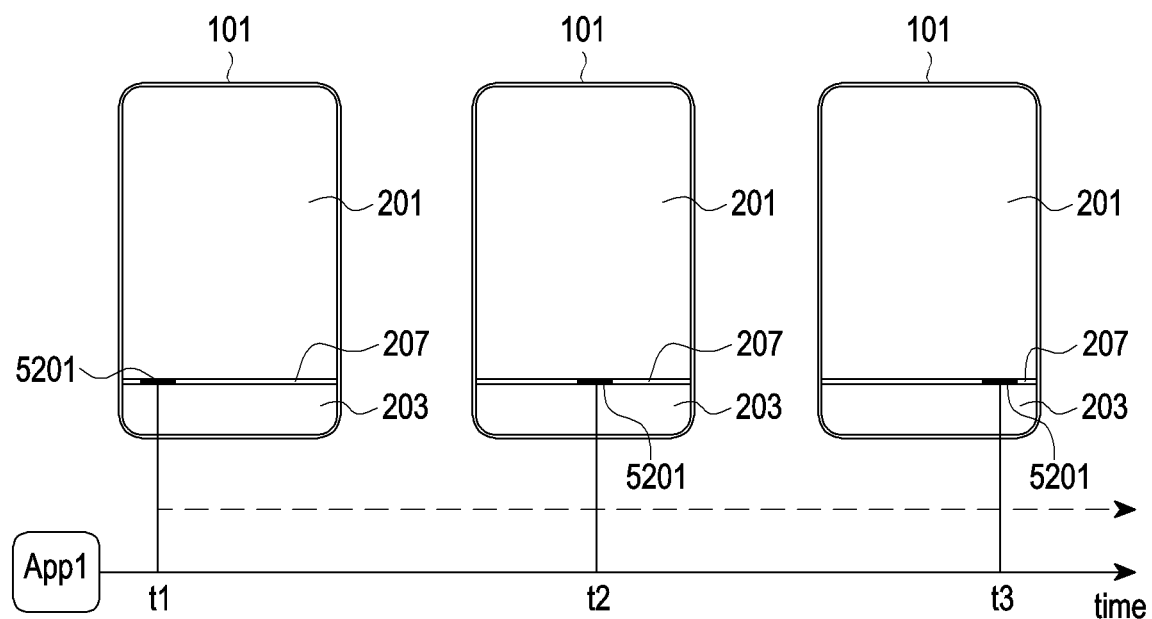
FIG. 52 is a view illustrating an example of operation of outputting light according to identified state information by an electronic device according to an embodiment of the disclosure.

FIG. 52 is a view illustrating an example of operation of outputting light according to identified state information by an electronic device according to an embodiment of the disclosure.

Referring to FIG. 48, according to various embodiments, in operation 4801, the electronic device 101 may obtain state information about the electronic device 101. For example, the electronic device 101 may store information about the visual attribute of the light output through the specific area corresponding to various types of state information about the electronic device 101. The electronic device 101 may identify the current state of the electronic device 101 and identify the visual attribute of light corresponding to the identified information about the current state of the electronic device 101 based on stored information. The visual attributes of light may include the color (5001 of FIG. 5) of light, the brightness of light, the output position of light (e.g., the entire area on the specific area and the area of the specific position) (5002 of FIG. 50), and the output pattern (e.g., keep outputting or flicker) of light. Hereinafter, various types of state information and visual attributes of light are further described.

Referring to FIG. 49, the electronic device 101 may store information 4901 about the visual attribute 4903 (e.g., the color, output position, and output pattern of light) of light corresponding to the state information 4902 for each of various state types. The various state types may be identified based on various types of information identified by the electronic device 101. For example, the various state types may include the current state (e.g., battery being charged or the screen brightness set as a specific value) of the electronic device 101, the state in which an event occurs in the electronic device 101 (e.g., reception of message), and the execution state of the application of the electronic device 101 (e.g., executing the stop watch application in foreground mode). As an example, the information associated with the current state of the electronic device 101 may be information indicating the current state of the electronic device 101, such as battery being charged or screen brightness set as a specific value, as shown in FIG. 49. As another example, the event occurring in the electronic device 101 may include events that may occur in the electronic device 101, such as a message reception event and an event in which the first display 201 starts to slide. As another example, the application execution state of the electronic device 101 may indicate the execution states of various types of applications being executed on the electronic device 101. The electronic device 101 may previously determine and store the light attribute (e.g., the color, output position, or output pattern of light), as shown in FIG. 49, per state information (e.g., battery status, set screen brightness value, number of received messages, and elapsed time after a specific time is set in the stop watch application) that may be obtained in each state (e.g., current state, event occurrence state, or application execution state) of the electronic device 101. Meanwhile, without limited to those described, the state information 4902 for each of various types may include various types of information that may be identified on the electronic device 101, as convertible into a specific value.

Further, without limited to those described, the electronic device 101 may determine the visual attribute of light based on the size of the currently received information, instead of the visual attribute of light corresponding to information for each of various state types. For example, the electronic device 101 may extract a value from the currently received information (e.g., battery information, screen brightness value, or set time) and determine the visual attribute of light according to the size of the extracted value. As an example, when the value is large, the electronic device 101 may output light in a relatively right position of the specific area and, when the value is small, output light in a relatively left position of the specific area. In this case, to compare the relative magnitude of the extracted value, the electronic device 101 may calculate the ratio of the extracted value with a specific value (e.g., the maximum value obtainable when extracting the value) and determine the visual attribute of light based on the calculated ratio.

According to various embodiments, in operation 4802, the electronic device 101 may output light to the specific area of the first display 201, as the visual attribute corresponding to the obtained state information in operation 4802. For example, when an output event for outputting light occurs, the electronic device 101 may output light as the visual attribute corresponding to the identified state information. The output event may include an event where the state of the electronic device 101 changes (e.g., changes from the sleep state to wake-up state), an event where a specific user input is received (e.g., receiving multi-touches in associated positions simultaneously), and an event where specific information is updated (e.g., updating battery information while charging the battery or receiving a new message). Hereinafter, examples of the operation of outputting light by the electronic device 101 are described.

Referring to FIG. 51, upon identifying an event for outputting light, the electronic device 101 may output light having a specific visual attribute, based on information about the battery level identified in the battery charging state. For example, as shown in 5101, 5102, and 5103 of FIG. 51, the electronic device 101 may output light 5111 in different positions of a specific area (e.g., as the charged battery level increases, a relatively right position in the specific area) according to the charged battery level. As another example, the electronic device 101 may output a different color of light depending on the charged battery level (e.g., green when the battery level is 100%, orange when the battery level is 75%, or red when the battery level is 30%).

Referring to FIG. 52, upon identifying an event for outputting light, the electronic device 101 may output light having a specific visual attribute based on information (e.g., elapsed time) obtained according to execution of a specific application (e.g., stop watch application). As an example, a specific time (e.g., alarm time or time limit) may be set based on the execution of the stop watch application, and the electronic device 101 may obtain information about the elapsed time. The electronic device 101 may output light 5201 in different positions as time elapses as shown in FIG. 52. As another example, the electronic device 101 may output light in different colors as time elapses.

The above-described visual attributes of light corresponding to the state information are merely an example and, without limited to those described, various settings may be made. For example, although it has been described that the output position of light is changed depending on the state information, such a setting may be made that the color of light is changed. As another example, although it has been described that the color of light is changed depending on the state information, such a setting may be made that the output position of light is changed.

Another example of an operation of an electronic device 101 is described below according to various embodiments.

According to various embodiments, the electronic device 101 may output light with a specific visual attribute (e.g., output position) based on the sliding distance of the first display 201. The electronic device 101 may receive the user's input (e.g., simultaneous multi-touches) for adjusting the position of the output light and adjust the sliding distance of the first display 201 according to the adjustment of the position of the output light.

Figure 53:
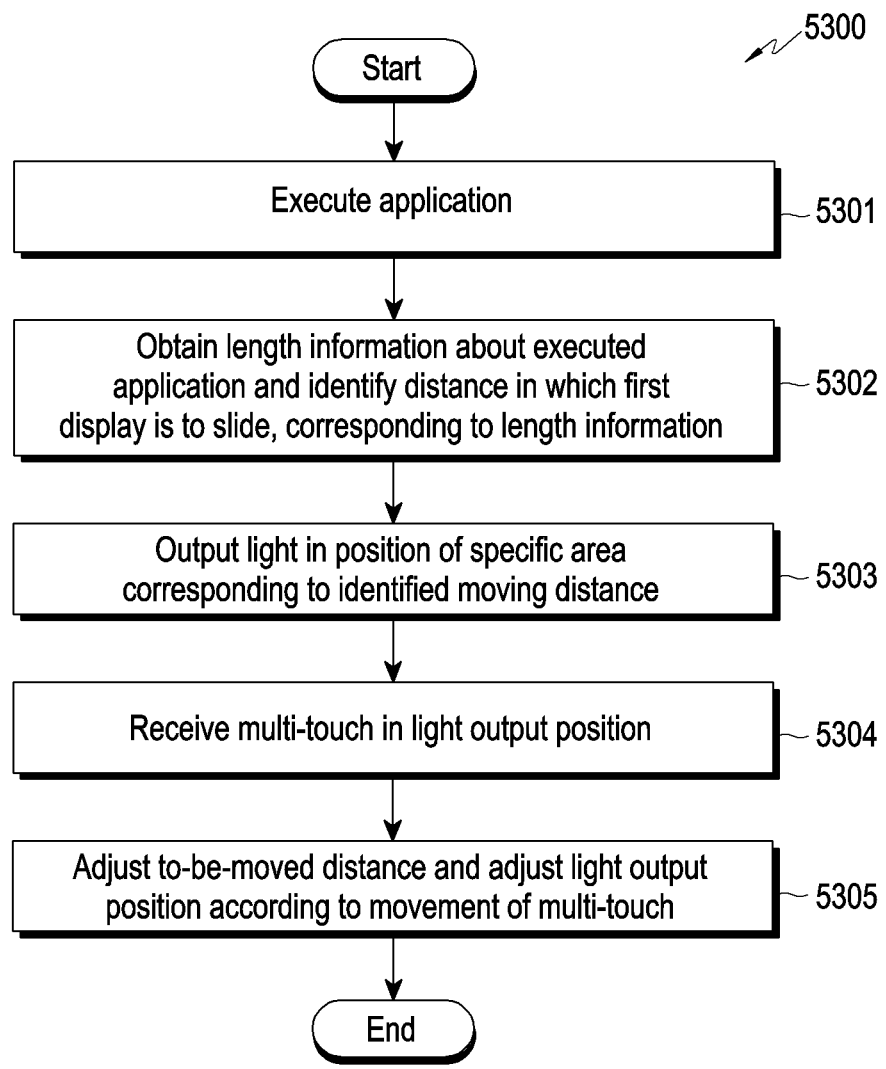
FIG. 53 is a flowchart illustrating another example of an operation of an electronic device according to an embodiment of the disclosure.

FIG. 53 is a flowchart illustrating another example of an operation of an electronic device according to an embodiment of the disclosure. According to various embodiments, the operations shown in FIG. 53 representing flowchart 5300 are not limited to the shown order but may rather be performed in other various orders. According to various embodiments, more or less operations than those of FIG. 53 may be performed. FIG. 53 is described below with reference to FIG. 54.

Figure 54:
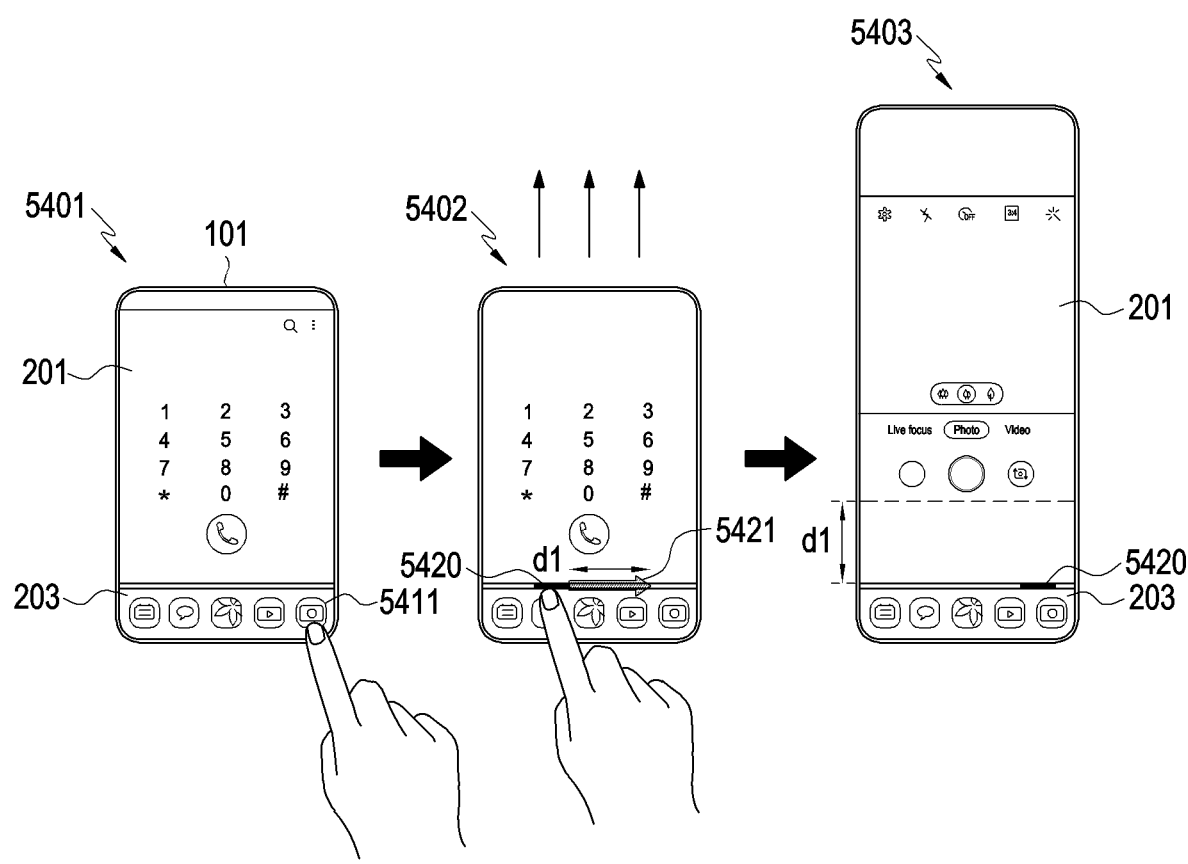
FIG. 54 is a view illustrating an example of operation of outputting light as a specific visual attribute (e.g., position of output) based on a sliding distance of a first display according to an embodiment of the disclosure.

FIG. 54 is a view illustrating an example of operation of outputting light as a specific visual attribute (e.g., position of output) based on a sliding distance of a first display according to an embodiment of the disclosure.

Referring to FIG. 53, according to various embodiments, in operation 5301, the electronic device 101 may execute the application and, in operation 5302, obtain length information about the executed application and identify the distance in which the first display 201 is to slide, corresponding to the length information. For example, the electronic device 101 may execute the application and obtain information about the length of the application from the application itself or the memory.

Referring to 5401 of FIG. 54, the electronic device 101 may receive a user input 5411 for selecting one icon for executing one application from among a plurality of icons displayed on the second display 203. The electronic device 101 may compare the length of the application with the length of the currently exposed area of the first display 201 and identify (or calculate) the distance in which the first display 201 is to slide. Operations 5301 and 5302 of the electronic device 101 may be performed like the operations of the electronic device 101 as described above in connection with FIGS. 18, 19, 20A and 20B, 21 to 23, and no duplicate description thereof is given below.

According to various embodiments, in operation 5303, the electronic device 101 may output light 5420 in the position of the specific area corresponding to the identified moving distance as shown in 5402 of FIG. 54. For example, the electronic device 101 may determine the position where the light 5420 is output, in proportion to the distance to be moved with respect to an end (e.g., the leftmost or rightmost end) of the specific area.

According to various embodiments, in operation 5304, the electronic device 101 may receive a multi-touch in the position where light is output. For example, as shown in 5402 of FIG. 54, the electronic device 101 may receive the user's input 5421 simultaneously received on the area of the first display 201 adjacent to the position where the light 5420 is output and the area of the second display 203.

According to various embodiments, in operation 5305, the electronic device 101 may adjust the to-be-moved distance according to the movement of the multi-touch and adjust the output position of light. For example, as shown in 5402 and 5403 of FIG. 54, when moved in a state in which the received user input 5421 is maintained, the electronic device 101 may change the output position of the light 5420 to the position of the specific area corresponding to the area where the user input 5421 is moved. Further, the electronic device 101 may identify the moving direction and moving distance d1 and adjust the to-slide distance based on the identified moving direction and moving distance. As an example, when moving to the right, the electronic device 101 may increase the moving distance of the first display 201 by the distance corresponding to the moving distance d1 of the user input and, when moving to the left, reduce the moving distance of the first display 201 by the distance corresponding to the moving distance d1 of the user input. Without limited to those described, the electronic device 101 may reduce the sliding distance based on the right movement of the user input and increase the sliding distance based on the left movement of the user input. When the user input is released, the electronic device 101 may slide the first display 201 by the adjusted moving distance. Although not shown, the electronic device 101 may display a preview of the content to be displayed (e.g., the execution screen of the application corresponding to the icon) while the user input is moved.

According to various embodiments, there may be provided an electronic device (e.g., the electronic device 101) comprising a housing, a first display (e.g., the first display 201) having at least a portion exposed to an outside through the housing and slidable through the housing, an externally exposed area of the first display (e.g., the first display 201) being changeable based on a slide through the housing, a second display (e.g., the second display 203) spaced apart from the exposed at least the portion of the first display (e.g., the first display 201) by a predetermined interval and, along with the exposed at least the portion, disposed on one plane, and at least one processor disposed in the housing, wherein the at least one processor is configured to receive at least one of a first input on the first display (e.g., the first display 201) or a second input on the second display (e.g., the second display 203) and perform at least one operation based on at least one of the first input or the second input.

According to various embodiments, there may be provided the electronic device (e.g., the electronic device 101), wherein the at least one processor is configured to identify information about an attribute of the first input and information about an attribute of the second input, the information about the attribute including information about at least one of a reception time of the input, a reception position of the input, or a sensitivity of the input and perform the at least one operation based on the information about the attribute of the first input and the information about the attribute of the second input.

According to various embodiments, there may be provided the electronic device (e.g., the electronic device 101), wherein the at least one processor is configured to identify a first reception position of the first input and a second reception position of the second input, identify a length of an area of the first display (e.g., the first display 201), received in the electronic device 101, and identify the at least one operation based on the identified first reception position, the identified second reception position, and the length of the received area.

According to various embodiments, there may be provided the electronic device (e.g., the electronic device 101), wherein the at least one processor is configured to execute an application based on at least one of the first input or the second input, identify a first content and a second content associated with the executed application, display the first content on the first display (e.g., the first display 201), and display the second content on the second display (e.g., the second display 203).

According to various embodiments, there may be provided the electronic device, further comprising a first housing where the exposed at least the portion of the first display (e.g., the first display 201) is disposed, a second housing where the second display (e.g., the second display 203) is disposed, and a roller (e.g., roller 320) configured to move the first housing, and a motor configured to rotate the roller (e.g., roller 320), wherein the first housing is disposed to be slidable on the housing, and an end of the second housing is coupled with an end of the housing.

According to various embodiments, there may be provided the electronic device (e.g., the electronic device 101), wherein the at least one processor is configured to drive the motor to rotate the roller (e.g., roller 320) based on at least one of the first input or the second input and slide the first housing on the housing in one direction according to the rotation of the roller.

According to various embodiments, there may be provided the electronic device (e.g., the electronic device 101), wherein the at least one processor is configured to execute an application based on at least one of the first input or the second input, identify information about a length of the executed application, identify a length where the first display (e.g., the first display 201) is to slide, based on the identified information about the length, drive the motor to rotate the roller (e.g., roller 320) based on the identified length, wherein the first housing slides on the housing in one direction by the identified length, and another portion of the first display (e.g., the first display 201) having an area corresponding to the identified length is exposed to the outside and display an execution screen of the application on the exposed at least the portion and the other portion of the first display (e.g., the first display 201).

According to various embodiments, there may be provided the electronic device (e.g., the electronic device 101), wherein the at least one processor is configured to display icons for executing a plurality of applications on the second display (e.g., the second display 203) and execute the application corresponding to one icon based on receiving the second input for selecting the one icon from among the displayed icons.

According to various embodiments, there may be provided the electronic device (e.g., the electronic device 101), wherein the at least one processor is configured to, when the first input and the second input are received, identify a first reception time of the first input and a second reception time of the second input, when the identified first reception time and second reception time differ from each other, perform at least one first operation, and when the first reception time and second reception time correspond to each other, perform at least one second operation.

According to various embodiments, there may be provided the electronic device (e.g., the electronic device 101), wherein the at least one processor is configured to set the electronic device to a locked state, display a first portion of a screen for receiving a pattern for releasing the locked state on the first display (e.g., the first display 201) and a second portion of the screen on the second display (e.g., the second display 203), and as the at least one first operation, identify a pattern on the first portion and the second portion of the screen, based on the first input and the second input, and when the identified pattern is a pattern for unlocking, release the locked state of the electronic device (e.g., the electronic device 101).

According to various embodiments, there may be provided the electronic device (e.g., the electronic device 101), wherein the at least one processor is configured to display an execution screen of a first application on the first display (e.g., the first display 201), display a plurality of icons for executing a plurality of applications on the second display (e.g., the second display 203) and as the at least one first operation, identify one icon selected by the second input from among the plurality of icons, and perform an operation for displaying an execution screen of the first application, along with an execution screen of a second application corresponding to the one icon, based on releasing the first input received on the first display (e.g., the first display 201) after receiving the second input, and wherein the execution screen of the first application does not overlap the execution screen of the second application.

According to various embodiments, there may be provided the electronic device (e.g., the electronic device 101) further comprising a sensor for recognizing a fingerprint, wherein the at least one processor is configured to, as the at least one first operation, recognize a user's fingerprint using the sensor when the second input is received and perform an operation of sliding the first display (e.g., the first display 201) by a preset distance based on releasing the first input on the first display (e.g., the first display 201) after authentication based on the recognized fingerprint of the user is completed.

According to various embodiments, there may be provided the electronic device (e.g., the electronic device 101), wherein the at least one processor is configured to, as the at least one second operation, identify a first position where the first input is received and a second position where the second input is received, perform at least one third operation when the first position corresponds to the second position, and perform at least one fourth operation when the first position differs from the second position.

According to various embodiments, there may be provided the electronic device (e.g., the electronic device 101), wherein the at least one processor is configured to, as the at least one third operation, identify a distance in which the first input and the second input move in one direction, identify a distance in which the first display (e.g., the first display) is to slide, based on the identified distance, display a preview for a content to be displayed of an area corresponding to the identified distance, and perform an operation of sliding the first display (e.g., the first display 201) by the identified distance, based on releasing the first input and the second input.

According to various embodiments, there may be provided the electronic device (e.g., the electronic device 101), wherein the at least one processor is configured to display an execution screen of a first application on the first display (e.g., the first display 201), display a screen including the plurality of icons for executing a plurality of applications on the second display (e.g., the second display 203), as the at least one third operation, identify a movement of the first input and the second input in one direction, and display an execution screen of a second application instead of the displayed screen, based on the identified movement.

According to various embodiments, there may be provided The electronic device (e.g., the electronic device 101), wherein the at least one processor is configured to display a screen including the plurality of icons for executing a plurality of applications, on the second display (e.g., the second display 203) and, as the at least one third operation, display a preview for an execution screen of an application corresponding to an icon selected by the second input, on the first display (e.g., the first display 201), and identify a distance in which the first display (e.g., the first display 201) is to slide based on a movement of the first input and display the preview in an area corresponding to the identified distance.

According to various embodiments, there may be provided a method for operating an electronic device (e.g., the electronic device 101), comprising receiving at least one of a first input on a first display (e.g., the first display 201) of the electronic device (e.g., the electronic device 101) or a second input on a second display (e.g., the second display 203) of the electronic device (e.g., the electronic device 101), the first display (e.g., the first display 201) having at least a portion exposed to an outside, and the second display (e.g., the second display 203) spaced apart from the exposed at least the portion of the first display (e.g., the first display 201) by a predetermined interval and, together with the exposed at least the portion, disposed on one plane, and performing at least one operation based on at least one of the first input or the second input.

According to various embodiments, there may be provided the method, further comprising identifying information about an attribute of the first input and information about an attribute of the second input, the information about the attribute including information about at least one of a reception time of the input, a reception position of the input, or a sensitivity of the input and performing the at least one operation based on the information about the attribute of the first input and the information about the attribute of the second input.

According to various embodiments, there may be provided the method, further comprising identifying a first reception position of the first input and a second reception position of the second input, identifying a length of an area of the first display (e.g., the first display 201), received in the electronic device (e.g., the electronic device 101), and identifying the at least one operation based on the identified first reception position, the identified second reception position, and the length of the received area.

According to various embodiments, there may be provided an electronic device (e.g., the electronic device 101), comprising a housing, a first display (e.g., the first display 201) having at least a portion exposed to an outside through the housing and slidable through the housing, an externally exposed area of the first display (e.g., the first display 201) being changeable based on a slide through the housing, a second display (e.g., the second display 203) spaced apart from the exposed at least the portion of the first display (e.g., the first display 201) by a predetermined interval and, along with the exposed at least the portion, disposed on one plane, and at least one processor disposed in the housing, wherein the at least one processor is configured to receive a first input on the first display (e.g., the first display 201), receive a second input on the second display (e.g., the second display 203), identify a first time when the first input is received and a second time when the second input is received, identify a first position where the first input is received and a second position where the second input is received, and perform at least one operation based on the first time corresponding to the second time and the first position corresponding to the second position.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. An electronic device, comprising:
 a housing;
 a first display having at least a portion exposed to an outside through the housing, the exposed at least portion of the first display being changeable based on a slide through the housing;
 a second display spaced apart from the first display, wherein the exposed at least portion of the first display and the second display are disposed on the same plane;
 at least one processor disposed in the housing; and
 memory storing instructions that, when executed by the at least one processor, cause the electronic device to:
  receive a first input on the first display and a second input on the second display;
  in case that the first input corresponding to a movement of a user touch input on the first display is detected while the second input corresponding to selecting an icon displayed on the second display is maintained:
   identify a movement distance of the first input in a state in which the second input is maintained, and
   identify a slide distance of the first display based on the movement distance of the first input, detect a release of the first input and the second input; and in response to detecting the release of the first input and the second input, change an exposed length of the first display based on the slide distance, and display, through the first display having the changed exposed length, an execution screen of a first application corresponding to the icon.

2. The electronic device of claim 1, wherein the at least one processor is further configured to:

identify information about an attribute of the first input and information about an attribute of the second input, the information about the attribute including information about at least one of a reception time of the input, a reception position of the input, or a sensitivity of the input; and perform at least one operation based on the information about the attribute of the first input and the information about the attribute of the second input.

3. The electronic device of claim 2, wherein the at least one processor is further configured to:

identify a first reception position of the first input and a second reception position of the second input;

identify a length of an area of the first display, received in the electronic device; and identify the at least one operation based on the identified first reception position, the identified second reception position, and the length of the received area.

4. The electronic device of claim 1, wherein the at least one processor is further configured to:

execute an application based on at least one of the first input or the second input;

identify a first content and a second content associated with the executed application;

display the first content on the first display; and display the second content on the second display.

5. The electronic device of claim 1, further comprising:

a first housing where the exposed at least the portion of the first display is disposed;

a second housing where the second display is disposed;

a roller configured to move the first housing; and a motor configured to rotate the roller, wherein the first housing is disposed to be slidable on the housing, and an end of the second housing is coupled with an end of the housing, and wherein the at least one processor is further configured to drive the motor to rotate the roller based on at least one of the first input or the second input and slide the first housing on the housing in one direction according to the rotation of the roller.

6. The electronic device of claim 5, wherein the at least one processor is further configured to:

execute an application based on at least one of the first input or the second input;

identify information about a length of the executed application;

identify a length where the first display is to slide, based on the identified information about the length; and drive the motor to rotate the roller based on the identified length, wherein the first housing slides on the housing in one direction by the identified length, and wherein another portion of the first display having an area corresponding to the identified length is exposed to the outside; and display an execution screen of the application on the exposed at least the portion and the other portion of the first display.

7. The electronic device of claim 1, wherein the at least one processor is further configured to:

when the first input and the second input are received, identify a first reception time of the first input and a second reception time of the second input;

when the identified first reception time and second reception time differ from each other, perform at least one first operation; and when the first reception time and second reception time correspond to each other, perform at least one second operation.

8. The electronic device of claim 7, wherein the at least one processor is further configured to:

set the electronic device to a locked state;

display a first portion of a screen for receiving a pattern for releasing the locked state on the first display and a second portion of the screen on the second display; and as the at least one first operation:

identify a pattern on the first portion and the second portion of the screen, based on the first input and the second input, and when the identified pattern is a pattern for unlocking, release the locked state of the electronic device.

9. The electronic device of claim 7, wherein the at least one processor is further configured to:

display an execution screen of a second application on the first display;

display a plurality of icons for executing a plurality of applications on the second display; and as the at least one first operation:

identify one icon selected by the second input from among the plurality of icons, and perform an operation for displaying an execution screen of the second application, along with an execution screen of a application corresponding to the one icon, based on releasing the first input received on the first display after receiving the second input, and wherein the execution screen of the second application does not overlap the execution screen of the application.

10. The electronic device of claim 7, further comprising:

a sensor for recognizing a fingerprint, wherein the at least one processor is further configured to:

as the at least one first operation:

recognize a user's fingerprint using the sensor when the second input is received, and perform an operation of sliding the first display by a preset distance based on releasing the first input on the first display after authentication based on the recognized fingerprint of the user is completed.

11. The electronic device of claim 9, wherein the at least one processor is further configured to:

as the at least one second operation:

identify a first position where the first input is received and a second position where the second input is received, perform at least one third operation when the first position corresponds to the second position, and perform at least one fourth operation when the first position differs from the second position.

12. The electronic device of claim 11, wherein the at least one processor is further configured to:

as the at least one third operation:

identify a distance in which the first input and the second input move in one direction, identify a distance in which the first display is to slide, based on the identified distance, display a preview for a content to be displayed of an area corresponding to the identified distance, and perform an operation of sliding the first display by the identified distance, based on releasing the first input and the second input.

13. The electronic device of claim 11, wherein the at least one processor is further configured to:

display a screen including a plurality of objects associated with a plurality of functions of one application, on the second display; and as the at least one third operation:
identify a first function corresponding to an icon selected by the second input, and
adjust the first function based on a movement of the first input.

14. The electronic device of claim 11, wherein the at least one processor is further configured to:

display a screen including the plurality of icons for executing a plurality of applications, on the second display; and as the at least one third operation:
display a preview for an execution screen of an application corresponding to an icon selected by the second input, on the first display, and
identify a distance in which the first display is to slide based on a movement of the first input and display the preview in an area corresponding to the identified distance.

15. The electronic device of claim 11, wherein the at least one processor is further configured to:

obtain state information about the electronic device; and
output a light to a specific area of the first display in a visual pattern corresponding to the obtained state information.

16. The electronic device of claim 15, wherein the obtained state information corresponds to at least one of a charging state or an application state.

17. The electronic device of claim 1, wherein the instructions, when executed by the at least one processor, cause the electronic device to:

based on the first input and the second input, display, through the first display, a preview, indicating an execution screen of the first application corresponding to the icon, in a first size, detect a movement of the first input from a first position of the first display to a second position of the first display on the preview, while the second input is maintained, based on the detection of the movement of the first input, display, through the first display, the preview in a second size different from the first size, detect the release of the first input on the second position of the first display and the second input, based on the detection of the release of the first input and the second input, changing the exposed length of the first display so that the exposed length of the first display to be a first length different from a current exposed length.

18. One or more non-transitory computer-readable storage media storing one or more computer programs including computer-executable instructions that, when executed by one or more processors of an electronic device, cause the electronic device to perform operations, the operations comprising:

receiving a first input on a first display of the electronic device and a second input on a second display of the electronic device;

in case that the first input corresponding to a movement of a user touch input on the first display is detected while the second input corresponding to selecting an icon displayed on the second display is maintained:
identifying a movement distance of the first input in a state in which the second input is maintained,
identifying a slide distance of the first display based on the movement distance of the first input, detecting a release of the first input and the second input; and in response to detecting the release of the first input and the second input, changing an exposed length of the first display based on the slide distance, and display, through the first display having the changed exposed length, an execution screen of a first application corresponding to the icon.

* * * * *